(12) United States Patent
Takatsu et al.

(10) Patent No.: US 7,460,538 B2
(45) Date of Patent: Dec. 2, 2008

(54) COMMUNICATION CONTROL APPARATUS AND METHOD FOR SEARCHING AN INTERNET PROTOCOL ADDRESS

(75) Inventors: Yoshihisa Takatsu, Yamato (JP); Shinpei Watanabe, Yokohama (JP); Masaya Mori, Kawasaki (JP); Toshio Sunaga, Ohtsu (JP)

(73) Assignee: International Business Machines Corporation, Armonk, NY (US)

( * ) Notice: Subject to any disclaimer, the term of this patent is extended or adjusted under 35 U.S.C. 154(b) by 1014 days.

(21) Appl. No.: 10/780,213

(22) Filed: Feb. 17, 2004

(65) Prior Publication Data

US 2004/0215609 A1 Oct. 28, 2004

(30) Foreign Application Priority Data

Apr. 25, 2003 (JP) ............................. 2003-121263

(51) Int. Cl.
*H04L 12/28* (2006.01)
*H04J 1/16* (2006.01)
*G08C 15/00* (2006.01)
*G06F 11/00* (2006.01)

(52) U.S. Cl. ...................... 370/392; 370/232; 370/474; 707/5

(58) Field of Classification Search ......... 370/352–389, 370/392–395, 400–474; 709/238–243; 707/3–6
See application file for complete search history.

(56) References Cited

U.S. PATENT DOCUMENTS

| | | | | |
|---|---|---|---|---|
| 5,949,757 | A * | 9/1999 | Katoh et al. ................. | 370/232 |
| 6,505,270 | B1 * | 1/2003 | Voelkel et al. .............. | 711/108 |
| 6,565,211 | B1 * | 5/2003 | Sekine et al. ................. | 353/20 |
| 6,778,532 | B1 * | 8/2004 | Akahane et al. ............. | 370/392 |
| 6,970,478 | B1 * | 11/2005 | Nishihara .................... | 370/474 |
| 7,047,313 | B1 * | 5/2006 | Broerman .................... | 709/238 |
| 2004/0030694 | A1 * | 2/2004 | Tokumo et al. ................. | 707/5 |
| 2004/0223501 | A1 * | 11/2004 | Mackiewich et al. ........ | 370/401 |

* cited by examiner

*Primary Examiner*—Man U. Phan
(74) *Attorney, Agent, or Firm*—H. Daniel Schnurmann

(57) ABSTRACT

A communication control apparatus includes search information associated with a tree structure. A mask prefix is associated with at least one entry, each entry including information on the mask length of a mask prefix associated therewith and a sort key. Each entry is assigned to a node in the tree structure according to a sorting order. Each node is linked to a different node at the next lower hierarchy via a branch based on the entry of the node. A destination address of the packet received is first extracted, and a search target node specified by a search control for an entry having information on the best matched prefix of the extracted address is then searched for. After completion of the node-by-node search process, a transfer route is determined for the packet received based on the longest prefix amongst the most appropriate prefixes of all the current search target nodes.

19 Claims, 42 Drawing Sheets

[Figure 1]
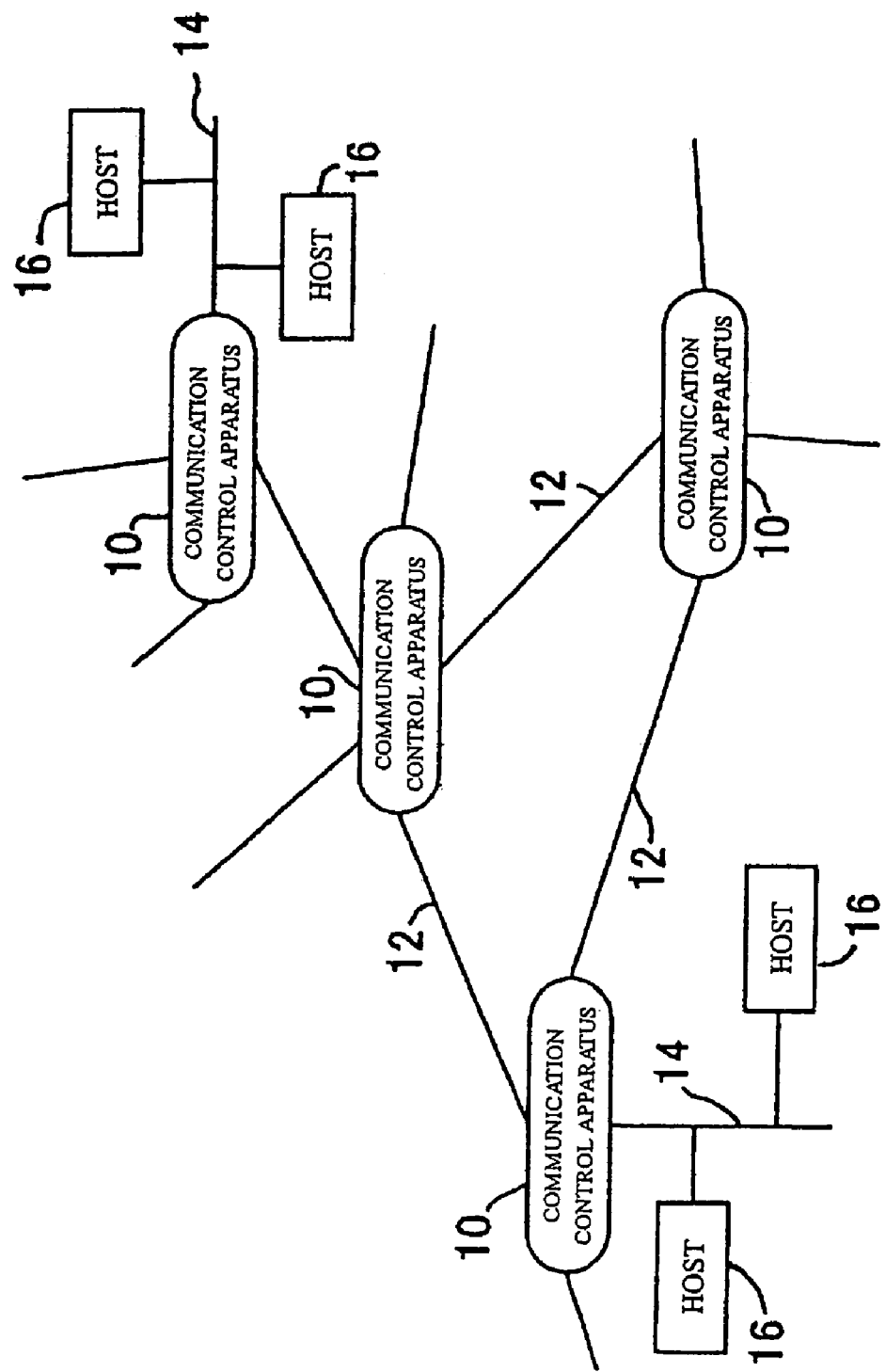

[Figure 2]
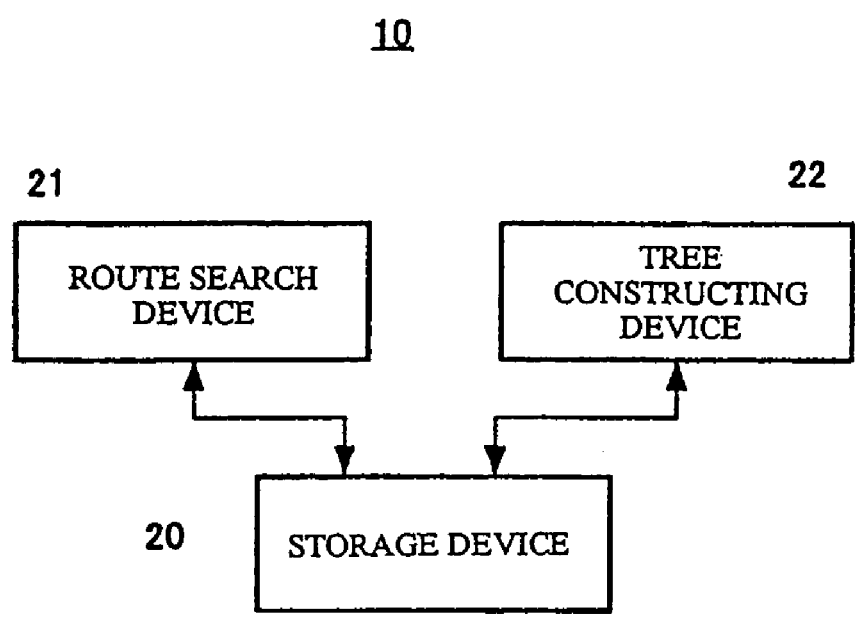

[Figure 3]
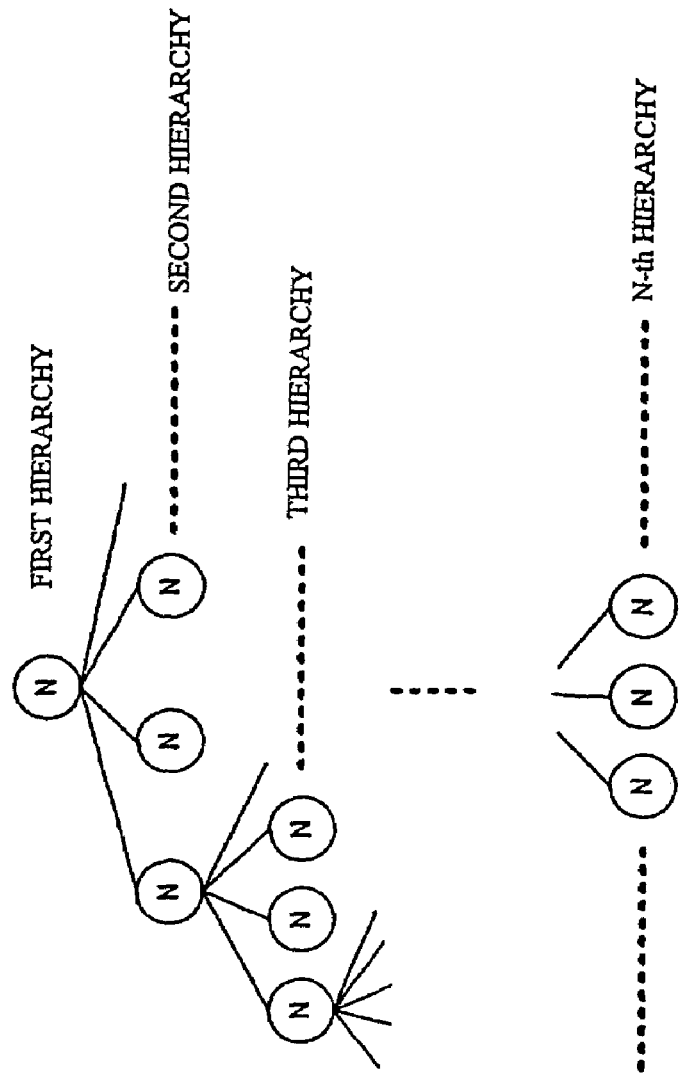
[Figure 4]
| SORT KEY | MASK LENGTH |
|----------|-------------|
| 01010100 | 5 |
| 01011000 | 4 |
| 01110000 | 4 |

[Figure 5]
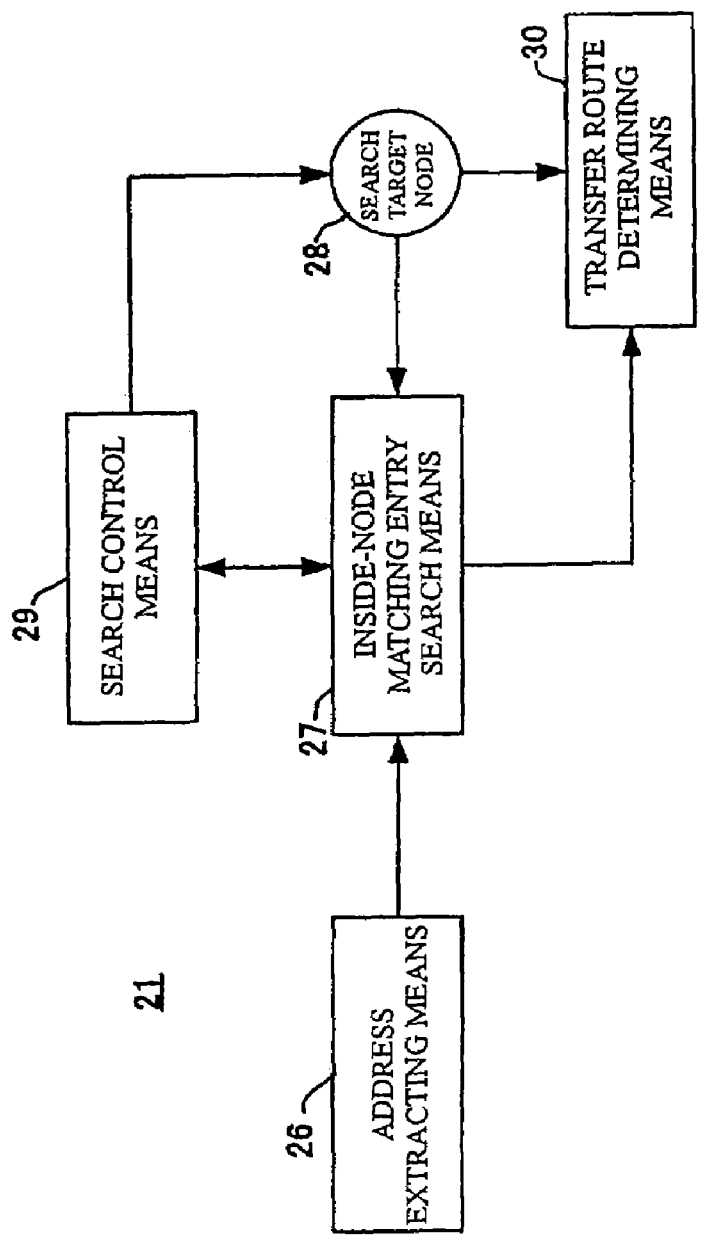

[Figure 6]
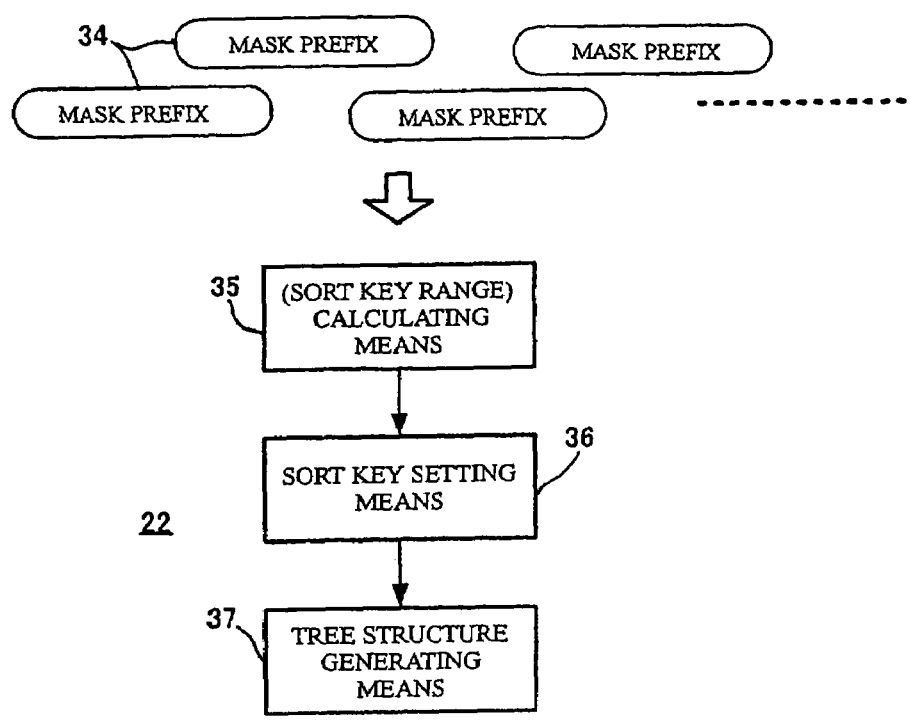

[Figure 7]
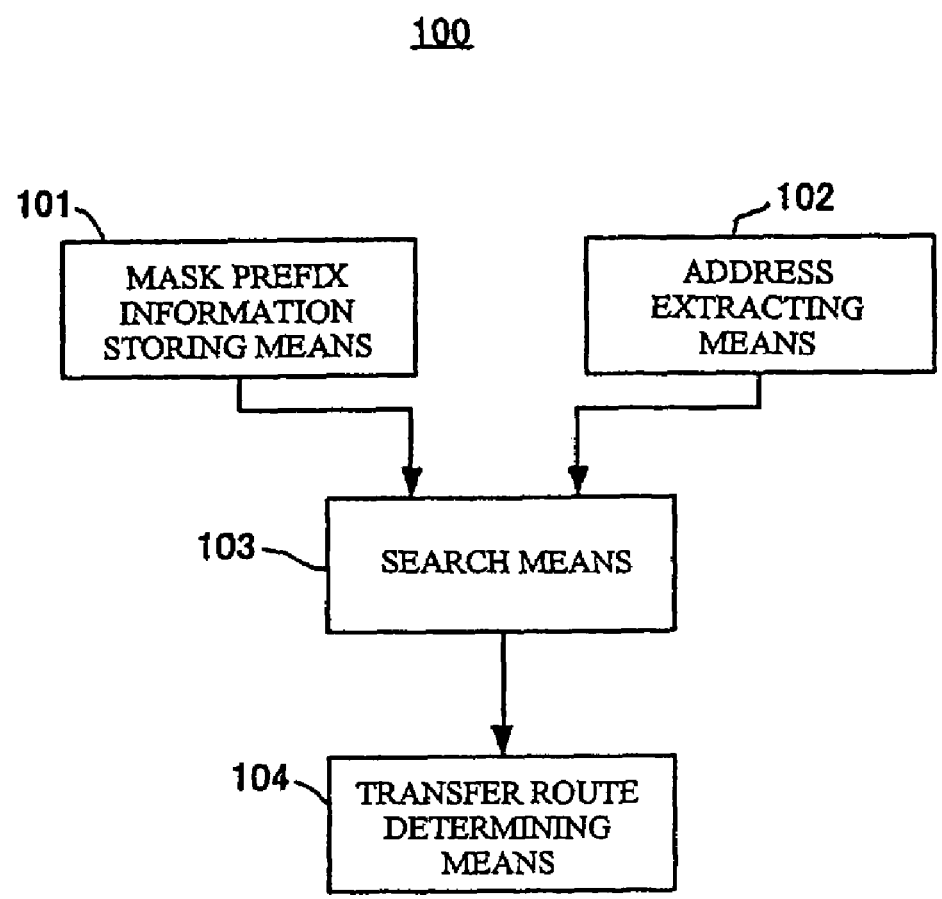

[Figure 8]
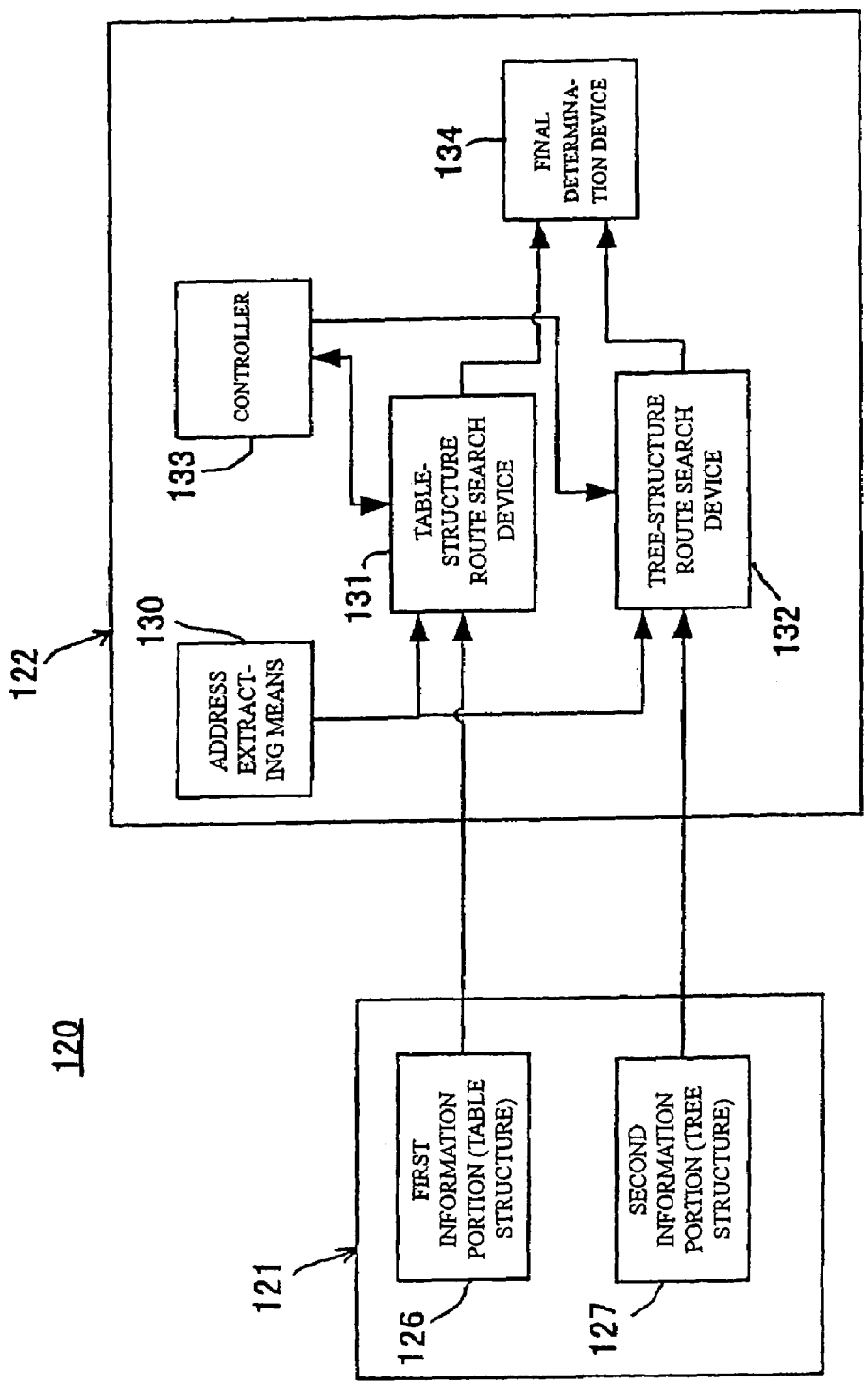

[Figure 9]
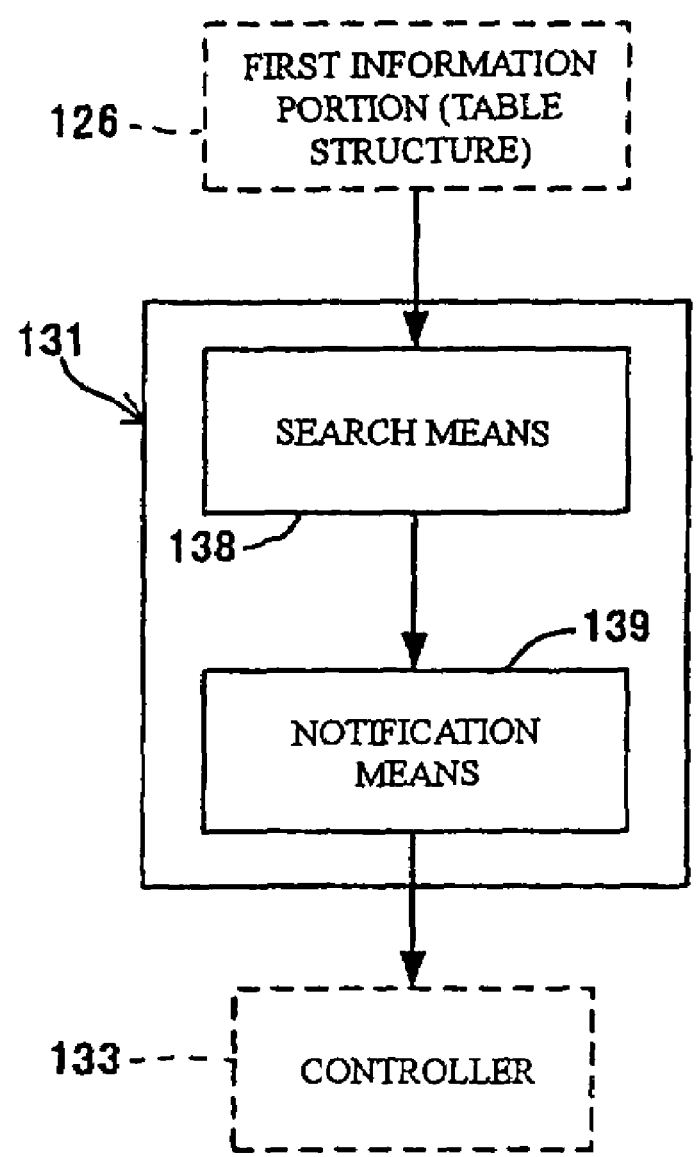

[Figure 10]
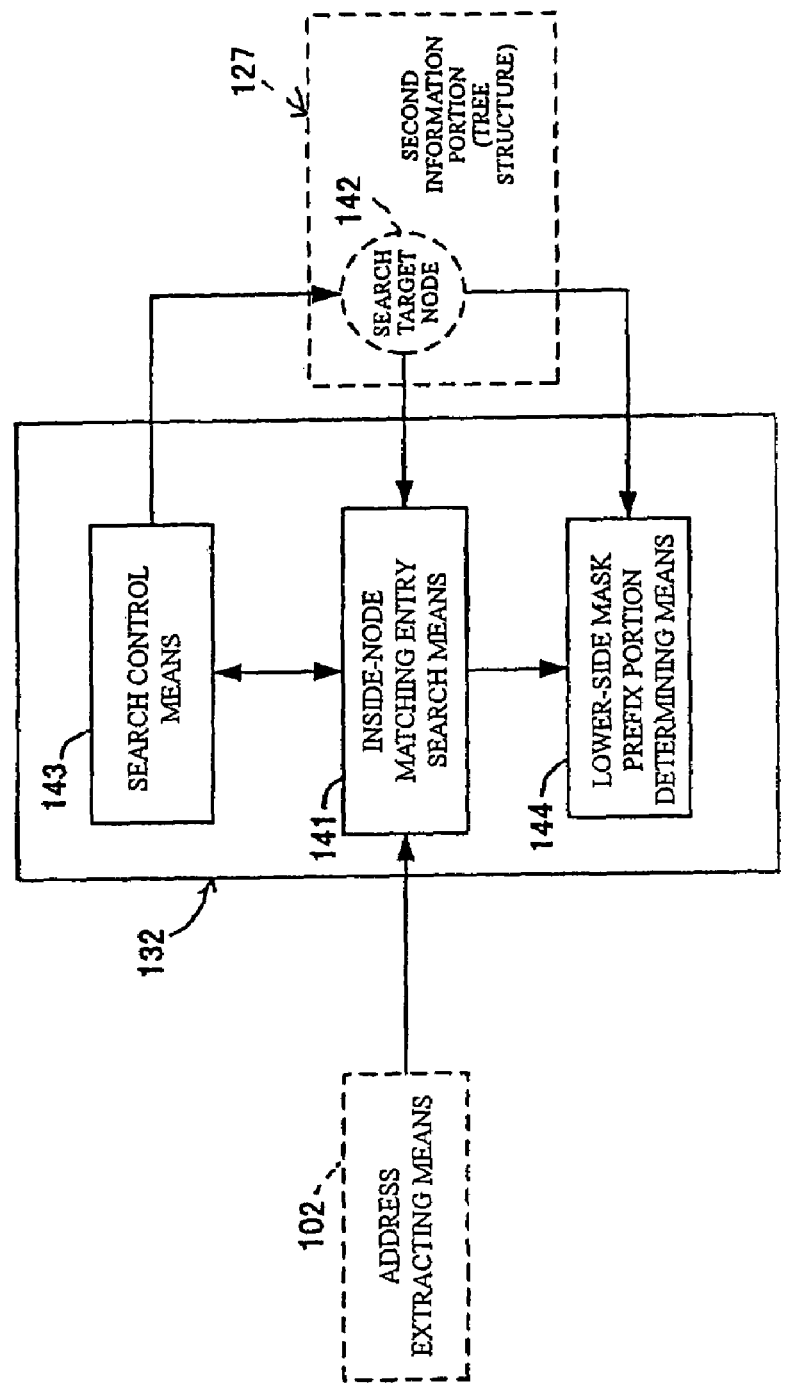

[Figure 11]
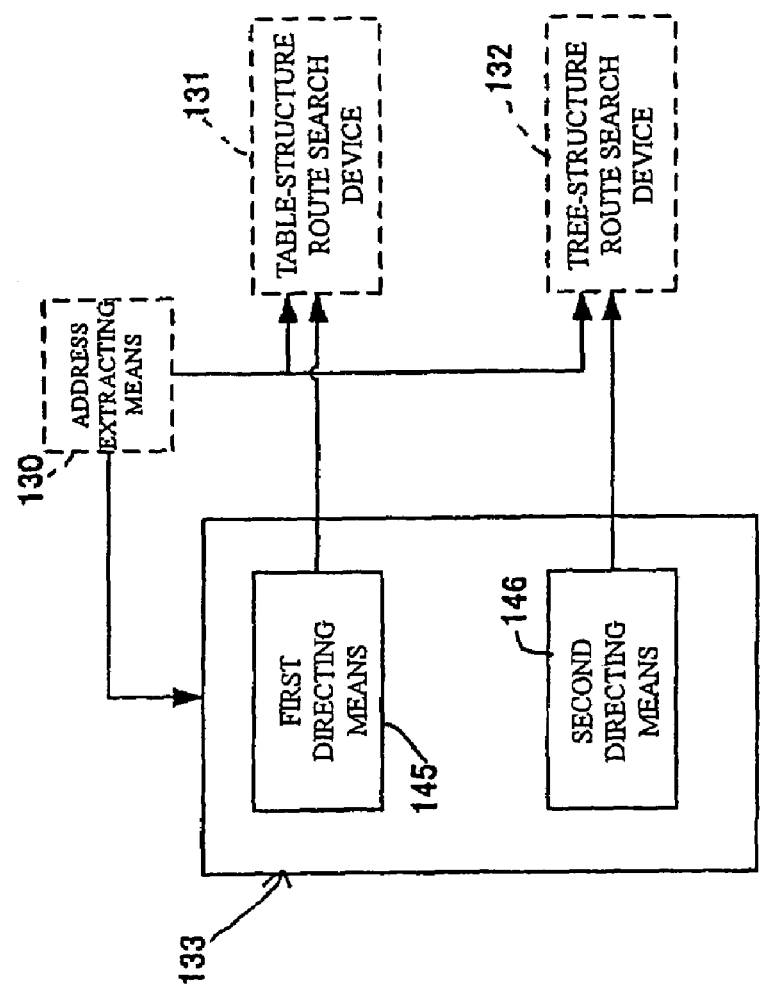

| NUMBER | MASK PREFIX | MASK LENGTH |
|---|---|---|
| 1 | 00 | 2 |
| 2 | 00001 | 5 |
| 3 | 0001 | 4 |
| 4 | 00010 | 5 |
| 5 | 000110 | 6 |
| 6 | 001 | 3 |
| 7 | 01 | 2 |
| 8 | 011 | 3 |
| 9 | 1100 | 4 |

(b)

| MASK PREFIX WITH 3 OR LESS BITS | MASK LENGTH |
|---|---|
| 00 | 2 |
| 001 | 3 |
| 01 | 2 |
| 011 | 3 |

(c)

| MASK PREFIX WITH 4 OR MORE BITS | MASK LENGTH |
|---|---|
| 00001 | 5 |
| 0001 | 4 |
| 00010 | 5 |
| 000110 | 6 |
| 1100 | 4 |

[Figure 13]

| ENTRY NUMBER | SORT KEY | POINTER TO TREE STRUCTURE | SHORT MASK PREFIX CANDIDATE |
|---|---|---|---|
| 1 | 000 | Tree-A | 00/2 CANDIDATE |
| 2 | 001 | None | 001/3 DETERMINED |
| 3 | 010 | None | 01/2 DETERMINED |
| 4 | 011 | None | 011/3 DETERMINED |
| 5 | 100 | None | None NO APPROPRIATE PREFIX |
| 6 | 101 | None | None NO APPROPRIATE PREFIX |
| 7 | 110 | Tree-B | None NO APPROPRIATE PREFIX |
| 8 | 111 | None | None NO APPROPRIATE PREFIX |

| MASK PREFIX | MASK LENGTH |
|---|---|
| 00001 | 5 |
| 0001 | 4 |
| 00010 | 5 |
| 000110 | 6 |

(b)

| MASK PREFIX | MASK LENGTH |
|---|---|
| 1100 | 4 |

[Figure 15]
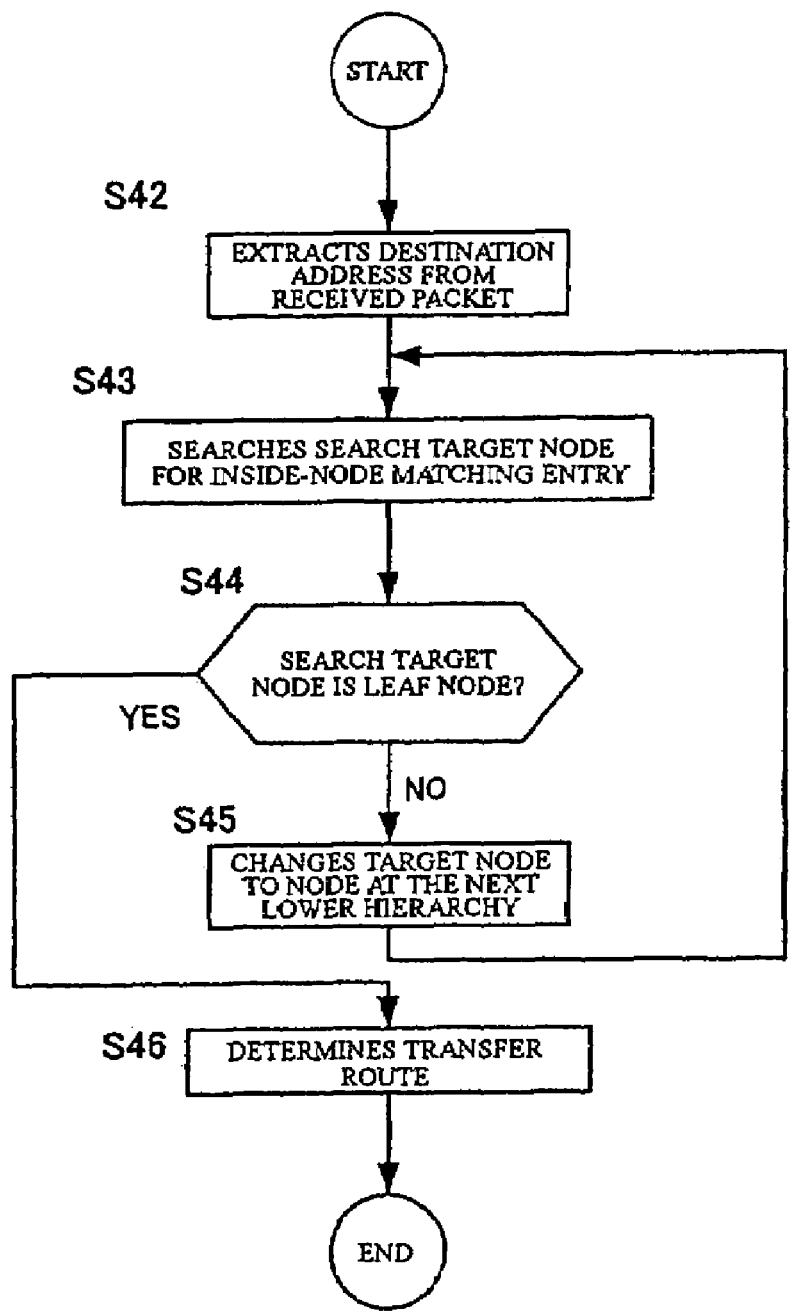

[Figure 16]
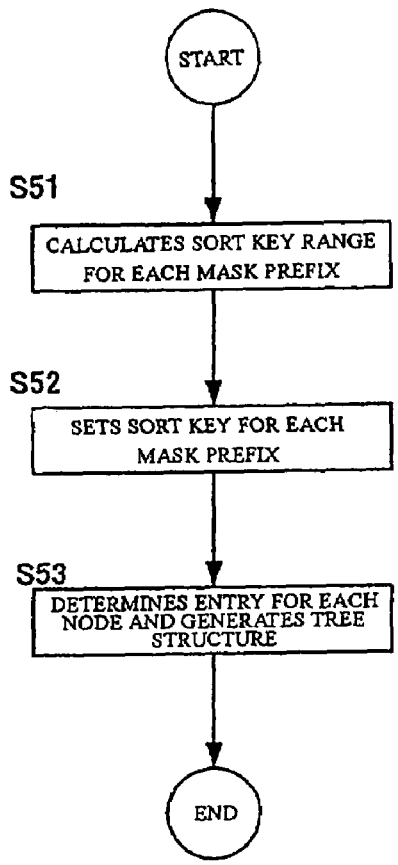
[Figure 17]
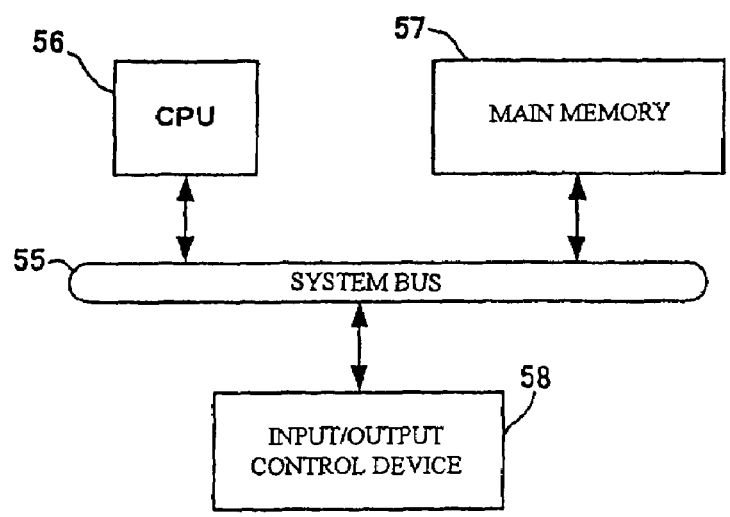

[Figure 18]
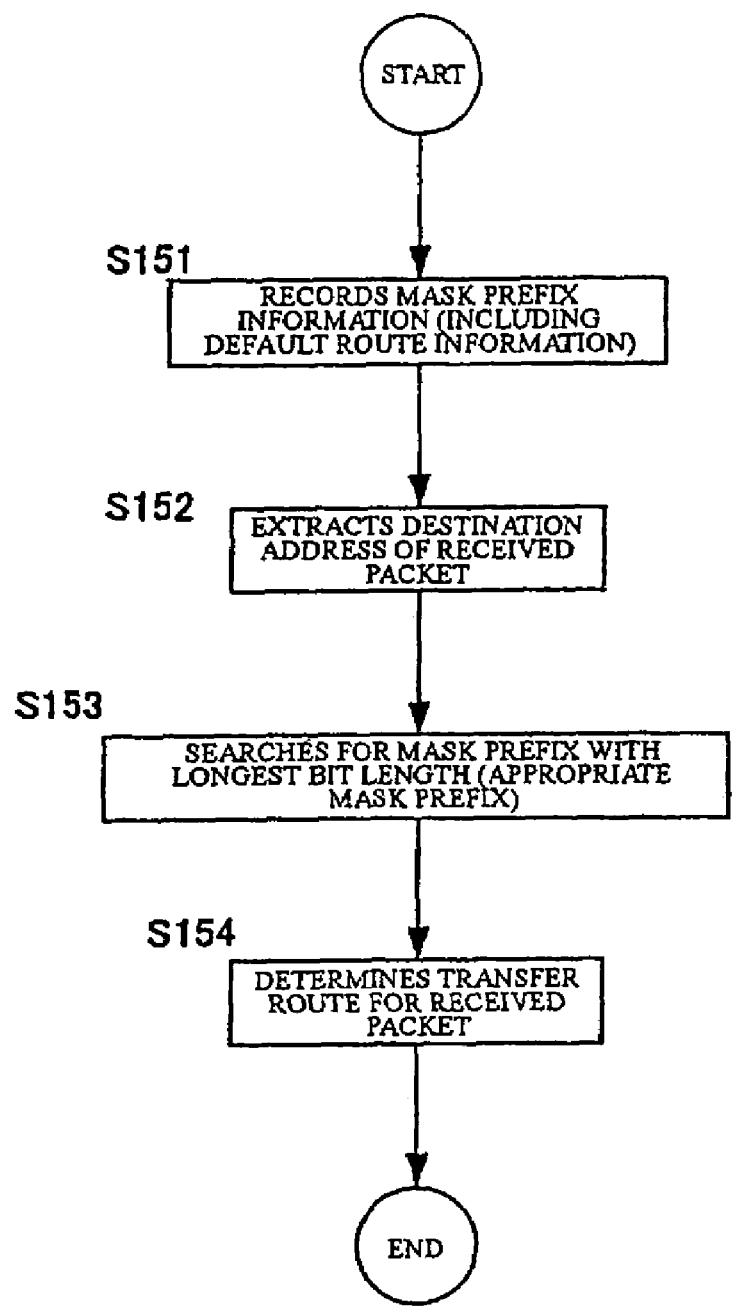

[Figure 19]
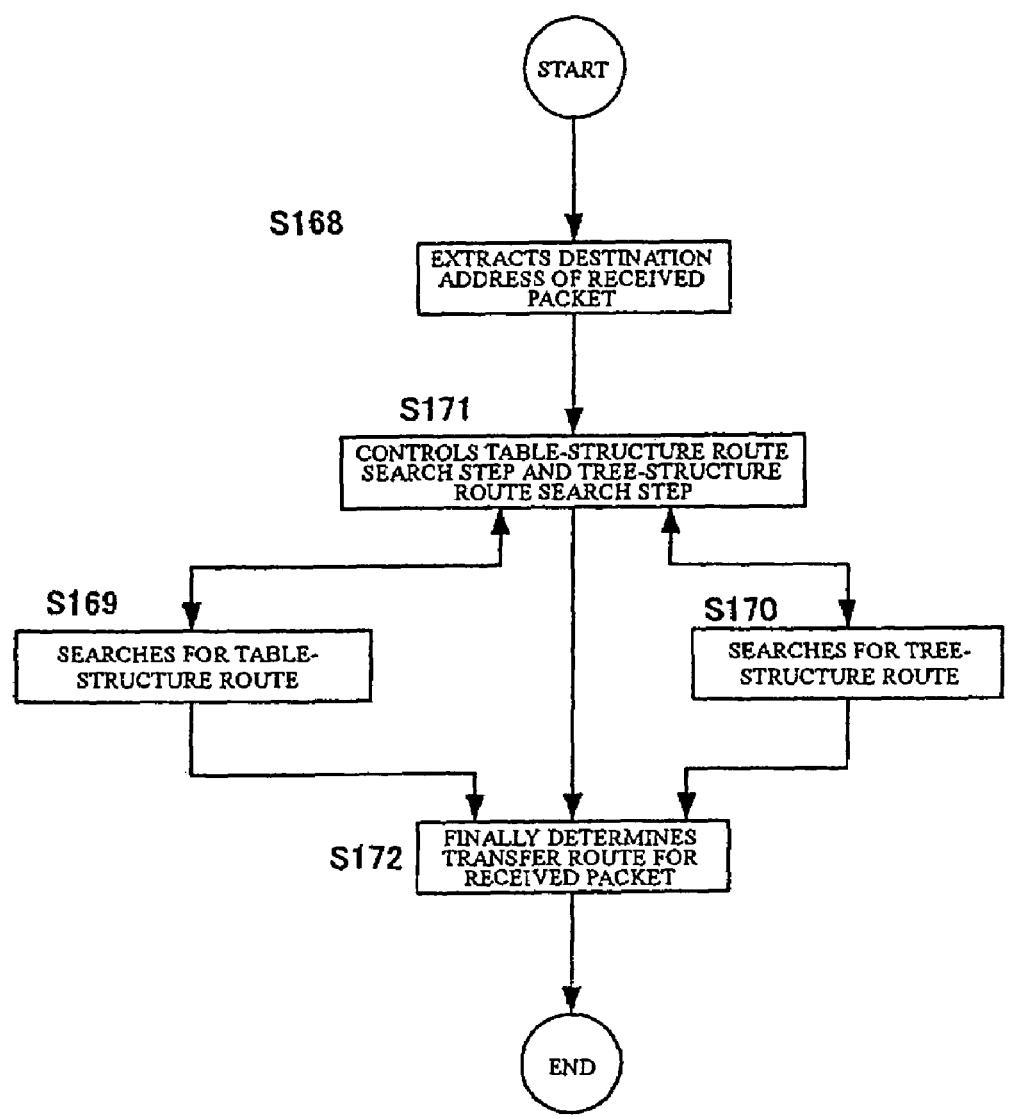

[Figure 20]
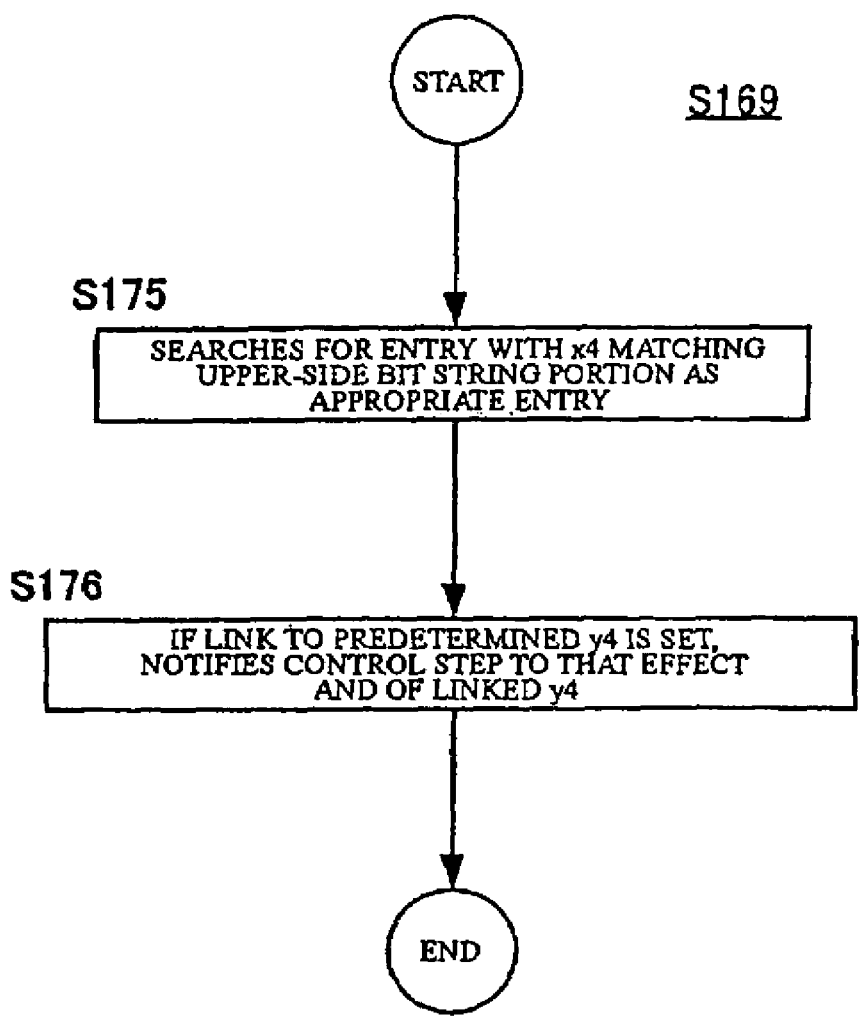

[Figure 22]
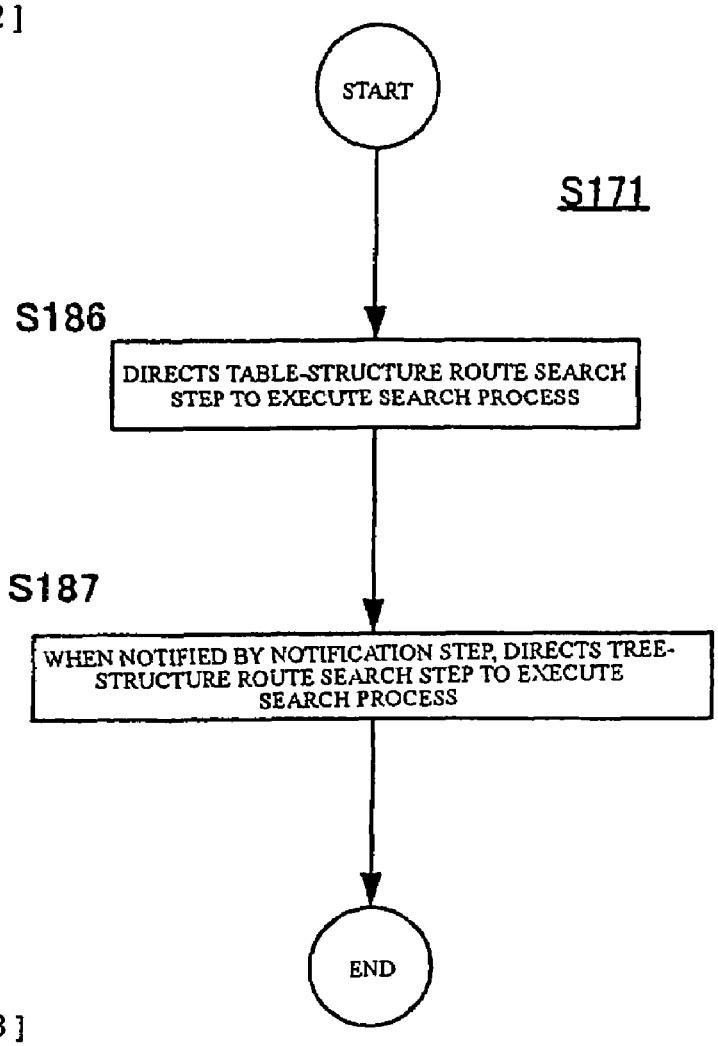
[Figure 23]
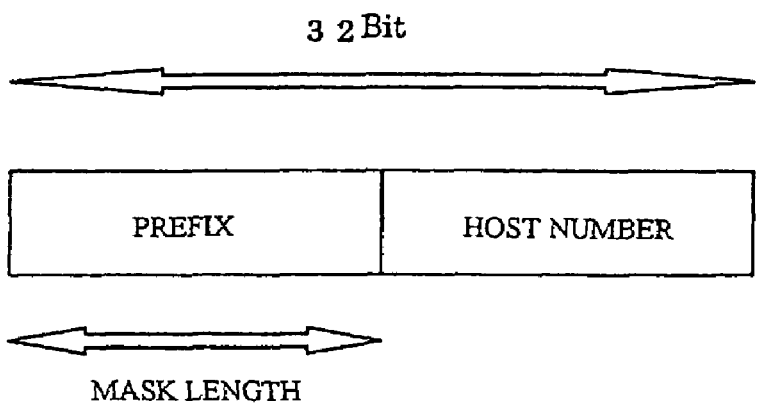

[Figure 24]

| PREFIX (BINARY EXPRESSION) | MASK BIT LENGTH | CONVENIENT NAME |
|---|---|---|
| 101110 | 7 | A |
| 1010 | 5 | B |
| 101 | 4 | C |
| 1010110 | 8 | D |
| 101001 | 7 | E |

[Figure 25]

| PREFIX | MASK BIT LENGTH | SORT KEY | CONVENIENT NAME (ORIGINAL NAME + NUMBER) |
|---|---|---|---|
| 1010 | 5 | 1010000 | B1 |
| 101001 | 7 | 1010010 | E1 |
| 1010 | 5 | 1010100 | B2 |
| 1010110 | 8 | 1010110 | D1 |
| 1010 | 5 | 1010111 | B3 |
| 101 | 4 | 1011000 | C1 |
| 101110 | 7 | 1011100 | A1 |
| 101 | 4 | 1011110 | C2 |

[Figure 26]
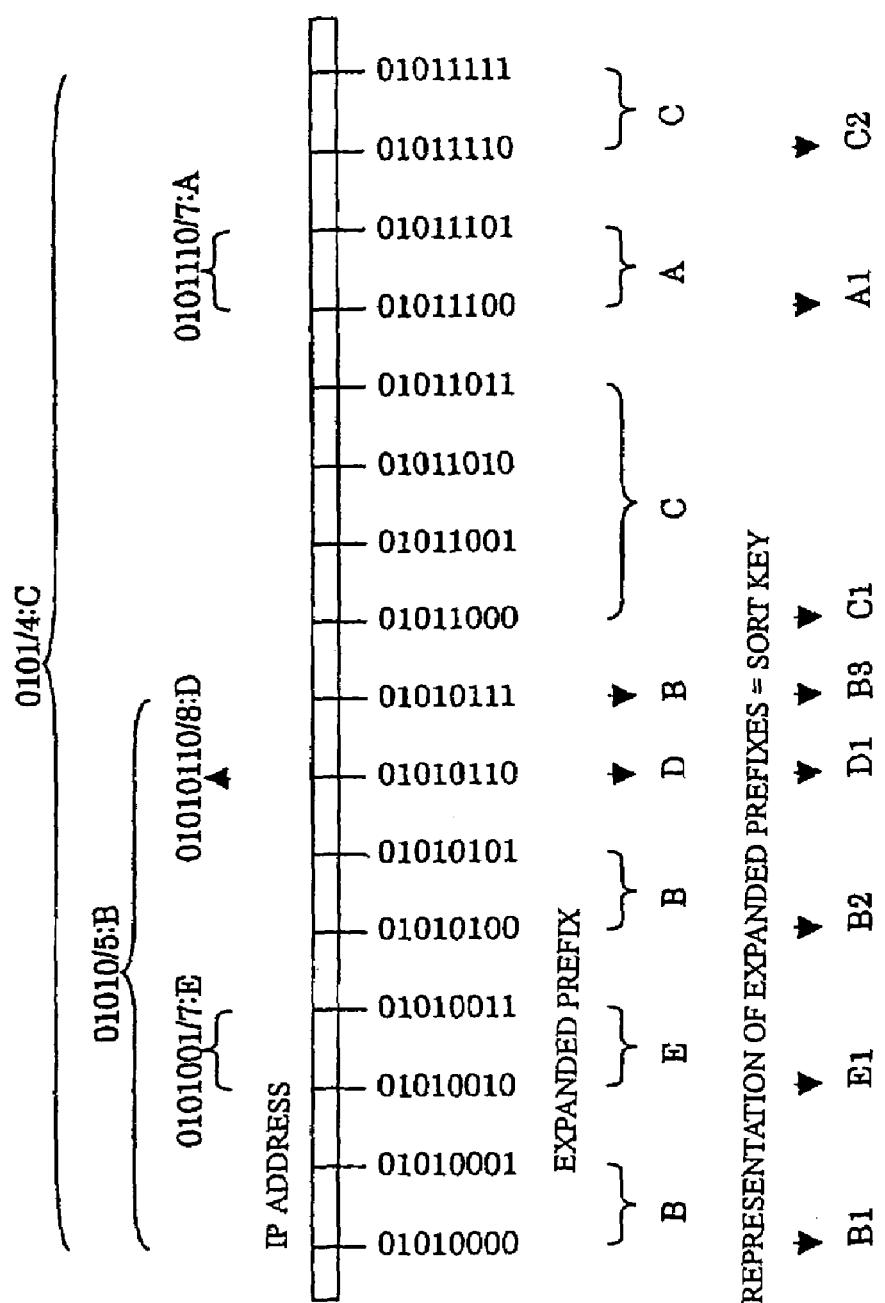

[Figure 27]
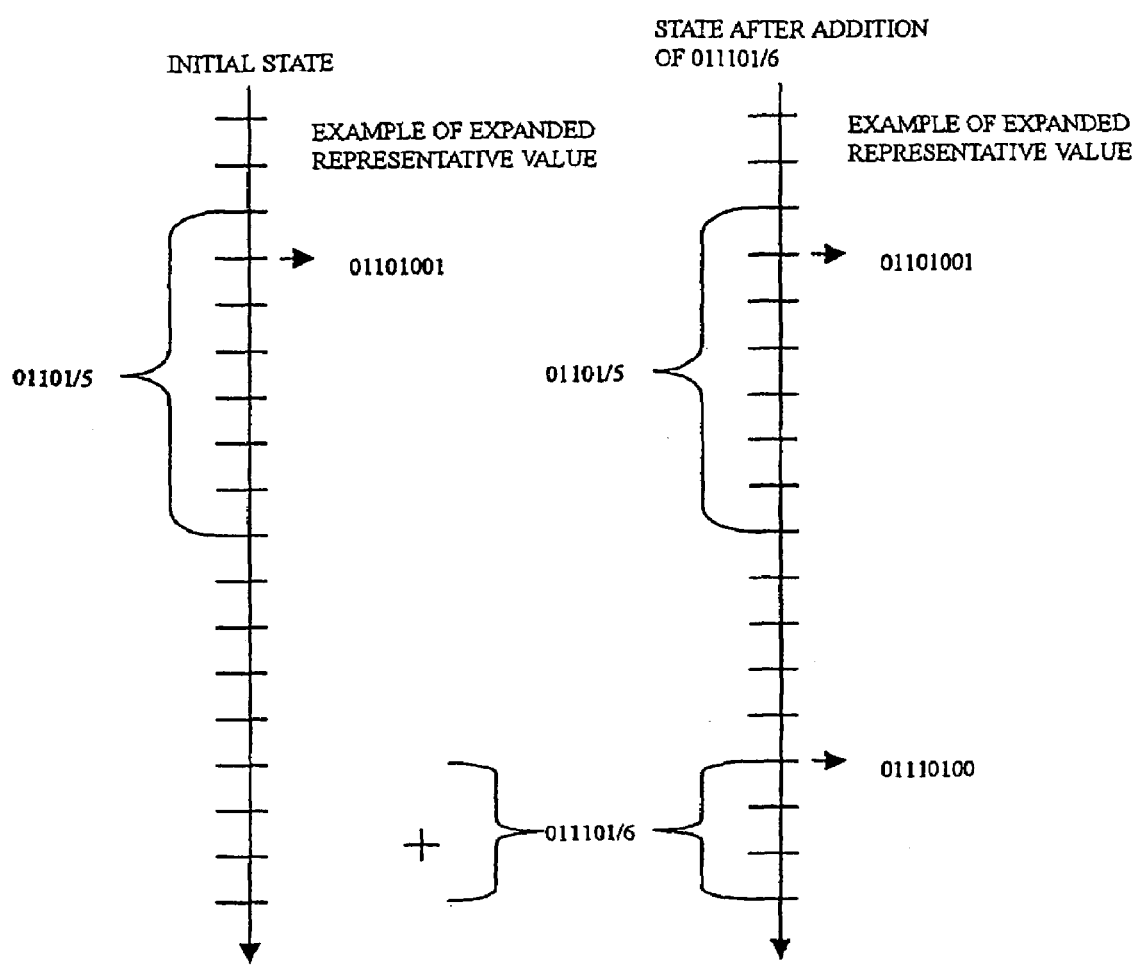

[Figure 28]
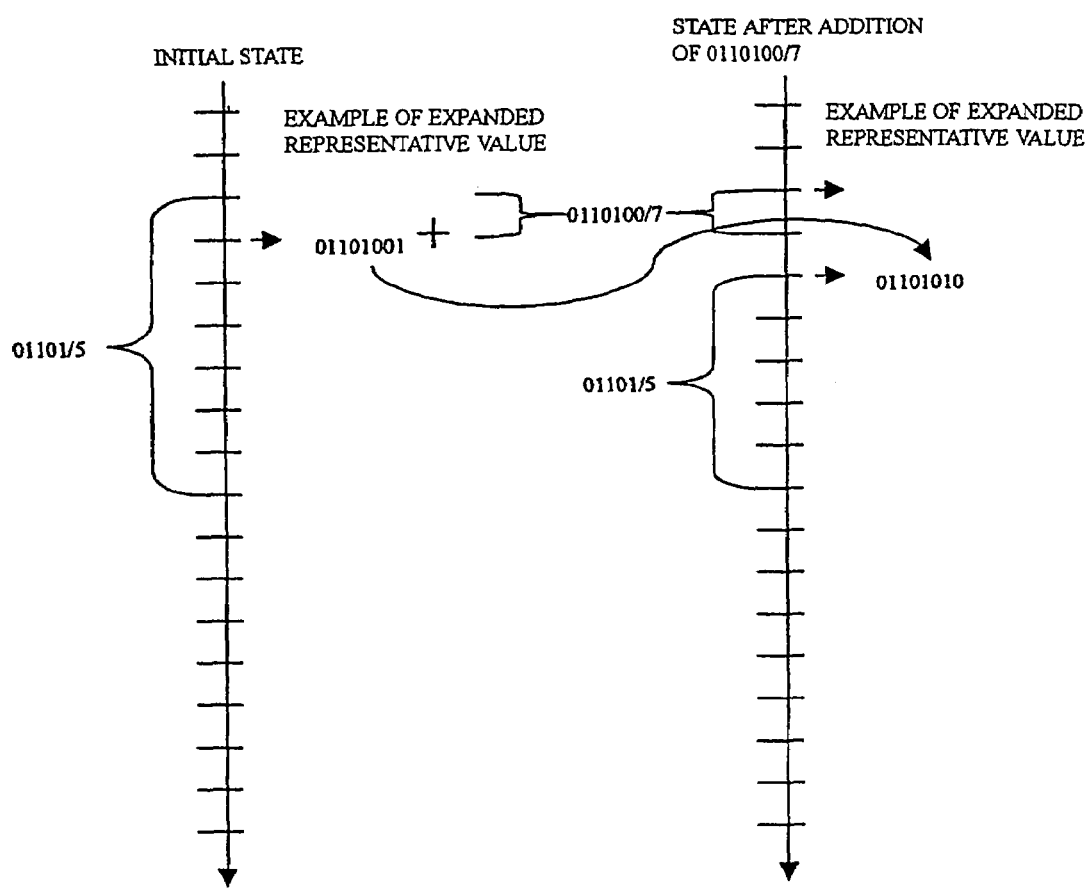

[Figure 29]
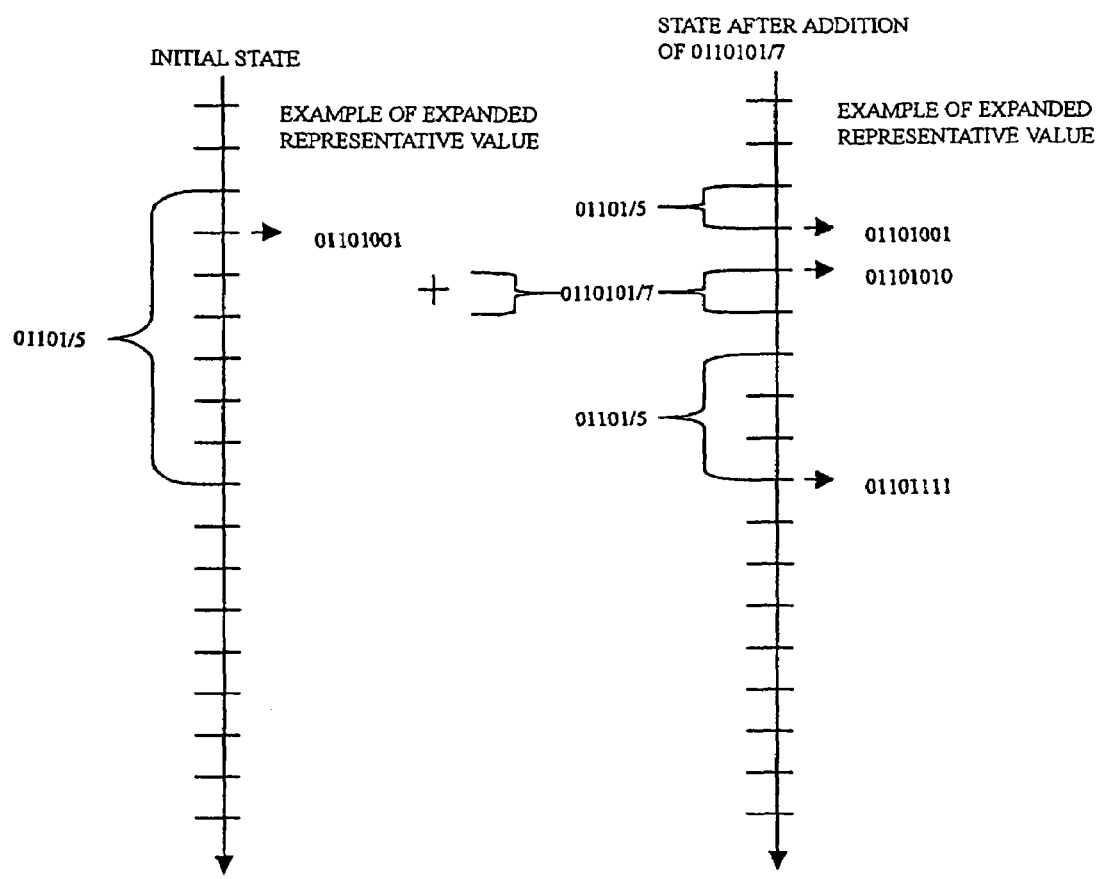

[Figure 30]
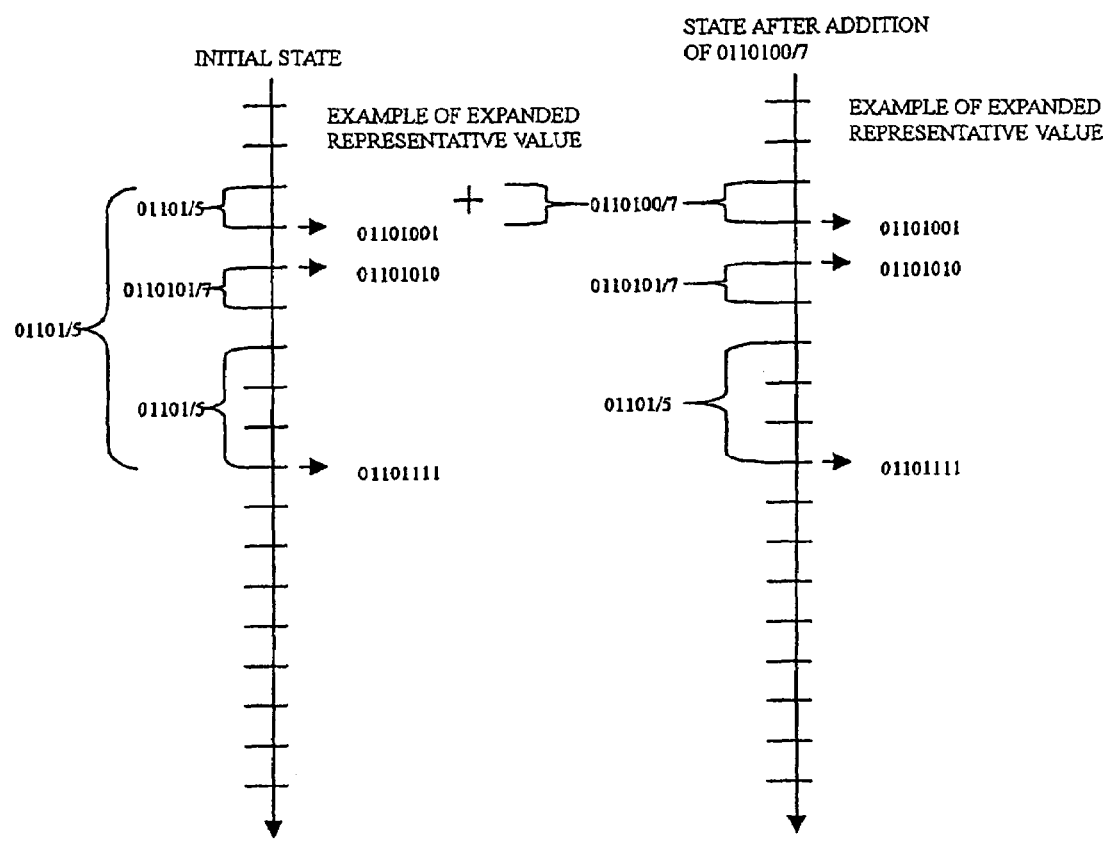

[Figure 31]
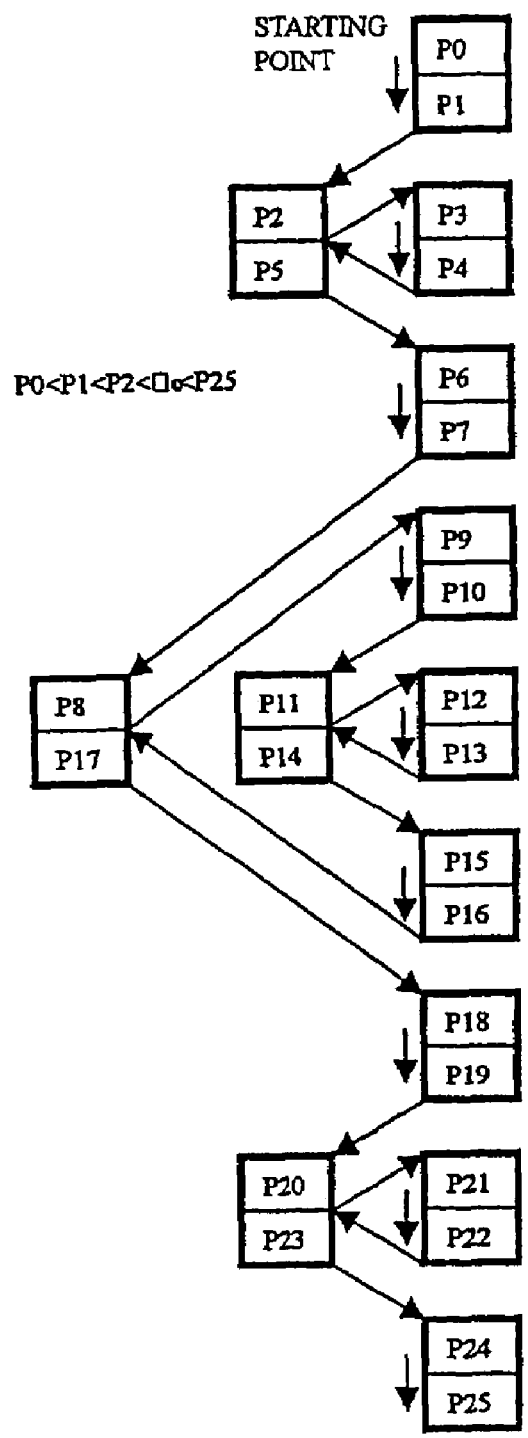

[Figure 32]
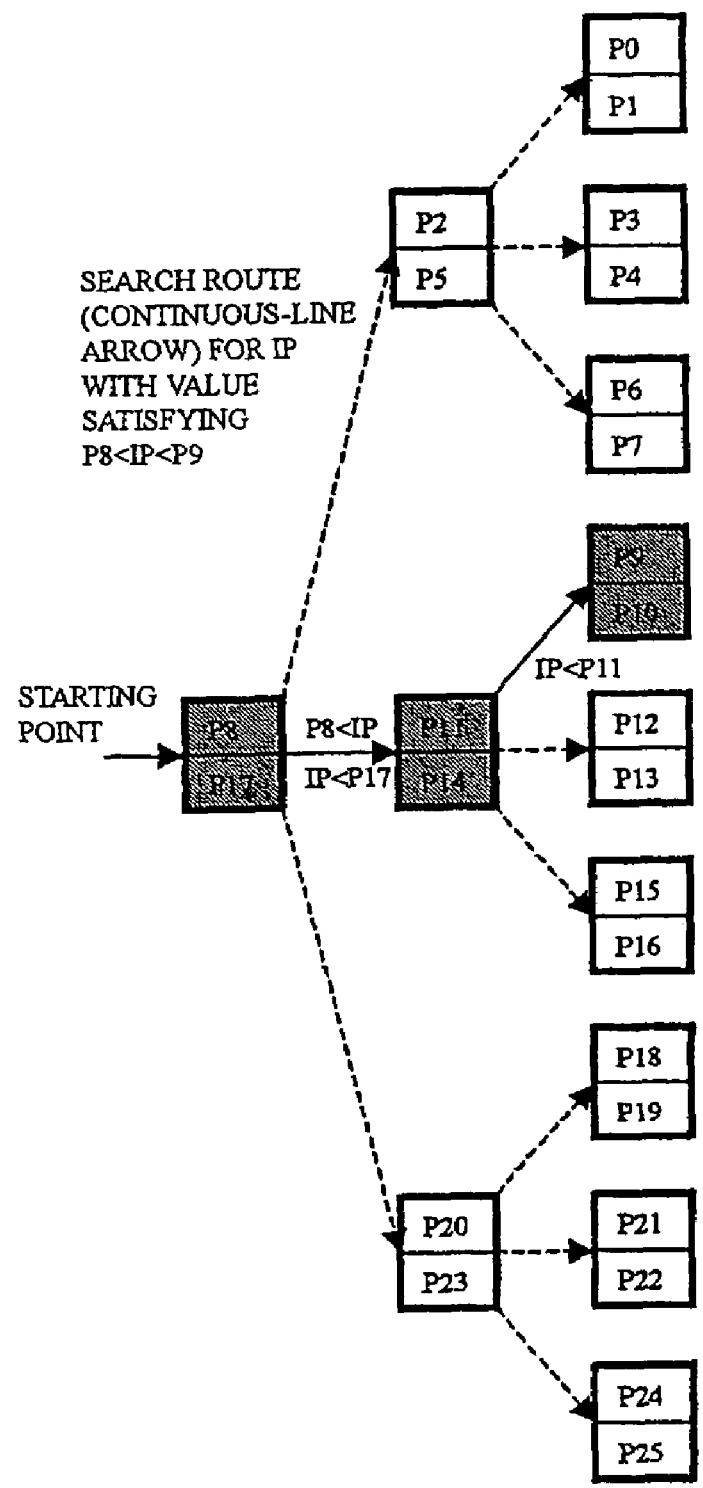

[Figure 33]
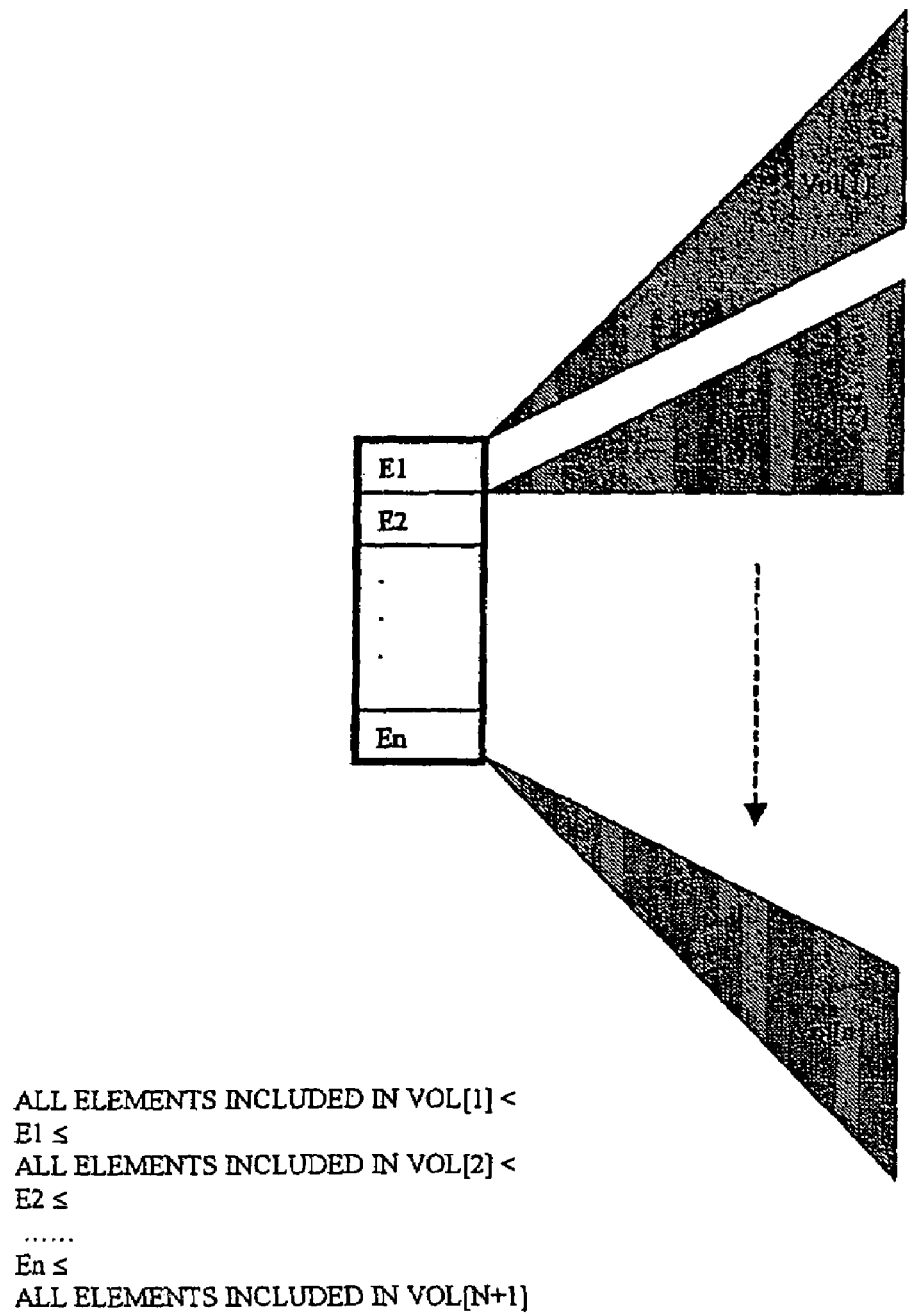
ALL ELEMENTS INCLUDED IN VOL[1] <
E1 ≤
ALL ELEMENTS INCLUDED IN VOL[2] <
E2 ≤
......
En ≤
ALL ELEMENTS INCLUDED IN VOL[N+1]

[Figure 34]
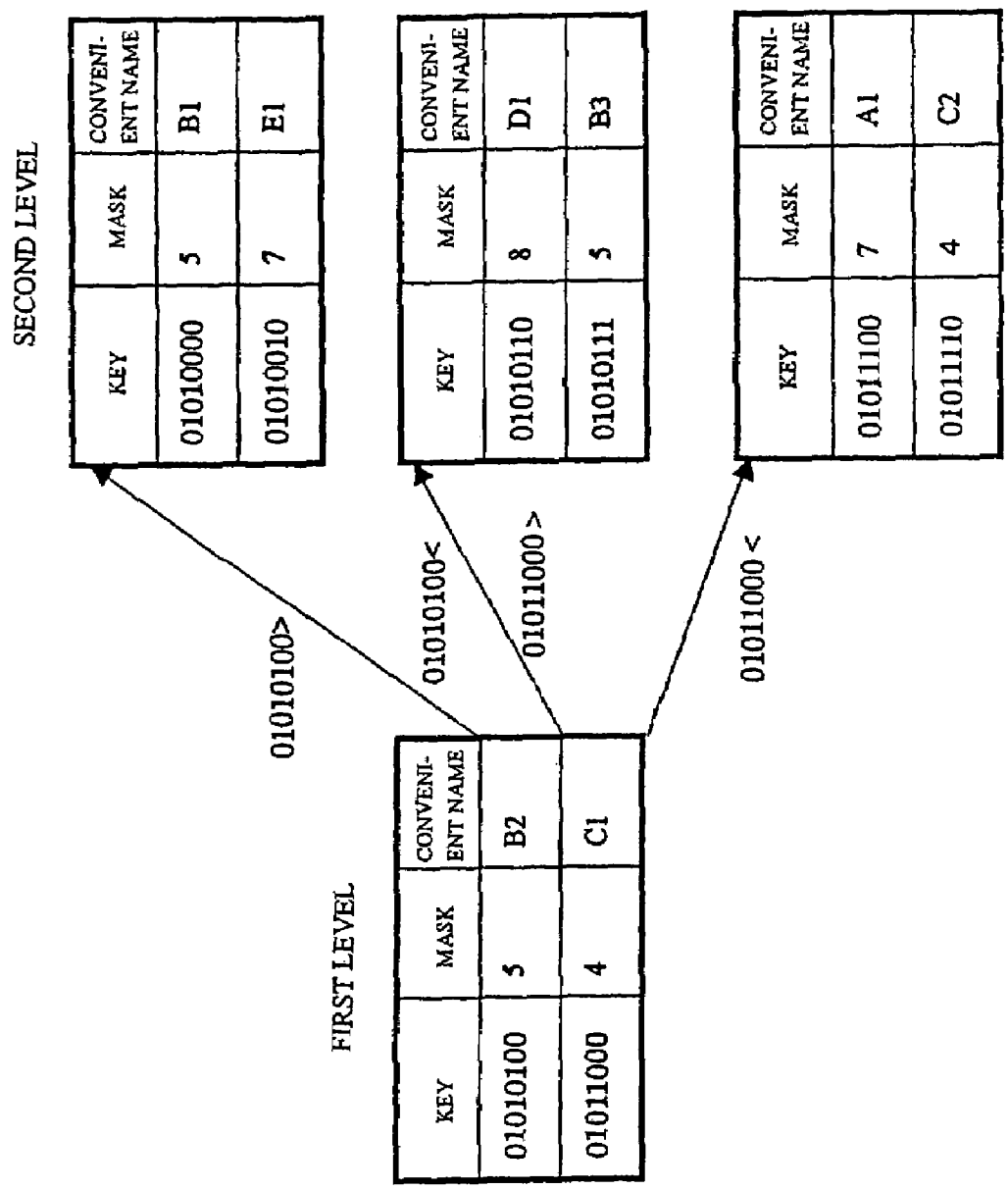

[Figure 35]
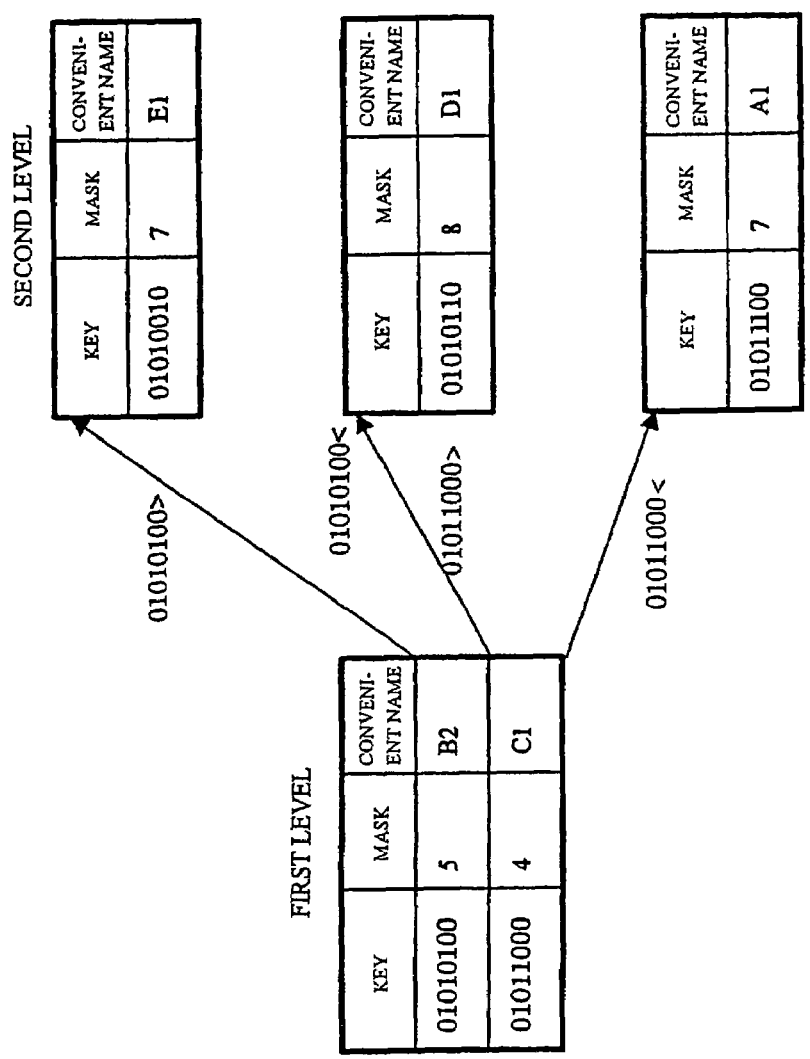

[Figure 36]
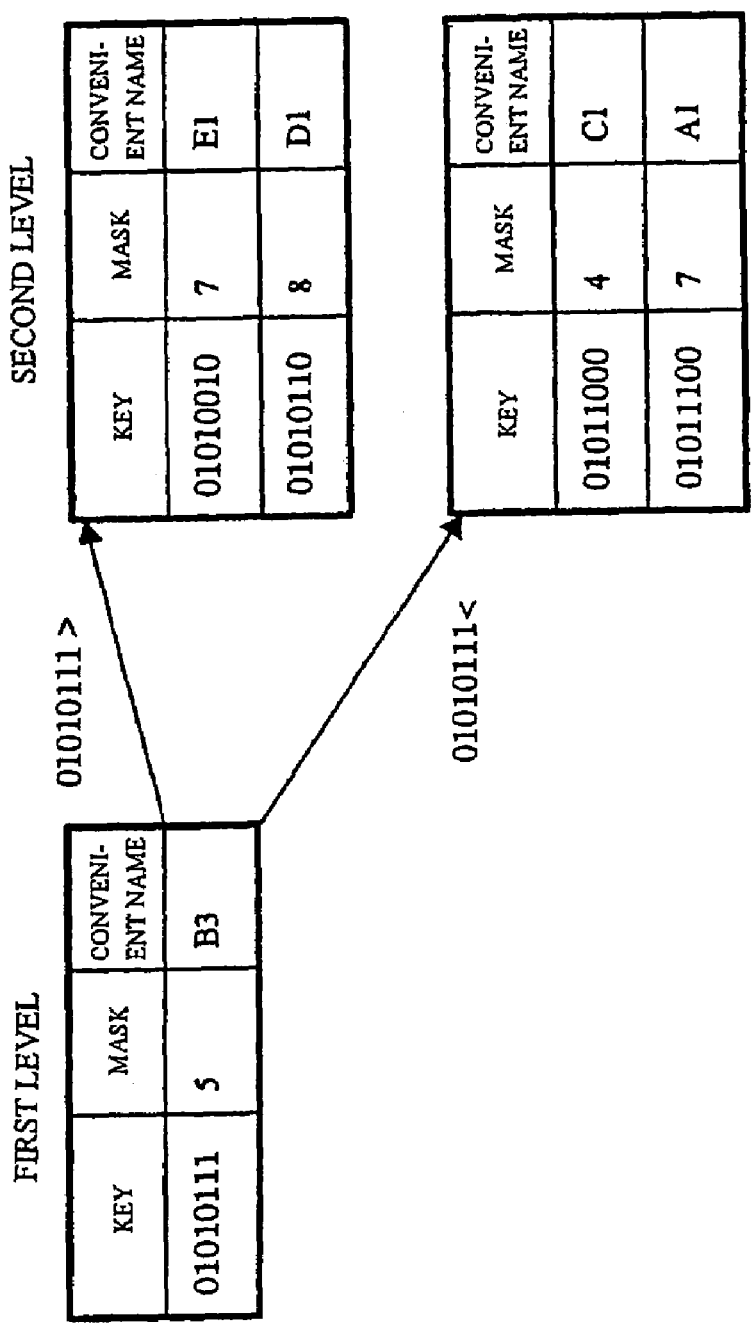

[Figure 37]
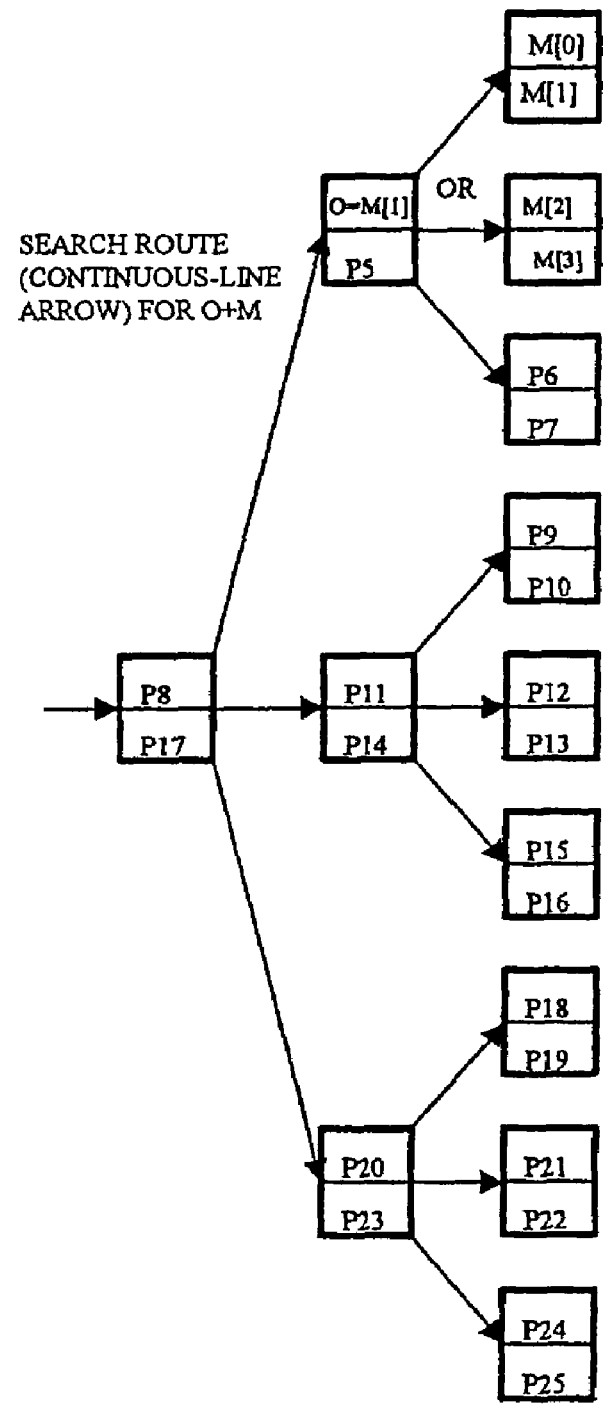

[Figure 38]
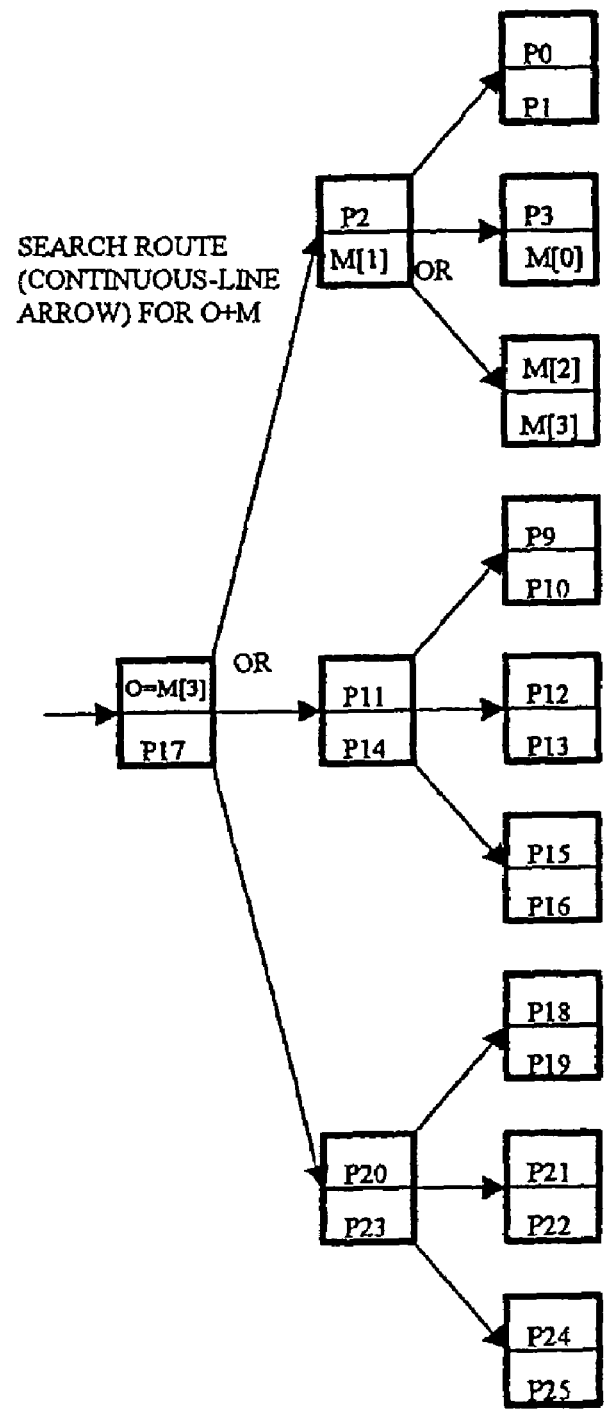

[Figure 39]
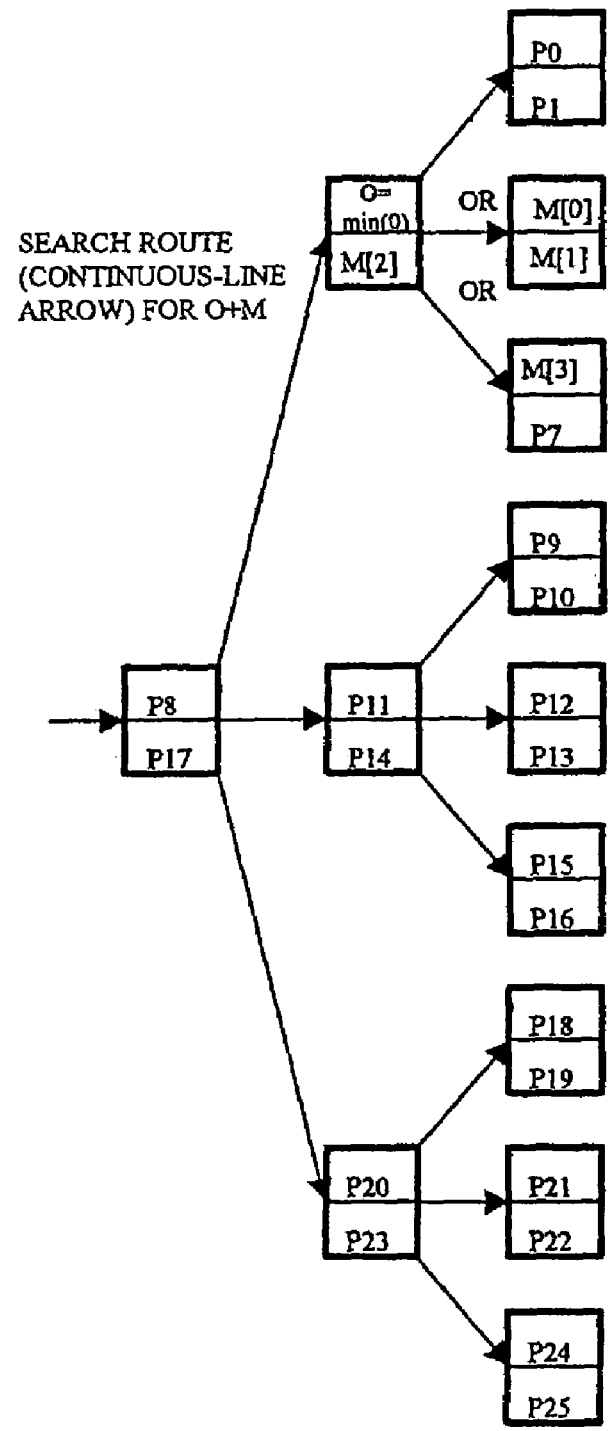

[Figure 40]
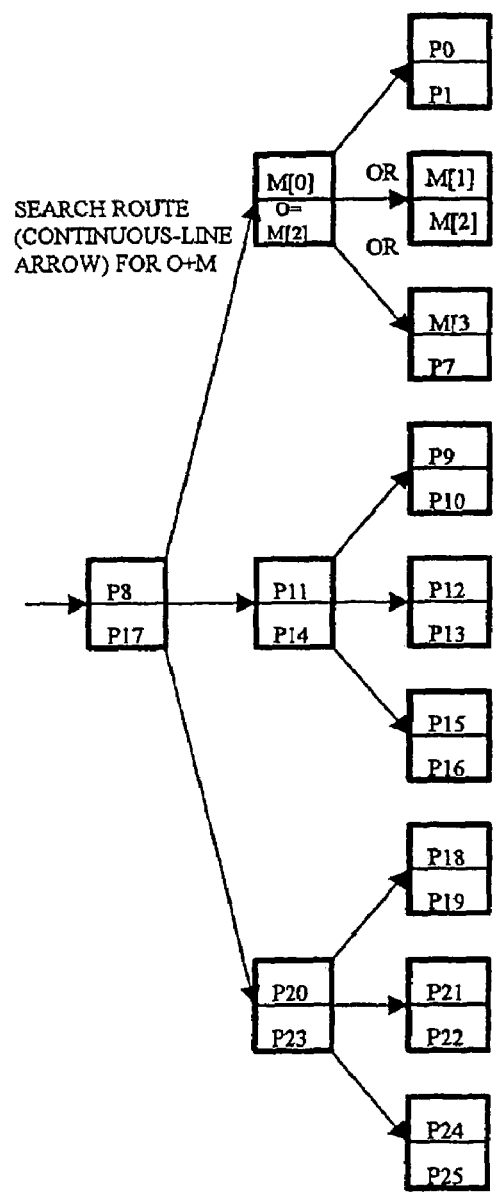

[Figure 41]
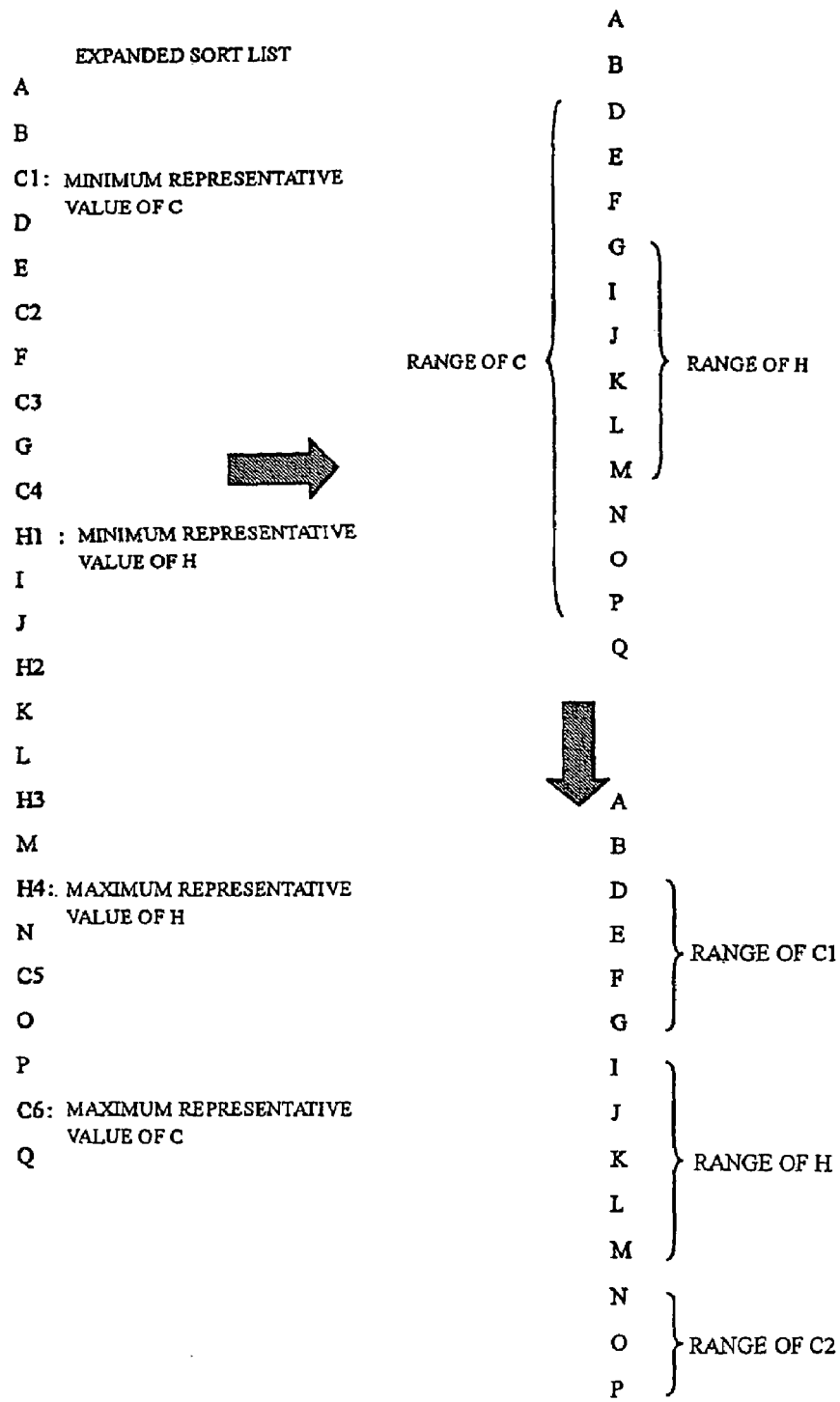

[Figure 42]
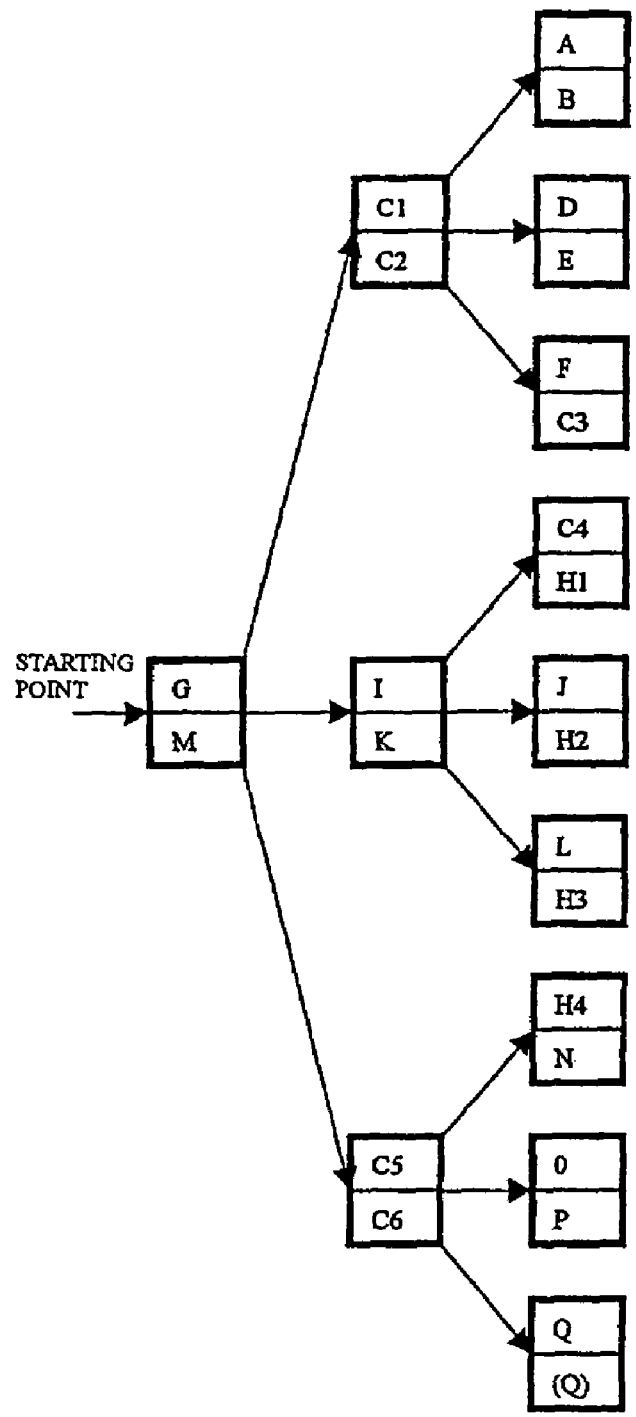

[Figure 43]
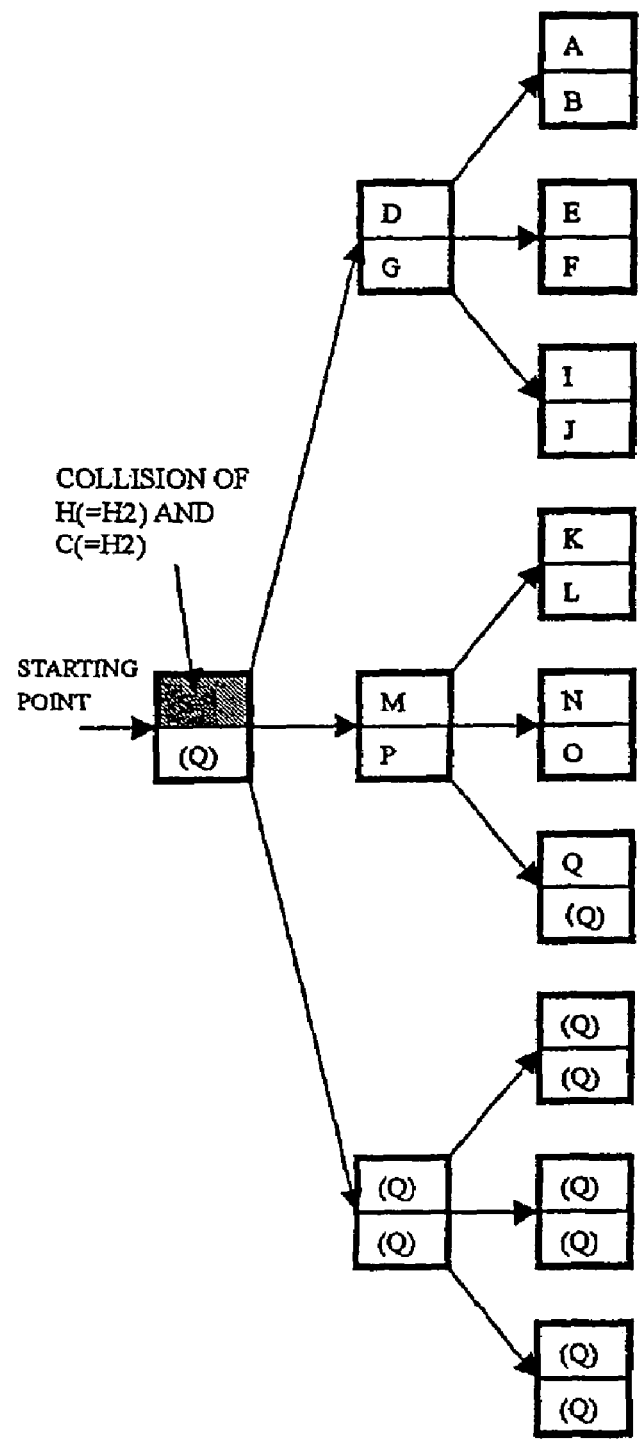

[Figure 44]
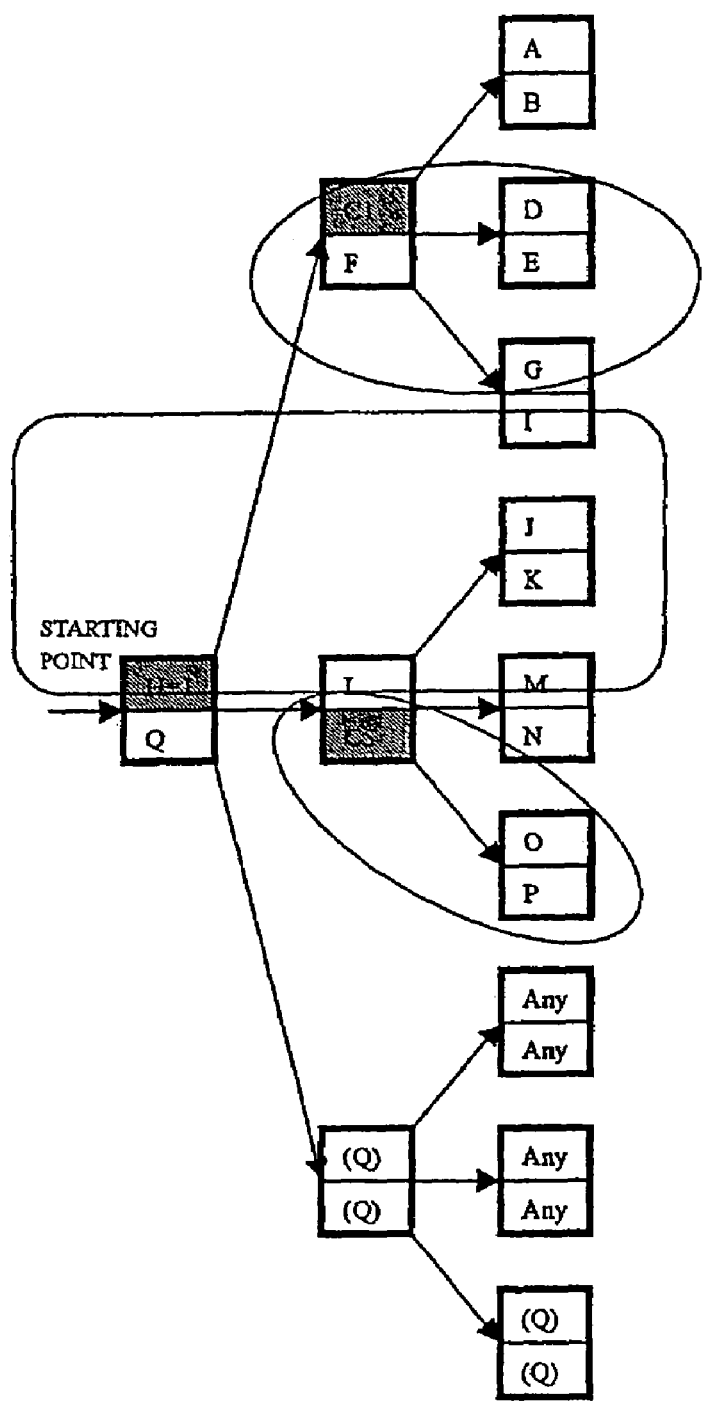

[Figure 45]
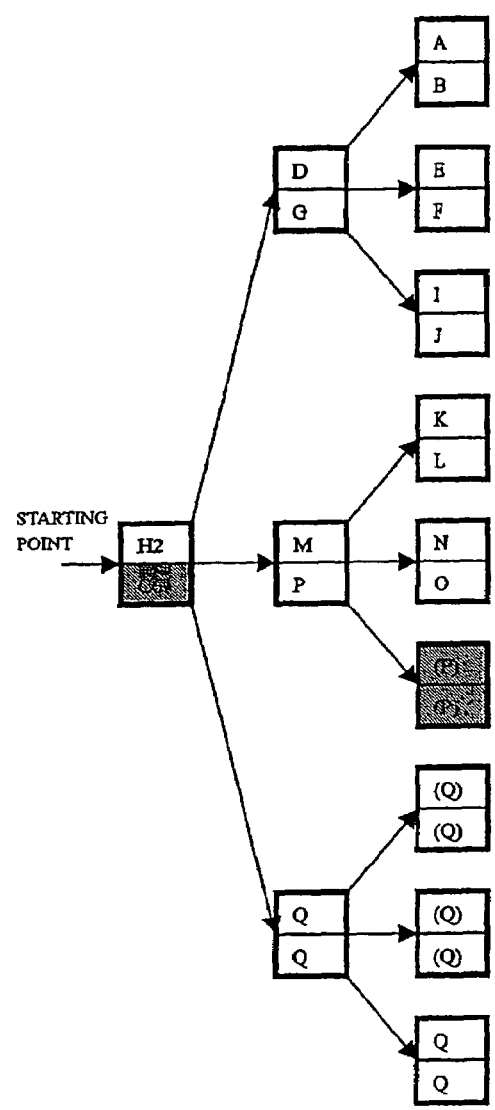

[Figure 46]
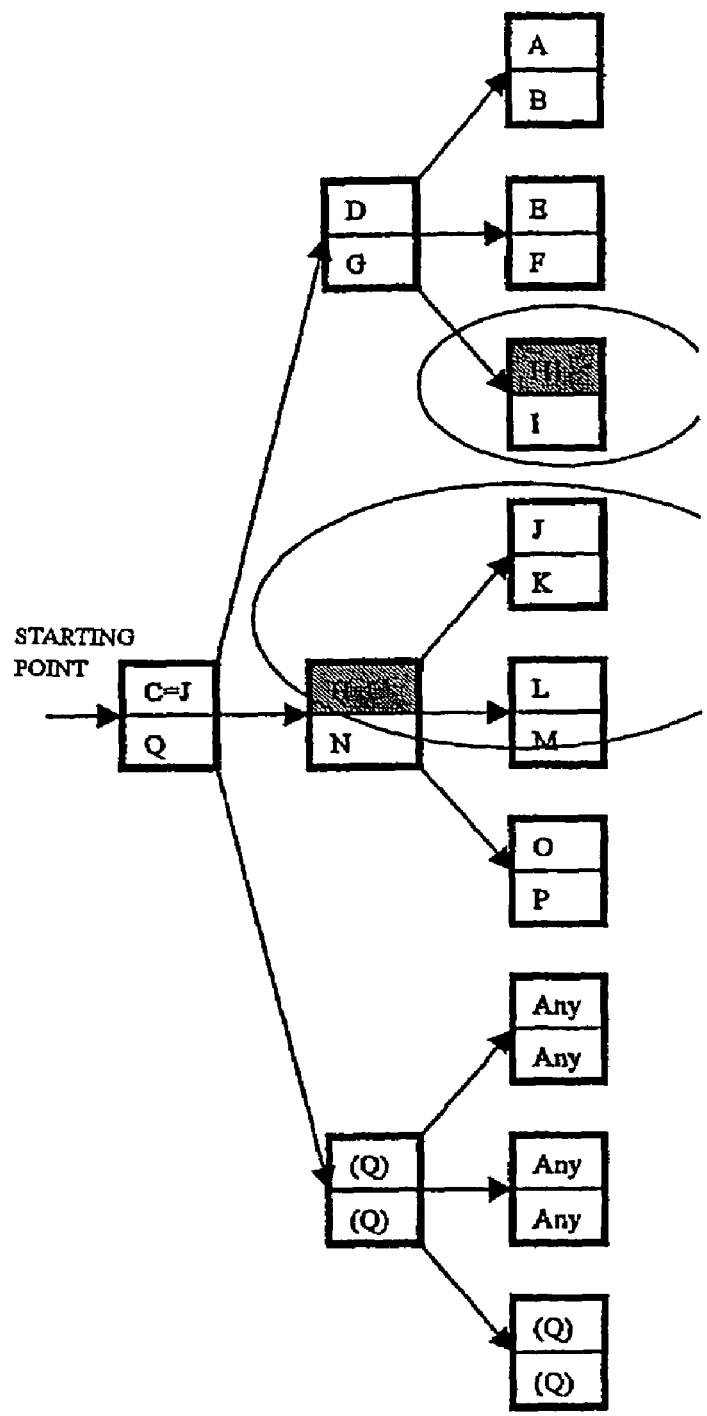

[Figure 47]
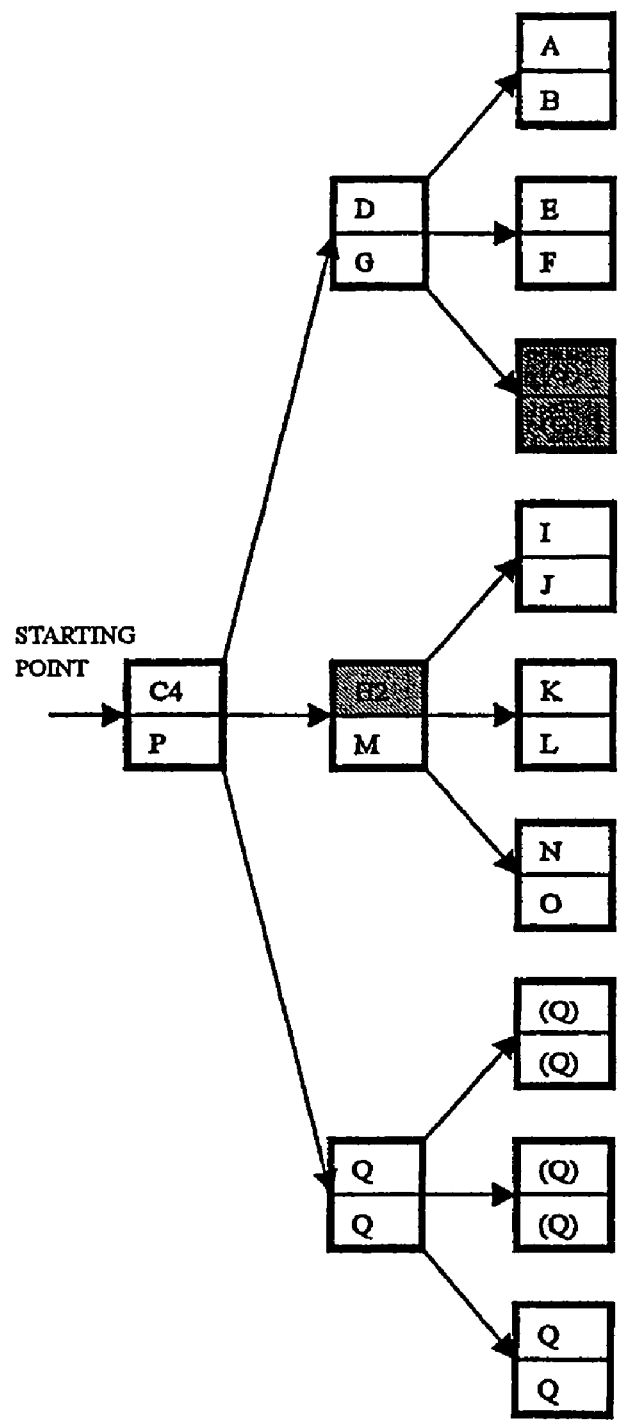

US 7,460,538 B2

COMMUNICATION CONTROL APPARATUS AND METHOD FOR SEARCHING AN INTERNET PROTOCOL ADDRESS

BACKGROUND OF THE INVENTION

The present invention relates to a communication control apparatus and to a method for determining the next transfer route for a packet received by way of its destination address and, more particularly, to a communication control for improving the efficiency in detecting a mask prefix.

In an IP (Internet Protocol) such as IPv4 (Internet Protocol Version 4), when communicating beyond a LAN (local area network), a destination IP address is included in the protocol sent to the router, which is then transferred by the router to establish communication with a target address. In a router product, such as a network router and an L3 switch, a system is capable of supporting more than one hundred thousand IP addresses, and also support a large plurality of servers and clients. However, when identifying an appropriate transfer destination port from the IP addresses, the system has to search all the IP addresses it holds to find the transfer destination port corresponding to the IP address.

Terminology

Techniques known in the art and underlying concepts in the IP address search field will be described hereinafter.

Router is defined as a device for transferring the protocol to an appropriate transfer destination based on the destination IP address information on the protocol sent thereto.

IP address structure. An IP address of IPv4 which is based on a CIDR (Classless Inter-Domain Routing) configuration consisting of a total of 32 bits reserved for the prefix and the host address. The boundary varies by 1 bit and differs according to the IP addresses.

Routing table. It is based on fixed routing information and on the routing information obtained from a protocol such as RIP (Routing Information Protocol) and OSPF (Open Shortest Path First). The router creates a routing table, i.e., a database using a prefix as a key (also referred to as "a network address" in the router). The prefix contains what has been aggregated. "To aggregate" refers to replacing multiple entries having a prefix, the upper bits thereof being common and directed to the same destination by way of a prefix entry having a shorter mask.

The router searches the routing table based on the destination IP address of the protocol to be transferred in order to obtain corresponding routing information, and transfers the protocol based on the routing information. The prefix is used as the search key for the routing table. The prefix, however, has a variable length, and the mask information is not included in the protocol. Thus, an entry with the longest prefix from the matching prefixes in the routing table is used.

The operation of an IPv4 router is known in the art. A method for sequentially searching a Patricia Tree and accelerating a field thereof using CAM (content-addressable memory) and the like, are utilized in the search process based on the mask having a variable length. By contrast, in Japan Published Unexamined Patent Application No. 2000-349811, it is disclosed that in order to simplify a hardware device for resolving the network address, the destination address is divided by a predetermined number of bits starting from the most significant bit (MSB), and having the divided field to be associated with nodes in the tree structure in a manner such that the lower divided field becomes the node at a lower hierarchy of the tree structure. Relay nodes and boundary nodes that do not correspond to the routing information are set to route nodes corresponding to the routing information.

SUMMARY AND OBJECTS OF THE INVENTION

In a conventional IPv4 router, a backbone router requires a 128k-entry transfer table, which is too large for CAM and for which the sequential search of a maximum of 32 steps in a Patricia Tree consumes too much processing time, causing an increase in the latency of the Internet communication.

In the search device according to Japan Published Unexamined Patent Application No. 2000-349811, the number of hierarchies in the tree structure exceeds the number of divided field of the destination address and, as a result, the number of hierarchies in the tree structure significantly increases in for an IPV6, which IP address is of the order of 128 bits in length. Furthermore, the number of hierarchies in the tree structure also increases by the existence of relay nodes and boundary nodes that do not correspond to the routing information. Consequently, the number of hierarchies in the tree structure also increases significantly when there are mask prefixes in multiple nest relations, that is, $Pr1 \subset Pr2 \subset Pr3 \subset \ldots$ (although Pr1, Pr2, ... differ in the length of the mask, and the mask prefix of Pr1 matches the upper side bit string field of Pr2, the mask prefix of Pr2 matches the upper side bit string field of Pr3, etc.). An increase in the number of hierarchies in the tree structure has a drawback because it increases the number of comparison steps required to determine the network address from the destination address, causing a significant increase in the search time. Furthermore, the number of entries for each node is limited to one, and the number of links from each node to lower nodes is a maximum of two. Thus, it is to insert a significant number of relay nodes between the routing nodes to obtain an accurate search result. In addition, since as many leaf nodes are required as the number of mask prefixes, the number of nodes in the entire tree structure is the number of mask prefixes in addition to the number of routing nodes other than the leaf nodes, relay nodes and boundary nodes. The large number of nodes causes the tree structure to be highly complex.

Accordingly, it is an object of the present invention to provide a communication control apparatus and method for reducing the number of hierarchies and the number of nodes relative to the number of mask prefixes. This shortens the total processing time in the tree structure related to the search information that determines the next transfer route for the packet received by way of its destination address.

A communication control apparatus according to the present invention includes a storage device for storing search information used to determine the next transfer route for a packet received based on its destination address, and a route search device to search for the transfer route of the packet received based on search information associated with the tree structure, with each node in the tree structure having at least one entry, each mask prefix being associated with at least one entry, each entry including information on the number of bits of the mask prefix (hereinafter referred to as "a mask length") associated therewith, and a sort key. The number of bits of the sort key is set to be greater than or equal to the longest mask length amongst the mask lengths of all mask prefixes. The upper side field and the lower side field of the bit string is subdivided into an upper side bit string and a lower side bit string, respectively. The upper side bit string of each sort key is set to match the mask prefix associated with the entry having that sort key. Entries are assigned to predetermined nodes of the tree structure based on the sort order of their respective sort keys. Each node has an entry list wherein multiple entries included therein are sorted based on their sort keys. Each node, except the leaf nodes, are linked via the branch related to the entry in the entry list of nodes to each node at the next lower hierarchy. The route search device is provided with means for extracting a destination address of the packet received (the extracted destination address will be referred hereinafter to "an extracted address"); inside-node matching entry search means for searching each search target node corresponding to the entry having information on the mask prefix that matches the upper side bit string field of the extracted address in the search target node deemed to become a matching entry in order to determine whether there is only one, i.e., the only entry to become the inside-node matching entry, and if there are multiple entries, finding an entry having information on the mask prefix with the longest mask length amongst the matching entries which then becomes the inside-node matching entry; search control means for specifying a search target node to the inside-node matching entry search means, the search control means selecting a link based on a comparison of the sort key of each entry in each search target node with the extracted address to determine the node related to the selected link to become the next search target node; determining that the node-by-node search process is terminated if a link does not exist; and transfer route determining means for determining the transfer route for the packet received related to the extracted address based on the mask prefix having the longest mask length amongst the mask prefixes associated with multiple inside-node matching entries related to the extracted address after the node-by-node search process is terminated.

Each means in the route search device of the communication control apparatus can be implemented either in software or hardware. The communication control apparatus is, e.g., a router. The communication control apparatus, however, is not limited thereto, and other communication control apparatus such as a bridge are also included. For the router, the destination address is the IP address which is entered in the header of the IP packet, namely, the packet to be received. In the router, what corresponds to a mask prefix, is also referred to as a network address and a destination network prefix.

In the present invention, the inside-node matching entry search means of the route search device checks for a search target node all the entries corresponding to the search target node against the extracted address, and the search control means determines the next search target node among the nodes, the maximum number thereof being the total number of entries of the node currently searched +1. As a result, in the tree structure to be associated with the search information, the number of nodes and hierarchies are reduced, thereby shortening the time required for searching for the next transfer route of the packet received.

When implementing a matching comparison in hardware, it is desirable that the total number of entries belonging to each of nodes in one or multiple hierarchies match that of the remaining nodes so that a hardware comparator can be shared.

As described hereinafter in the preferred embodiment, in order to improve the tree structure to provide search information, the number of entries associated with one mask prefix may decrease by thinning out the entries. This thinning out process causes the number of entries to be smaller than the maximum number of entries included in the tree structure. Therefore, the current mask prefix is determined only by searching higher hierarchy nodes without having to search for the lowest hierarchy nodes. In such a case, the search for the lowest hierarchy nodes may be terminated earlier as appropriate to advance the termination time. Thus, the leaf node according to the present invention is not limited to a node at the lowest hierarchy. A node without links to a node at a lower hierarchy becomes the leaf node even if it is not a node in the lowest hierarchy of the tree structure. Furthermore, when the number of entries of a given node is assumed to be m, the number of links from the certain node to nodes of a lower hierarchy is not limited to m+1; thus, an accurate search result may be obtained even if the total number is below m+1.

A communication control method according to the present invention stores search information to determine the next transfer route for a packet received by way of its destination address, and further searches for a transfer route for the packet received based on the search information. The search information is associated with a tree structure, where each node of the tree has at least one entry, each mask prefix is associated with at least one entry, each entry includes information on the number of bits of the mask prefix (referred hereinafter to "a mask length") associated therewith and, finally, a sort key. The number of bits in the sort key is set to be equal to the longest mask length of the mask lengths of all the mask prefixes. The upper side field and the lower side field of the bit string are referred to the upper side and lower side bit string field, respectively. The upper side bit string field of each sort key is set to match the mask prefix associated with the entry having the sort key. Entries are assigned to predetermined nodes of the tree structure based on the sort order of the sort keys. Each node has an entry list in which the plural entries included therein are sorted by the sort keys, and each node except the leaf nodes are linked via the branch related to the entry in the entry list of the node to each node at the next lower hierarchy. The communication control method includes: an address extracting step of extracting the destination address of the packet received; an inside-node matching entry search step for searching each search target node of an entry that is provided with information on the mask prefix matching the upper side bit string field of the extracted address in the search target node; a step for determining whether an entry is the only appropriate entry, in which case this entry becomes the inside-node matching entry and, further, a step wherein if there are multiple matching entries, finding the entry having a mask prefix with the longest mask length of all the matching entries that are to become the inside-node matching entry; a search control step to determine a search target node at the inside-node matching entry search step, the search control step selecting a link by comparing the sort key of each entry in each search target node with the extracted address to determine whether the node is related to the selected link to become the next search target node, a step for determining that the node-by-node search process terminates when the link does not exist; and a transfer route determining step of determining the transfer route for the packet received related to its extracted address based on the mask prefix with the longest mask length amongst the mask prefixes associated with multiple inside-node matching entries related to the extracted address after the node-by-node search process is terminated.

The communication control program according to the present invention causes a computer to execute each step of the communication control method.

The data structure for the communication control relates to searching information that determines the next transfer route of the packet received by way of its destination address. The search information is associated with a tree structure. Each node in the tree structure has at least one entry. Each mask prefix is associated with at least one entry. Each entry includes information on the number of bits of a mask prefix associated therewith, and a sort key. The number of bits of the sort key is set to be greater than or equal to the longest mask length from the mask lengths of all mask prefixes. The upper side field and the lower side field of a subdivided bit string are referred to the upper side bit string field and the lower side bit string field, respectively, and the upper side bit string field of each sort key is set to match the mask prefix associated with the entry having the sort key. Entries are assigned to predetermined nodes of the tree structure based on the sort order of their sort keys. Each node has an entry list in which multiple entries included therein are sorted based on the sort keys. Each node except for the leaf nodes is linked via the branch related to the entry in the entry list of the node to each node of the next lower hierarchy.

BRIEF DESCRIPTION OF THE DRAWINGS

FIG. 1 is a schematic diagram of the communication control apparatus, according to the invention;

FIG. 2 is a block diagram of a communication control apparatus;

FIG. 3 shows the tree structure associated with search information;

FIG. 4 shows an entry table in each node of FIG. 3;

FIG. 5 is a block diagram of a route search device;

FIG. 6 is a block diagram of a tree constructing device;

FIG. 7 is a functional block diagram of an improved communication control apparatus;

FIG. 8 is a functional block diagram of another communication control apparatus;

FIG. 9 is a detailed functional block diagram of a table route search device;

FIG. 10 is a detailed functional block diagram of a tree structure route search device;

FIG. 11 is a functional block diagram of a controller;

FIG. 12 shows examples of generating a default route and a sort key from multiple mask prefixes;

FIG. 13 shows a table wherein search information is subdivided and held in one table and one tree structure;

FIG. 14 shows a set of mask prefixes, where the lower mask prefix field thereof belongs to the tree structures linked to an entry of FIG. 13;

FIG. 15 is a flowchart of a communication control method;

FIG. 16 is a flowchart of the tree structure constructing method;

FIG. 17 shows a hardware configuration for executing a program;

FIG. 18 is a flowchart of a default route implementing communication control method;

FIG. 19 is a flowchart of a second communication control method;

FIG. 20 is a detailed flowchart of a table route search step of FIG. 19;

FIG. 22 is a detailed flowchart of a control step of FIG. 19;

FIG. 23 shows an IP address configuration for IPv4;

FIG. 24 shows an example of a transfer table in which an IP address is assumed to be 8 bits;

FIG. 25 is a transfer table of FIG. 24 expanded with methods 1 and 2 and sorted by the sort keys;

FIG. 26 shows a relation between a prefix and an IP address;

FIG. 27 shows a comparison of the entry generation range before and after adding an entry with a different generation range, to show the change made by the addition;

FIG. 28 shows a comparison of the entry generation range before and after adding an entry, the generation range thereof is at one end of the generation range of an existing entry, to show the change made by the addition;

FIG. 29 shows a comparison of the entry generation range before and after adding an entry, the generation range thereof is at the intermediate field of the generation range of an existing entry, to show the change made by the addition;

FIG. 30 shows a comparison of the entry generation range before and after adding an entry, the generation range thereof is at the intermediate field of the generation range of entries to be derived from an existing entry to show the change made by the addition. The figure shows distribution of entries;

FIG. 31 is an illustration of a method for constructing a tree from sorted entries;

FIG. 32 shows the tree structure obtained by adding links between nodes to the tree of FIG. 31;

FIG. 33 shows relation between each entry in a certain node and the range of entries to be included in a node linked from the certain node;

FIG. 34 shows the tree structure based on the entry list of FIG. 25, which has two levels (hierarchies) wherein each node has two entries and the range associated with each link;

FIG. 35 shows a first tree structure obtained by improving the tree structure of FIG. 34;

FIG. 36 shows a second tree structure obtained by improving the tree structure of FIG. 34;

FIG. 37 shows the tree structure wherein a field of the first tree structure is incorporated therein to reduce the number of entries;

FIG. 38 shows the tree structure wherein a field of the second tree structure is incorporated therein to reduce the number of entries;

FIG. 39 shows the tree structure wherein a field of the third tree structure is incorporated therein to reduce the number of entries;

FIG. 40 shows the tree structure wherein a field of the fourth tree structure is incorporated therein to reduce the number of entries;

FIG. 41 shows the range of each group when two groups of sort keys are derived from the same mask prefix in a sorted list;

FIG. 42 shows a standard tree structure constructed based on the sorted list of FIG. 41;

FIG. 43 shows a simplified standard tree structure of FIG. 42, wherein the sort keys are derived from different mask prefixes interfering with one another;

FIG. 44 shows the tree structure wherein the interference in the tree structure of FIG. 43 is solved by subdividing a parent;

FIG. 45 shows the tree structure wherein the interference in the tree structure of FIG. 43 is solved by expanding the parent;

FIG. 46 shows the tree structure wherein the interference in the tree structure of FIG. 43 is solved by subdividing a child; and FIG. 47 shows the tree structure wherein the interference in the tree structure of FIG. 43 is solved by subdividing the child in an unbalanced way.

DETAILED DESCRIPTION OF THE INVENTION

Figure 21:
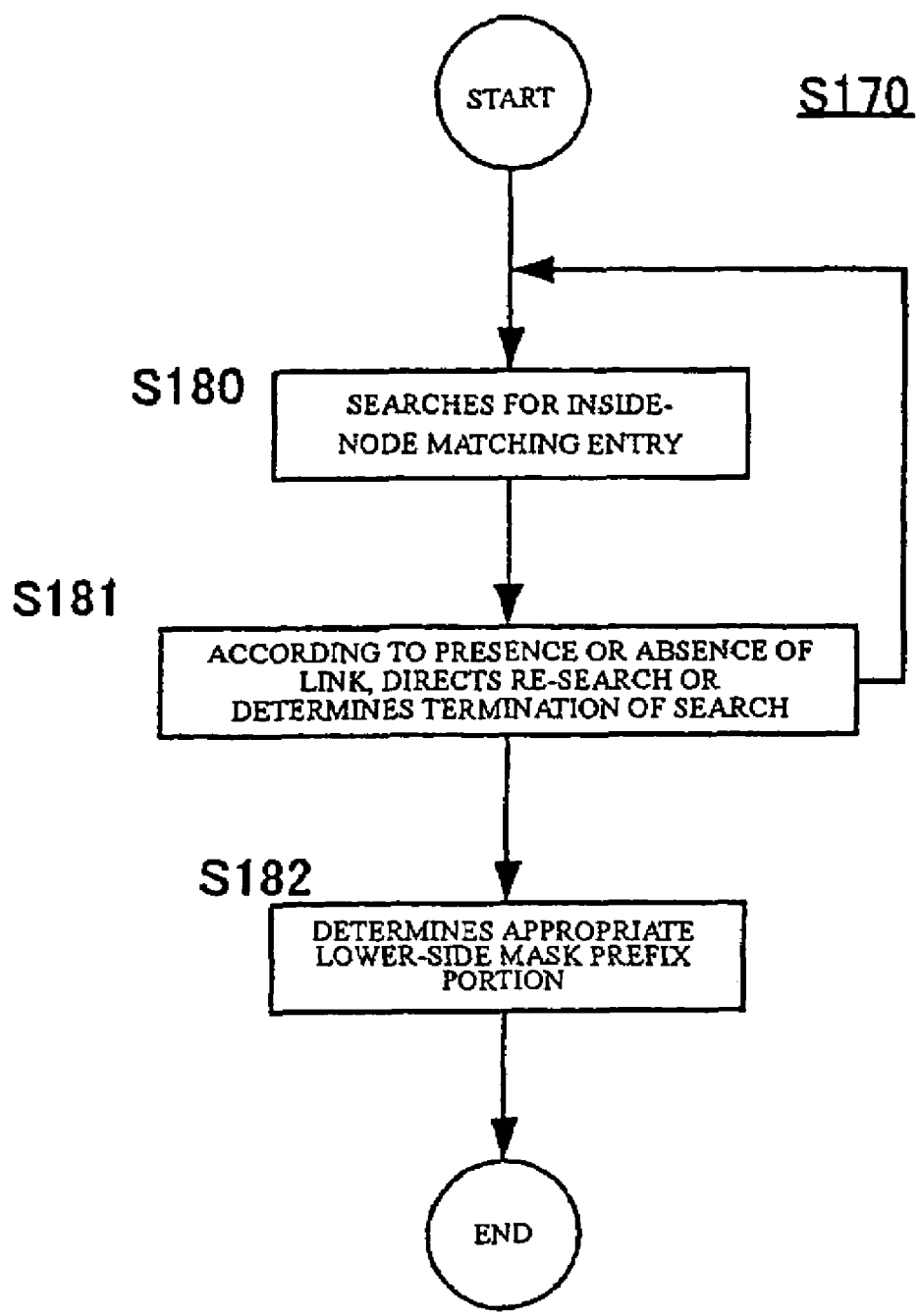
FIG. 21 is a detailed flowchart of a tree structure route search step of FIG. 19.

Embodiments and examples of the present invention will now be described in detail hereinafter.

FIG. 1 shows a schematic diagram of a communication control apparatus 10 according to the invention. The communication control apparatus 10 is incorporated into, e.g., Internet. Communication control apparatus 10, is preferably a router. Each communication control apparatus 10 is connected to at least another communication control apparatuses 10 via channels between communication control apparatuses 12 and it is further connected to one or multiple hosts 16 via local channels 14. Each communication control apparatus 10 determines the transfer destination of the packet received from host 16 via local channel 14. For example, each communication control apparatus 10 transfers the packet received from another communication control apparatus 10 through local channel 14 or from another communication control apparatus 10. The packet is then transferred directly to an external destination received via a local channel 14 of another communication control apparatus 10. Though local channels 14 are shown separately from the channels between communication control apparatuses 12 of FIG. 1, the channel between communication control apparatuses 12 may also include local channel 14.

FIG. 2 is a block diagram of the communication control apparatus 10. The communication control apparatus 10 includes: storage device 20 for storing search information for determining the next transfer route for the packet received based on its destination address; a route search device 21 to search for the transfer route for the packet received based on the search information; and a tree constructing device 22 for constructing a tree associated with the search information. The tree constructing device 22 after being fully constructed, updates the tree as an entry to be added or deleted. The communication control apparatus 10 includes other components such as a search information updating device 22 for updating the search information in the storage device 20. The storage device 20 consists of, e.g., a non-volatile IC memory.

FIG. 3 shows the tree structure associated with the search information. The circles indicate nodes N. The lines connecting higher and lower nodes N point to the branches. The tree structure is associated with search information stored in storage device 20 and includes the nodes and branches set for the search. Each parent node is linked to a respective direct-line child node via at least one branch. In the tree structure, respective hierarchies are herein referred to as the first, second, . . . , $n^{th}$ hierarchy, and only one root node exists at the first hierarchy, i.e., the highest hierarchy.

FIG. 4 is an illustrative example of the entry table for each node in FIG. 3. A node has at least one entry. In the node illustrated therein, the node is shown as having three. Each node in the tree structure has one or more entries, each mask prefix is associated with at least one entry, and each entry includes information on the number of bits of the mask prefix associated therewith, and a sort key. In contrast, all the entries included in the tree structure are associated with predetermined mask prefixes. Each entry includes information on the number of bits of a mask prefix associated therewith, and a sort key. For example, in the entry in the first line of FIG. 4, the sort key is "01010100" and the mask length, 5. Therefore, the mask prefix "01010" is extracted to correspond to the mask length from the top of "01010100".

The number of bits of the sort key is a predetermined value greater than or equal to the longest mask length amongst the mask lengths of all mask prefixes. For example, in the example of FIG. 4, the number of bits of the sort key is 8. However, if the longest mask length amongst the mask lengths of all the mask prefixes is 5, then the number of bits of the sort key may be any number equal to or greater than 5.

The upper side bit string field with a predetermined number of bits for each sort key is set to match the mask prefix associated with the entry having the sort key. Thus, the sort key "01011000" on the second line of FIG. 4, the mask prefix associated with the sort key is "0101", shown as the first to the fourth digit of the sort key.

Multiple entries included in each node are sorted based on their sort keys. In FIG. 4, the sort keys are ordered in ascending order. For each of the nodes other than the leaf nodes (nodes at the $n^{th}$ hierarchy of FIG. 3), a link to each node at one lower hierarchy can be set via two branches from an entry on one end of the entry list of the node and via one branch from the other entries of the entry list. A link is established by a pointer associated with each entry. By way of example, when there are two link methods, if the sort keys of entries in the entry list of a node are $E_1, E_2, \ldots, E_n$, and the range of sort keys of the entries in each node linked from the node is Vol[1], Vol[2], . . . , Vol[N+1], the condition Vol[1]<$E_1$≦Vol[2]<$E_2$≦ . . . , <$E_n$≦Vol[N+1] is satisfied in the first linking method (FIG. 33), and the condition of Vol[1]≦$E_1$<Vol[2]≦$E_2$< . . . , ≦$E_n$<Vol[N+1] is satisfied in the second linking method (not shown).

Sort keys of entries associated with different mask prefixes may be the same. Even in this case, if the mask length of the entries have information that differs, the mask prefixes with which respective entries are associated may also differ.

FIG. 5 is a block diagram of a route search device 21. Means 26 removes the extracted destination address of the packet received. With the node matching entry search means 27 a search is performed on each target node 28 for an entry having information on the mask prefix that matches the upper side bit string field of the extracted address in search target node 28. A matching entry is determined if there is only one entry, the only appropriate one to become the inner node matching entry. It is further determined whether there are multiple such entries, in which case, the entry having information on the mask prefix having the longest mask length among all the matching entries becomes the inside node matching entry. Search control means 29 specifies the search target node 28 to the inside-node matching entry search means 27, selects the link based on comparison of the sort key of each entry in each search target node 28 with the extracted address to determine the node that relates to the selected link to become the next search target node 28, and determines whether the node-by-node search process is terminated when a link does not exist. Transfer route determining means 30 determines, after terminating the node-by-node search process, a transfer route of the packet received that is related to the extracted address, and based on the mask prefix with the longest mask length from the mask prefixes corresponding to multiple inside-node matching entries related to the extracted address. Alternatively, the transfer route determining means 30 determines after terminating the node-by-node search process, a transfer route for the packet received that is related to the extracted address, and which is based on the mask prefix having the longest mask length from all the mask prefixes related to the detection by the inside-node matching entry search means 27 at each hierarchy in the tree structure.

When the node-by-node search process is terminated, there may be no inside-node matching entry in all the search target nodes 28. In such case, the transfer route determining means 30 determines whether the information for a transfer route of the current packet received does not exist in the search information on the route search device 21.

FIG. 6 is a block diagram of a tree forming device 22. The tree forming device 22 constructs a tree to be stored in the storage device 20 based on mask prefixes 34. In the tree structure, each node is assigned an entry in accordance with a order in which entries in the entire tree are sorted based on their sort keys (hereinafter described in detail with reference to FIG. 31). In the illustrative tree structure, the same number of entries are set for each of the nodes belonging to the same hierarchy.

Calculating means 35 calculates the minimum and the maximum values of a sort key which can be associated with a mask prefix C, as $C_{s\_min}$ and $C_{s\_max}$, respectively. To give a particular example, if the mask prefix C is "0101", and the number of bits of a sort key is 8, then the minimum sort key $C_{s\_min}$ is "01010000" consisting of upper four bits "0101" and lower four bits "0000". The maximum sort key $C_{s\_max}$ is "01011111" consisting of upper four bits "0101" and lower four bits "1111". Sort key setting means 36 sets a sort key $C_s$ to be associated with the mask prefix C under a condition $C_{s\_min} \leq C_s \leq C_{s\_max}$. By way of example, when the mask prefix C is "0101" and the number of bits of a sort key is 8, then the sort key $C_s$ is set for the condition $01010000 \leq C_s \leq 01011111$, e.g., $C_s = 01010001$. Tree structure generating means 37 determines an entry for each node based on the sort key set for each mask prefix by sort key setting means 36 and generates the tree structure based on this determination. The tree structure generated by the tree structure generating means 37 is stored as an output in the storage device 20 by tree forming device 22.

Assuming that the sort keys to be associated with two mask prefixes $C_1$ and $C_2$ are $C_{1s}$ and $C_{2s}$, respectively, and the minimum sort keys and the maximum sort keys are associated with $C_1$ and $C_2$ are $C_{1s\_min}$ and $C_{2s\_min}$, and $C_{1s\_max}$ and $C_{2s\_max}$, respectively. When $C_{1s\_min} \leq C_{2s\_min} \leq C_{2s\_max} \leq C_{1s\_max}$ is satisfied (excluding $C_{1s\_min} = C_{2s\_min}, C_{2s\_max} = C_{1s\_max}$), sort key setting means 36 sets $C_{1s}$ is within the range from $C_{1s\_min}$ to $C_{1s\_max}$ and, concurrently, beyond the range from $C_{2s\_2s\_max}$. In contrast with a standard tree structure wherein multiple sort keys are associated with the same mask prefix (hereinafter referred to as "sort keys derived from the same mask prefix") belonging to the same leaf node, tree structure generating means 37 outputs a tree structure in which the sort keys derived from the same mask prefix must be thinned out so that there is only one sort key derived from the same mask prefix at each leaf node. Furthermore, in contrast with a standard tree structure in which multiple sort keys associated with the same mask prefix exist both in a node at a higher hierarchy and in a node at a lower hierarchy on the search route from the root node to leaf nodes. Tree structure generating means 37 outputs a tree structure in which the sort keys derived from the same mask prefix have been thinned out in the node at the lower hierarchy.

Within the tree structure, there may be multiple sort keys associated with one mask prefix which cause the address extracted to be compared to multiple entries derived from the same mask prefix in the process of searching for the mask prefix. In contrast, in communication control apparatus 10, for each search target node, all the sort keys integral to the search target node are checked with the extracted address. Furthermore, in the communication control apparatus 10, all the nodes identified in the search path from the root node to the leaf nodes become search target nodes for the extracted address. Accordingly, entries to be searched can be prevented from failing to be searched even when the above mentioned thinning out process is performed, and reduction of the tree structure is achieved by reducing the total number of entries.

In an improved communication control apparatus 10, a default route is implemented therein. The default route is the transfer destination used to transfer the IP addresses of the mask prefix that is not found in the routing table provided by communication control apparatus 10 and which can be regarded as having a prefix with a mask length of 0 bit. Implementation of a default route enables the communication control apparatus 10 omit the execution of any exceptional handling which, otherwise, will be required when it is not provided with search information on the transfer route of the current packet received, eliminating the necessity to provide a singular value indicating "route has not been found" as the communication information for the route search device 21. In the communication control apparatus 10, the route to a predetermined communication control apparatus higher than the communication control apparatus 10 is selected to become the default route, and a determination of the transfer route for the currently packet received is entrusted to a higher level communication control apparatus. The first default route implementation method includes an entry associated with a 0-bit mask prefix in the tree structure to be constructed by tree constructing device 22. In IPv4, the value of the mask length of the mask prefix ranges from 1 to 32, i.e., there are 32 mask prefixes in total, and the mask length information on the entry is expressed by 5 bits. However, when the mask prefix with a mask length of 0 bit is added in the first implementation, the number of mask prefix length equals 33. Consequently, with a mask length information on an entry being 6 bits, the increased bit length is disadvantageous. In a second implementation, in order to overcome the above problem, the default route is associated with a mask prefix identified by binary numerals 0xxx . . . and/or a mask prefix identified by binary numerals 1xxxx . . . , i.e., a prefix having a bit length of 1 and a bit value 0, and a mask prefix having a bit length of 1 and a bit value 1, are both included in the tree structure constructed by tree forming device 22. If either a mask prefix having a bit length of 1 and a bit value 0 and a mask prefix with a bit length of 1 and a bit value 1 are already set in a channel other than the default route, the channel is assigned a high priority, while the other mask prefix is assigned the default route. If both, the mask prefix with a bit length of 1 and a bit value 0 and the mask prefix with a bit length of 1 and a bit value 1 are already set for channels other than the default route, then, the assignment to the channels is held and assignment of a mask prefix to the default route is unnecessary.

Implementation of the default route is also applicable to a communication control apparatus which holds search information to determine the transfer route in a structure other than the tree structure.

FIG. 7 is a block diagram of the communication control apparatus 100. Mask prefix information storing means 101 stores mask prefix information including one which is related to a mask prefix having a bit length of 0. The mask prefix having a bit length of 0 is set to be associated with a default transfer route. Address extracting means 102 removes the extracted address. For convenience sake, a continuous bit string field from the MSB of the bit string of the extracted address is referred to as the upper continuous bit string field. Search means 103 searches for the mask prefix having the longest bit length from mask prefixes matching the upper continuous bit string field, which is deemed to be an appropriate mask prefix. Transfer route determining means 104 determines the transfer route of the packet received related to the currently extracted address based on the appropriate mask prefix.

The mask prefix information storing means 101 stores mask prefix information including that which is related to a mask prefix having a bit length of 1 and a bit value 0 (hereinafter referred to as "mask prefix De0") and a mask prefix having a bit length of 1 and a bit value 1 (hereinafter referred to as "a mask prefix De1"). This replaces the mask prefix information that includes information related to a mask prefix with a bit length of 0 (hereinafter referred to as "a mask prefix De"). The mask prefix De0 and/or the mask prefix De1 are set for the default transfer routes.

FIG. 8 is a block diagram of the communication control apparatus 120. The communication control apparatus 120 consists of a storage device 121 for storing search information to determine the next transfer route for the packet received from the destination address of the packet received, and a route search device 122 for searching a transfer route for the packet received based on the search information. The search information includes a first information field 126 and a second information field 127. A predetermined integer 'u' and the bit numbers of a mask prefix are defined in the order starting at the MSB and ending at the LSB (least significant bit). A mask prefix having at most 'u' bits and a mask prefix having at least u+1 bits are referred to as a short mask prefix and a long mask prefix, respectively. A field of the first to the $u^{th}$ bits and a field from the $(u+1)^{th}$ bit to the last bits of the long mask prefix are referred to as the upper side mask prefix field and the lower side mask prefix field, respectively. Long mask prefixes having the same upper side mask prefix field are referred to a mask prefix group. However, if there is only one long mask prefix having the same upper side mask prefix field, then there is only one mask prefix as the element of the mask prefix group to which the long mask prefix belongs. The first information field 126 includes information related to the short mask prefix and to the upper side mask prefix.

The first information field 126 is stored in a table. Particular examples of the table are described hereinafter with reference to FIGS. 12 to 14. The table includes entries with u-bit sort keys that are distinct from one another. Entries included in each table form the first and second table entries. All the bit values from the first to the $w^{th}$ (where w<u) of the sort key of the first table entry match the short mask prefix associated with the first table entry, and all the bits of the sort key of the second table entry match to the upper side mask prefix field associated with the second table entry.

The second information field 127 includes information related to the lower side mask prefix field. The second information field 127 is stored in at least one tree structure. The tree structure was previously described with reference to FIG. 3. Each tree structure is associated with a mask prefix group. A link is set to the tree structure from the entry matching the sort key equal to the upper side mask prefix field of the long mask prefix belonging to the associated mask prefix group included in the table. However, in the tree structure of FIG. 3, entries are assigned relative to all the mask prefixes, while in the tree structure in the second information field 127, entries are assigned according to the mask prefix group. Each node in each tree structure has at least one entry. The lower side mask prefix field of each long mask prefix is associated with at least one entry. Each entry in the tree structure includes information on the number of bits the lower side mask prefix field (hereinafter referred to as "the lower side mask prefix field mask length") associated therewith, and a sort key. The number of bits of the entry in the tree structure is set to be greater than or equal to the longest lower side mask prefix field mask length amongst the lower side mask prefix field mask lengths of all the lower side mask prefix field. The upper side field and the lower side field of a bit string are referred to the upper side bit string field and the lower side bit string field, respectively. The upper side bit string field of each sort key is set to match the lower side mask prefix field associated with an entry having the sort key. Entries are assigned to predetermined nodes of the tree structure based on the sort order of their sort keys. Each node has an entry list in which multiple entries included therein are sorted based on their sort keys. Each node except leaf nodes can be linked via each branch related to each entry in the entry list of the node to each node of the next lower hierarchy.

In the route search device 122, address extracting means 130 extracts a destination address of a packet received In the table route search device 131, a bit string field from the first to $u^{th}$ bits and a bit string field of $(u+1)^{th}$ bits and subsequent bits are referred to as first and second extracted address field, respectively. A transfer route for the packet received related to the currently extracted address is searched and compared to each entry of the table containing the first extracted address field. A tree structure route search device 132 searches for the transfer route for the packet received related to the currently extracted address based on comparing each entry in the tree structure with the second extracted address field. Controller 133 controls the table route search device 131 and tree structure route search device 132. A final determination device 134 determines the transfer route for the packet received related to the currently extracted address based on search results of the table route search device 131 and the tree structure route search device 132. Though there is only one tree structure route search device 132 shown in FIG. 8, there may be as many tree structure route search devices 132 as the number of mask prefixes.

FIG. 9 is a detailed block diagram of a table route search device 131. In the table route search device 131, search means 138 searches for an entry having a sort key matching the upper side bit string field of the first extracted address field as a matching entry. If a link from the appropriate entry retrieved by the search means to a predetermined tree structure is set, notification means 139 notifies to that effect controller 133 and the linked tree structure.

FIG. 10 is a detailed functional block diagram of a tree structure route search device 132.

The basic structure of the tree structure route search device 132 is almost the same to that provided by route search device 21 of FIG. 5. That is, inside-node matching entry search means 141, search control means 143 and lower side mask prefix field determining means 144 of the tree structure route search device 132 correspond to the inside-node matching entry search means 27, the search control means 29 and the transfer route determining means 30 of the route search device 21 of FIG. 5, respectively. The differences reside in that the tree structure route search device 132 is not provided with address extracting means 26 which exists for the route search device 21, and further, that the tree structure route search device 132 performs a route search for the tree structure which is associated not with the whole of all mask prefixes but with each mask prefix group, the latter being related to the lower side mask prefix field of the mask prefix belonging to each mask prefix group. In the tree structure route search device 132, the inside-node matching entry search means 141 searches each search target node 142 in the tree structure for an entry having information on the lower side mask prefix matching the upper side bit string field of the second extracted address in the search target node 142 as a matching entry for determining if there is only one matching entry, the only entry to become the inside-node matching entry, and further determines whether there are multiple matching entries, an entry providing information on the lower side mask prefix field with the longest bit length amongst the matching entries to become the inside-node matching entry. Search control means 143 specifies search target node 142 to the inside-node matching entry search means 141, selects a link based on comparing the sort key of each entry in each search target node 142 with the second extracted address field that determines the node related to the selected link to be the next search target node 142 and that the node-by-node search process is terminated if no link exists. Lower side mask prefix field determining means 144 determines after termination of the node-by-node search process, the lower side mask prefix field with the longest bit length among the lower side mask prefix field corresponding to multiple inside-node matching entries related to the second extracted address field.

FIG. 11 is a functional block diagram of a controller 133. In the controller 133, first directing means 145 directs table route search device 131 to initiate a search for the presently extracted address which was previously extracted by the address extracting means 130 prior to directing the tree structure route search device 132. When notified by the notification means 139 of the table route search device 131, second directing means 146 directs the tree structure route search device 132 to perform a search process related to the currently extracted address by specifying a search target tree structure notified by notification means 139.

If the second directing means 146 does not direct the tree structure route search device 132 to perform a search, then the final determination device 134 (FIG. 8) determines the final transfer route for the packet received related to the currently extracted address based on the short mask prefix related to the appropriate entry detected by the table route search device 131. If the second directing means 146 directs the tree structure route search device 132 to perform a search process, then the final determination device 134 determines the long mask prefix which is based on the upper side mask prefix field related to the entry in the link-source table of the tree structure, which was determined to be the search target tree structure by tree structure route search device 132 and the lower side mask prefix field determined by the lower side mask prefix field determining means of tree structure route search device 132 to become the transfer route for the packet received related to the currently extracted address.

FIG. 12 shows illustrative examples for generating a default route and sort keys from multiple mask prefixes. Though the bit length of the IP address is 32 bits in IPv4, it is assumed to be, e.g., 6 bits long. The above-mentioned integer 'u' is assumed to be 3. Nine mask prefixes are shown having various bit lengths in ascending order, as seen in FIG. 12a. FIGS. 12b-12c depict a set of mask prefixes with at most 'u' bits and a set of mask prefixes with at least u+1 bits collected from the mask prefixes of FIG. 12(a), respectively. Mask prefixes referenced by numerals 1, 6, 7 and 8 are short mask prefixes, while mask prefixes referenced by numerals 2, 3, 4, 5 and 9 are long mask prefixes. By way of example, in the mask prefix represented by numeral 9, the bit string comprised of the first to the third bits "110" becomes the upper side mask prefix field, and 0, the lower side mask prefix field when the bit string comprises the fourth and subsequent bits.

FIG. 13 shows a table wherein when search information is divided and separately held in a table and a tree structure. The table has eight entries having a u-bit sort key with a value different from other sort keys. Each entry has a pointer for a link to the tree structure, and a short mask prefix candidate in association with its sort key. Each short mask prefix is associated with an entry having a sort key whose values coincide with the values of all the bit numbers of the mask prefix. Long mask prefixes having the same upper side mask prefix field form a mask prefix group. Each mask prefix group is associated with entries having a sort key corresponding to the upper side mask prefix field related to the group via a pointer to the tree structure related to the group. Short mask prefixes are necessarily associated with different entries respectively in the table. In a search process in the table, if any entry for which a pointer to the tree structure is not set and determined to be the entry having the sort key corresponding to the currently extracted address, then the short mask prefix associated with the entry is the factor that determines the transfer route for the currently packet received. In the search process in a table, if any entry for which a pointer to the tree structure is set to be the entry having a sort key corresponding to the currently extracted address, a search is then performed for the tree structure linked to that entry. If the lower side mask prefix field matching the upper side bit string field of the second extracted address field of the currently extracted address is not found as a result of the search in the tree structure, then a transfer route for the currently packet received is determined based on the short mask prefix related to the link-source entry of the search target tree structure. If it is found, then the transfer route for the currently packet received is determined based on a long mask prefix related to the found lower side mask prefix field.

FIG. 14 illustrates a set of mask prefixes wherein the lower side mask prefix field belongs to each tree structures linked to the entries shown in FIG. 13. FIG. 14(a) and (b) are mask prefixes of the lower side mask prefix field thereof belonging to Tree A and Tree B of FIG. 13, respectively.

FIG. 15 is a flowchart illustrating the communication control method. Therein is shown the search information that determines the next transfer route of the packet received from the destination address where the packet received is stored, and the transfer route when the packet received is searched based on search information to be described hereinafter.

The search information for each step of the process and associated with the tree structure is characterized by each node in the tree structure having at least one entry. Each mask prefix is associated with at least one entry. Each entry includes a sort key and information related to the number of bits of the mask length. The number of bits of the sort key is set greater than or equal to the longest mask length amongst the mask lengths of all mask prefixes. The upper side bit string field of each sort key is set to match the mask prefix associated with an entry having the sort key. Entries are assigned to predetermined nodes of the tree structure based on the sort order of their sort keys. Multiple entries included in each node are sorted based on their sort keys. Each node except leaf nodes can be linked via the branch related to each entry in the entry list of the node to each node at the next lower hierarchy.

At S42 (address extracting step) in FIG. 15, the destination address of the packet received is extracted. At S43 (inside-node matching entry search step), each search target node is searched for an entry having information on the mask prefix matching the upper side bit string field of the extracted address in the search target node, as a matching entry to determine if there is only one entry, the only one to become the inside-node matching entry and establish whether there are multiple entries having information on the mask prefix with the longest mask length amongst the entries to become the inside-node matching entry. At S44 and S45 (search control steps) the search target node is specified. At S44 and S45, a link is selected based on a comparison between the sort key of each entry in each search target node and the extracted address which determines the node related to the selected link to become the next search target node. It further determines that the node-by-node search process is terminated if a link does not exist (i.e., at S44, it was established whether or not the current search target node is a leaf node. Then, the process proceeds to S46 if the determination results positive; otherwise, it branches to S45). At S45, a link is selected based on a comparison of the sort key of each entry in each search target node with the extracted address to find a node related to the selected link to be the next search target node. The process then returns to S43. At S46 (transfer route determining step), after terminating the node-by-node search process, the transfer route for the packet received related to the extracted address is determined based on the mask prefix with the longest mask length amongst the mask prefixes corresponding to multiple inside-node matching entries related to the extracted address. Alternatively, at S46, after the node-by-node search process is terminated, the transfer route for the packet received related to the extracted address is determined based on the mask prefix with the longest mask length amongst the mask prefixes related to the detection at S43 performed for each hierarchy of the tree structure.

An example of the tree structure will now be provided. Each node is assigned an entry according to the order in which entries in the entire tree are sorted based on their sort keys. The same number of entries is set for each of the nodes belonging to the same hierarchy. As for the node from which a link to a node at the next lower hierarchy is set via a branch, two branches are associated with an entry at one end of the entry list of the node and one branch with each of the other entries.

FIG. 16 is a flowchart that illustrates a method for constructing the tree structure. At S51, the minimum and the maximum values of the sort key associated with mask prefix C are calculated as $C_{s\_min}$ and $C_{s\_max}$. At S52 (sort key setting step), sort key $C_s$ to be associated with mask prefix C is set for the condition $C_{s\_min} \leq C_s \leq C_{s\_max}$. At S53 (tree structure generating step), an entry for each node is determined based on the sort key set for each mask prefix at S52, and the tree structure is generated based on this determination.

The sort keys that are associated with two mask prefixes $C_1$ and $C_2$ are assumed to be $C_{1s}$ and $C_{2s}$, respectively, and the minimum sort keys and the maximum sort keys that are associated with $C_1$ and $C_2$ are assumed to be $C_{1s\_min}$ and $C_{2s\_min}$, and $C_{2s\_min}$ and $C_{when\ C1s\_min} \leq C_{2s\_min} \leq C_{2s\_max} \leq C_{1s\_max}$ is satisfied (excluding $C_{1s\_min} = C_{2s\_min} = C_{2s\_max} = C_{1s\_max}$), $C_{1s}$ is set within the range from $C_{1s\_min}$ to $C_{1s\_max}$ and at the same time beyond the range from $C_{2s\_min}$ to $C_{2s\_max}$.

At S53 (tree structure generating step), contrasting the standard tree structure wherein multiple sort keys are associated with the same mask prefix (also referred to as "sort keys derived from the same mask prefix") belonging to the same leaf node. The tree structure is preferably outputted such that the sort keys derived from the same mask prefix have been thinned out, in which case, there is only one sort key derived from the same mask prefix at each leaf node. In another aspect of S53, in contrast with a standard tree structure in which multiple sort keys are associated with the same mask prefix (also referred to as "sort keys derived from sort keys derived from the same mask prefix") belonging to a node of a higher hierarchy and to a node of a lower hierarchy on the search route from the root node to the leaf nodes, the tree structure is outputted wherein the sort keys are derived from the same mask prefix that were thinned out in the node of the lower hierarchy.

FIG. 17 is a block diagram representing the hardware for executing a program. Each step in the methods related to FIGS. 15 and 16 described above, and FIGS. 18 to 22 described hereinafter, are executed using the hardware shown in FIG. 17. A CPU 56, a main memory 57 and an input/output control device 58 are connected to system bus 55. The method described above can be executed as a coded program. The input/output control device 58 includes a hard disk interface and the like, and various programs to be executed by the CPU 56 are stored, e.g., in a hard disk. Programs are stored in the main memory 57 before being executed by the CPU 56. The CPU 56 sequentially reads instruction lines from the main memory 57 and execute the program.

A default route implementing communication control method is now described as an improved communication control method. Advantages of a default route and implementation thereof in the default route implementing communication control method have been explained in the above description of the improved communication control apparatus 10.

Implementation of the default route is also applicable to the communication control method for holding search information to be used to determine a transfer route in a structure other than the tree structure.

FIG. 18 is a flowchart illustrating a default route implementing communication control method. At S151 (mask prefix information storing step), mask prefix information is stored including information related to a mask prefix with a bit length of 0. A mask prefix having a bit length of 0 is set for a default transfer route. At S152 (address extracting step), the destination address of the packet received is extracted. For clarity sake, a continuous bit string field from the MSB of the bit string of an extracted address is referred to as an upper continuous bit string field. At S153 (search step), a mask prefix with the longest bit length amongst the mask prefixes matching the upper continuous bit string field is searched for as an appropriate mask prefix. At S154 (transfer route determining step), a transfer route for the packet received related to the currently extracted address is determined based on the appropriate mask prefix.

In the mask prefix information storing step 101, the mask prefix information is stored including information related to a mask prefix with a bit length of 1 and a bit value 0 and a mask prefix with a bit length of 1 and a bit value 1, instead of the mask prefix information that includes information related to the mask prefix with a bit length of 0. The mask prefix De0 and/or the mask prefix De1 are set for a default route.

Another embodiment of the communication control method is now described based on the search information to determine the next transfer route for the packet received from the destination address of the packet received in which the transfer route for the packet received is searched for (FIG. 19). Search information is comprised of a first information field and a second information field. A predetermined integer 'u' is defined, and numbers are defined for bits of a mask prefix from the MSB to the LSB in that order, with MSB being first in line. A mask prefix with at most 'u' bits and a mask prefix with at least u+1 bits are referred to as a short mask prefix and a long mask prefix, respectively. A field from the first to the $u^{th}$ bit and from $(u+1)^{th}$ to the last bits of the long mask prefix are referred to as the upper side mask prefix field and the lower side mask prefix field, respectively. Long mask prefixes having the same upper side mask prefix field are to be a mask prefix group (Note: if there is only one long mask prefix having the same upper side mask prefix field, then there is only one mask prefix as element of the mask prefix group to which the long mask prefix belongs). The first information field includes information related to the short mask prefix and the upper side mask prefix field. The first information field is stored in the table. The table includes u-bit entries with sort keys that are different from one another. Entries included in each table include a first and a second table entries. All the bit values from the first to the $w^{th}$ bit (where $w \leq u$) of the sort keys of the first table entry match the short mask prefix associated with the first table entry, and all the bits of the sort key of the second table entry are identical to the upper side mask prefix field associated with the second table entry and an entry relating to the sort key is included. The second information field includes information related to the lower side mask prefix field. The second information field is stored in at least one tree structure. Each tree structure is associated with a prefix group, and a link is set to the tree structure from an entry having a sort key equal to the upper side mask prefix field of long mask prefix belonging to the associated mask prefix group and included in a table. Each node in each tree structure has at least one entry. The lower side mask prefix field of each long mask prefix is associated with at least one entry. Each entry in the tree structure includes information on the number of bits of the lower side mask prefix field associated therewith, and a sort key. The number of bits of an entry in the tree structure is set to be greater than or equal to the longest lower side mask prefix field mask length amongst the lower side mask prefix field mask lengths of all the lower side mask prefix field. The upper side bit string field of each sort key is set to match the lower side mask prefix field associated with an entry having the sort key. Entries are assigned to predetermined nodes of the tree structure based on the sort order of their sort keys. Each node has an entry list in which multiple entries included therein are sorted based on their sort keys. Each node except leaf nodes are linked via each branch related to each entry in the entry list of the node to each node of the next lower hierarchy.

FIG. 19 is a flowchart of yet another communication control method. At S168 (address extracting step), the destination address of the packet is extracted from the packet received. A bit string field of the first $u^{th}$ bits and a bit string field of $(u+1)^{th}$ and subsequent bits of the extracted address are referred to as the first and second extracted address field, respectively. At S169 (table route search step), the transfer route for the packet received related to the currently extracted address is searched based on a comparison of each entry in the table with the first extracted address field. At S170 (tree structure route search step), the transfer route for the packet received related to the currently extracted address is searched and compared to each entry of the tree structure with the second extracted address field. At S171 (control step), the table route search step and the tree structure route search step are controlled. At S172 (final determination step), the transfer route for the packet received related to the currently extracted address is finally determined based on search results of the table route search step and the tree structure route search step.

FIG. 20 is a detailed flowchart of step S169 (table route search step) shown in FIG. 19. At step S175 (search step), an entry having a sort key matching the upper side bit string field of the first extracted address field is searched for a matching entry. At S176 (notification step), if a link is set from the appropriate entry retrieved at the search step to a predetermined tree structure, step 171 (control step) notifies to that effect the linked tree structure.

FIG. 21 is a detailed flowchart of S170 (tree structure route search step) shown in FIG. 19. At S180 (inside-node matching entry search step), each search target node of the tree structure is searched for an entry having information on the lower side mask prefix field that matches the upper side bit string field of the second extracted address in the search target node, as a potential entry to determine if there is only one matching entry, i.e., the only one to become the inside-node matching entry, and determines whether there are multiple matching entries, i.e., an entry having information on the low side mask prefix field with the longest bit length amongst the entries to become the inside-node matching entry. At S181 (search control step), the search target node is specified to the inside-node matching entry search step, and a link is selected by comparing the sort key of each entry in each search target node to the second extracted address field for determining the node related to the selected link to become the next search target node. It also determines that the node-by-node search process is terminated if such a link does not exist. At S182 (lower side mask prefix field determining step), after terminating the node-by-node search, the lower side mask prefix field with the longest bit length is determined amongst the lower side mask prefix field corresponding to multiple inside node matching entries related to the second extracted address field.

FIG. 22 is a detailed flowchart of S171 (control step) shown in FIG. 19. At S186 (first directing step), execution of the search process in step S169 (table route search step) is directed to the currently extracted address which was extracted in step S168 (address extracting step) prior to the execution of the search performed at S170 (tree structure route search step). At S187 (second directing step), when notified by S176 (notification step) of step S169 (table route search step), S170 (tree structure route search step) executes a search related to the currently extracted address by specifying the search target tree structure notified by step S176 (notification step).

S172 (final determination step) shown in FIG. 19 is now described in detail. At step S172 (final determination step), if execution of the search is not directed to S170 (tree structure route search step) at S187 (second directing step), then a transfer route for the packet received related to the currently extracted address is determined based on the short mask prefix of the entry retrieved at S175 (search step) of S169 (table route search step). Furthermore, at step S172 (final determination step), if execution of a search process is directed to S170 (tree structure route search step) at step S187 (second directing step), then a long mask prefix which is based on the upper side mask prefix field related to the entry in the link-source table in the tree structure is determined to become the search target tree structure at S170 (tree structure route search step), and the lower side mask prefix field is determined by step S182 (lower side mask prefix field determining step) of S170 (tree structure route search step). Both are determined to be the transfer route for the packet received related to the address currently extracted.

EXAMPLE

FIG. 23 and subsequent figures relate to an example according to the present invention.

FIG. 23 shows the composition of an IP address for IPv4. An IP address consists of 32 bits and is subdivided into an upper bit string field and a lower bit string field. The upper bit string field indicates a prefix (also referred to as a network address in IP), and the lower bit string field, the host number. The total number of bits of the prefix and the host number is defined to be 32 bits. However, the number of bits of the prefix, i.e., the 'mask length' differs for each packet received and its information is not included therein. Therefore, the communication control apparatus itself must detect what is the prefix of the currently packet received.

The following description relates to a sorted IP search tree and its search mechanism. The main item is that a topological tree structure (Patricia Tree) based on the mask length is not employed, and that the multiple entries are derived from one entry causing all the entries to become a set of equal entries without any structure. In order to search at high speed the set of entries, the following search tree is implemented:

(1) How to Create a Search Tree from a Transfer Table (1-1) A Transfer Table is Developed to Create a Sorted One-Dimensional List.

Key data equivalent to the IP addresses is created based on prefixes in the transfer table, and ordered in ascending order to be performed based on the keys, creating a one-dimensional list (a particular example is described hereinafter with reference to FIG. 25).

The key data is created by adding bits to the prefix to make the prefix match the length of the IP address (shown in FIG. 25, where the length of the IP address is assumed, for simplicity sake, to be 8 bits). The data added includes the lower bits (host address area) that do not become the matching search target dependent on the masks, and which is determined as follows.

Basic method 1: for such an entry there are no other entries with a longer mask length than the ones of the entry and having the same bit values of the bit positions that correspond to the mask length of the entry. Any values, such as all 0s, are added. Example: For the prefix "10100" on the second line shown in FIG. 25, the sort key is set at "1010010".

Basic method 2: to be applied in cases other than the above. Assumed are multiple areas of consecutive IP addresses where each IP address is exclusively adapted. Any IP value in each consecutive area is selected as a representative value. Multiple separate entries are obtained by performing this operation for the entire area covered by the prefix. Example: The sort keys B1, B2 and B3 are set for prefix "1010" (FIG. 25).

FIG. 24 shows an example of the transfer table in which the IP address is assumed to be 8 bits. FIG. 25 is a table obtained by expanding the transfer table shown in FIG. 24 through Basic methods 1 or 2 and sorted by the sort keys. FIG. 26 shows the relationship between the sort keys and the IP addresses. A1, D1 and E1 are obtained using Basic method 1, while B1, B2, B3, C1 and C2 are obtained utilizing Basic method 2. By expanding the transfer table in this manner, a transfer table having N entries can be expanded into a transfer table with entries up to 2N-1. This can be understood from the reasons described below. A process is now considered in which a table is constructed by sequentially using entries in the order determined by the entry having a shorter mask length (covering a wider range of IP addresses) to an entry having a longer mask length by way of Basic methods 1 and 2. In this case, in the process of expanding one entry in the transfer table, bits are added according to the method 1. If the entry overlaps with the area covered by an already existing entry, the process that is obtained using Basic method 2 is re-executed for the existing entry. The process necessarily results in any of the sections <1> to <4> described hereinafter. In a numeric value with "/" inserted in FIGS. 27 to 30, a binary value located before "/" indicates the prefix, and a numeric value located after "/" indicates the mask length, and a binary value without "/" indicates a sort key.

<1> FIG. 27: If an entry (e.g., having a representative value of 01110100) independent of the entry already created (i.e., 01101001) is added, then the entry is added (FIG. 27).

<2> FIG. 28: If an entry related to the inclusion (e.g., a representative value of 01101001) already exists and one end of the entry was replaced, then that entry is added. In this case, if the representative value (01101001) in the area where the replacement is to be performed resides within the area to be newly added, then another value (01101010) is selected.

<3> FIG. 29: If an entry related to the inclusion (entry with a representative value of 01101001) already exists and the entry is newly added by separating the one already existing entry in two entries, then the two entries (entries corresponding to representative values of 01101001 and 01101111) are added. If the new area interferes with the already existing representative value, then a different value is selected to be the representative value.

<4> FIG. 30: When another entry (entry with a representative value of 01101001) which already occupies the same area is to be replaced, the entry is replaced and the number of entries does not increase.

Thus, when the transfer table is constructed in this manner, the total number of entries increases by up to 2 every time one entry is added (<3>). As for the first entry, the number of entries is increased by adding 1 (<1>), so that the total number of entries increases up to 2N-1. The final form is unique and is not dependent on the order of construction. However, any representative value can be freely selected within the range such that this value is never exceeded. In the one-dimensional list obtained in this way, an entry with a value corresponding to a target IP address, if any, becomes the search target. Otherwise, either one of the following becomes the search target: (a) an entry with a representative value smaller than and closest to the target IP address, or (b) an entry with a representative value larger than and closest to the target IP address. Therefore, if a search for finding entries can be performed, an aimed search can be achieved. The search operation is identical to the operation of searching for a position where one datum is to be newly added to the sorted data.

(1-2) A search tree is created from the expanded one-dimensional sort key list. The sort key list is converted into a search tree structure to be used as the search criterion. The search tree is structured as follow:

(a) The height from the root (beginning of a tree; one root for each tree) to a leaf (the end of the tree) is constant.

(b) Each node, including leaves, and the root has a sorted entry table with a predetermined number of entries at each level (each hierarchy of the tree structure).

(c) The entry table of each of nodes except the leaves has [the number of keys +1] pointers to nodes at the next level based on the magnitude in relation to the keys.

Data of the one-dimensional list of keys which is sorted in an ascending order (in section (1-1)) is developed into the structure shown in FIG. 31 (i.e., an example where the height is 3 and each node has two entries and three pointers). In FIG. 31, each entry is referenced by the letter P followed by a number reflecting the order. In the method depicted in FIG. 31, the bottom hierarchy is assumed to be the $d^{th}$ hierarchy starting from the top; the maximum number of entries for each node at the $d^{th}$ hierarchy; the number nd of entries for each node at the next higher hierarchy; and the number $n_{d-1}$ of entries for each node at a further higher hierarchy $n_{d-2}$. Each entry is assigned to a node as follows.

The first to $n_d{}^{th}$ entries: the first node at the $d^{th}$ hierarchy;

The $(n_d+1)^{th}$ entry: the first node at the $(d-1)^{th}$ hierarchy;

The $(n_d+2)^{th}$ to $(2n_d+2)^{th}$ entries: the second node at the d-th hierarchy;

The $(2n_d+3)^{th}$ entry: the first node at the $(d-1)^{th}$ hierarchy, if $2 \leq n_{d-1}$;

The $(2n_d+4)^{th}$ to $(3n_d+4)^{th}$ entries: the third node at the $d^{th}$ hierarchy;

The $(3n_d+5)^{th}$ entry: the first node at the $(d-1)^{th}$ hierarchy, if $3 \leq n_{d-1}$, and t $(d-2)^{th}$ hierarchy, if $n_{d-1}<3$; and The $(3n_d+5)^{th}$ to $(4n_d+5)^{th}$ entries: the third node at the $d^{th}$ hierarchy, etc.

More specifically, if nd entries in consecutive order are assigned to a node at the lowest layer, then the next entry is assigned to a new or existing node at the next higher hierarchy. If it is no longer possible to assign an entry to a node at the next higher hierarchy, then the entry is assigned to a new or existing node, such as a node at the next higher hierarchy to which an entry can be assigned (as an exception). Entries next to the entry assigned to the higher hierarchy of $n_d{}^{th}$ are reassigned to a new node at the lowest hierarchy.

FIG. 32 shows the tree illustrated in FIG. 31 with pointers added to the nodes (except the leaf nodes) in the tree. The pairs P0, P1, and P8, P17 are entry tables, wherein the pair including an arrow(s) (pointer(s)) shown in FIG. 32 is referred to as a node. Nodes P8 and P17 include: the entry table, the pointer to nodes P2 and P5, the pointer to nodes P11 and P14, and the pointer to nodes P20 and P23. As a result, the relations shown in FIG. 33 are satisfied for all the nodes. When the key matches, the process proceeds to a lower pointer. The pointers shown in FIG. 32 are based on the relation '<' or '>' excluding the relation '='. When the padding described in FIG. 34 or when an improvement process has been performed to reduce the number of entries, a pointer may also be based on the relation '='. Otherwise, only pointers based on the relation of '<' or '>' are sufficient. When a pointer based on '=' is required, it is optional whether the pointer based on '$\leq$' or a pointer based on '$\geq$' is to be used.

Handling the condition '$\leq$' in the search tree is based on: (a) selecting a branch for the search and (b) arranging the construction data (keys) to correspond to each other. It is necessary that (a) should be consistent with (b). Even if the entry corresponding to the upper side string field of the IP address is found at a higher search target node, i.e., when an entry satisfying the condition '=' is found, if there is another entry satisfying '=', it becomes the subsequent search target node. A link (or a pointer) satisfying the condition '=' must be set in the tree structure so that the latter entry can be retrieved. Although, in FIG. 33, the description is made based in relation to all the elements included in $Vol[1] \leq E1 \leq \ldots$, all those included in $Vol[2] < E2 \leq \ldots En \leq \ldots$, and all those included in Vol [n+1], the relation becomes, all the elements included in $Vol[1] \leq E1 < \ldots$, all those included in $Vol[2] \leq E2 < \ldots En < \ldots$, and all the elements included in Vol [n+1].

When the data does not correspond to the size of the tree and an excess of entries is left out of the tree, the excess entries are filled with data compatible with the search mechanism for it to operate correctly; e.g., the last value of the sort key list and ALL 1s not corresponding to any value to complete the search tree.

FIG. 34 shows the tree created based on the data shown in FIG. 25. It is an illustrative example of a tree having two levels (hierarchies), wherein each node has two entries, irrespective of its level. The tree data structure and the method of constructing the structure generally create the search tree. This tree structure is hereinafter referred to as a search tree.

(2) Configuration of the search mechanism

Referring to the search tree configured in (1), the process proceeds downward from the root (table at the highest hierarchy level) to the leaves while performing a magnitude comparison at each node. Any entry from (a) to (c) is searched for each node for all IP addresses.

(a) An entry having a sort key corresponding to the IP address;

(b) An entry having the largest number sort key amongst the sort keys smaller than the IP address; or (c) An entry having the smallest value sort key amongst the sort keys larger than the IP address.

If an entry of (a) exists, the entry becomes the search target entry at that node. If an entry of (a) does not exist, any entry of (b) or (c) becomes the search target entry at the node. Regardless whether either entry of (b) or (c) becomes the search target entry at the node depends on whether the pointer of the node is set to "<" or ">". If an entry corresponding to (a) is not found in the other nodes, then the entry of (a) at the node becomes the prefix for the current IP address. If an entry corresponding to (a) is found in another node, the entry of (a) at the node becomes the prefix for the current IP address if its mask length is longer than the mask length of the entry in the another node. If an entry of (a) is found in all the nodes downstream from the root to leaves, it is indicative that there is no entry having a prefix for the current IP address in the tree structure. However, when a default route with a mask length of 0 is defined, even if there is no entry of (a) to be found in all the nodes downstream from the root to the leaves, the default route becomes the prefix for the current IP address. In this way, the search terminates by performing only one search from the root to the leaves (FIG. 32).

A method for detecting a prefix from the IP address will now be described. A one-way search starting from the root of the search tree and proceeding downstream sequentially along the branches to reaching the leaves is performed, causing the search perform the following (I) to (IV) operations.

(I) Branch Search Operation:

<1> Finds the smallest value sort key amongst the sort keys larger than the target IP address (IP address for the currently address received) in the sorted key list of the node.

<2> Obtains the pointer of the next list (node) corresponding to the sort key. When the IP address is larger than the largest sort key in the node, a pointer is assigned to the entry having the largest sort key, and it is directed to the node including the sort key larger than the largest sort key.

(II) Matching a candidate search operation:

<1> Finds a match with a mask from all sort keys in the node.

<2> Finds a match with the longest prefix amongst the matches and holds data corresponding to the prefix length. The matching candidate search operation except that for the root, is an operation for searching a match with a longest mask length among the matches including the prefix held from the root.

(III) Tree search operation:

<1> Moves to a node at the next level via the pointer obtained at (I), and performs (I) and (II) operations.

<2> Repeats the operation until a leaf is reached (a (I) operation is not necessary for the leaves.)

(IV) Final Operation:

<1> Reaches a leaf and returns the data corresponding to the longest matching prefix obtained from the (II) operation.

As an illustrative example using IPv4, if the numbers of entries for entry tables of nodes at each level (hierarchy) are numerals 39, 8, 8, 8, and 8, then the search can be executed for 128k transfer tables by five similar operations in total. In this case, the result is obtained as 39+40×8+40×9×8+40×9×9×8+40×9×9×9×8=262439, which exceeds 128k×2−1(=262143).

As an implementation example, a search of a table with thirty-nine entries at the highest hierarchy is performed by a controller chip and a subsequent repetition is performed by the memory chip. In this case, the memory bus is only occupied by two accesses for sending a search command and receiving search results. The (I) and (III) operations can be executed in parallel by effectively utilizing the bus band within each chip. The number of times the search operation is to be performed within the memory is fixed, (e.g., four searches for eight entries). Accordingly, a schedule of operations in hardware can be executed prior to searching. Though search mechanisms (I) and (III) are intended for a general search, mechanisms (II) and (IV) are added thereto to enable a search for data utilizing the mask of the example.

(3) Improving the Tree:

The method for improving the problem of the table updating process is slowed down because the number of entries increase when operating the Basic method 2 in (1). The improvement method relies on the following three principles. Improvement methods 1 to 3 are applied without considering the nested structure of the group of entries (the "nested structure" is described hereinafter); improvement method 4 is applied to a double-nested structure field in the group of entries; and improvement method 5 and subsequent improvement methods are set to improve the tree structure by applying an appropriate combination of methods from methods 4 through 9, including even the triple-nested structure field in the group of entries. The term "nested structure in an entry group" will now be described.

When the range of sort keys to be associated with a first prefix includes the range of sort keys to be associated with a second prefix that is different from the first prefix, the first entry group includes multiple entries associated with the first prefix includes therein, and the second entry group includes one or multiple entries associated with the second prefix with regard to the range of sort keys. The tree structure field of the first and the second entry groups is referred to as a nested structure.

Principle 1: The prefix of the IP address can be detected if the prefix of the IP address is associated with multiple entries that were derived and generated, if any of the multiple entries are evaluated against the IP address through (II) of (2).

Principle 2: A mechanism is provided which looks for a matching candidate for all the nodes determined to be a search route, so that a matching candidate (entry having a sort key related to the prefix of the IP address) can be any node on the search route.

Principle 3: A mechanism which searches for a matching candidate for all the entry tables of nodes determined to be a search route is provided so that the matching candidate can be any entry including an entry which does not contribute to the search route determination in the table.

Improvement method 1: According to the principles 1 and 3, if multiple entries created from one prefix are entered in the leaf node, then only one of these is kept while the others are deleted.

Improvement method 2: According to principles 1 and 2, if one or more entries related to the same prefix are entered in the leaf node and there is also an entry related to the same prefix on a branch node in the search process leading to the leaf, then all the entries in the leaf node are deleted. However, the entry on the branch on the way cannot be deleted because it requires a search. Example: FIG. 35.

Improvement method 3: According to principles 1, 2 and 3, an entry from which multiple entries are derived (referred to as "O"), the sort key with the smallest value, and the sort key with the largest value are found amongst the sort keys of each derived entry (hereinafter referred to as "an entry derived from O"). The sort key list is considered having entries with the sort key included within the range from the sort key with the smallest value to the sort key with the largest value. In this case, the list obtained after excluding the group of entries derived from O (referred to as "list O") is referred to as list M, and the $n^{th}$ element of list M is referred to M[n]. The number of entries in the list M is referred to Mc. The target tree is assumed to be the tree containing Mc+1 entries. The height of the target tree is determined and its value indicated by H. Then, the number of entries in the table at the level having height H in the target tree is determined, and the value indicated by L. By way of example, if a target tree with five entries is formed in accordance with the tree construction method shown in FIG. 31, the entries are arranged from P0 to P4. The values H and L are the smallest when the entries are sequentially entered in an empty tree, as in this case. If Mc=4, then H=2 and L=1. In the case of a target tree with six entries, H=2 and L=2. Entries are then sequentially filled in the tree until the entry immediately prior to the smallest value entry in the group of Mc+1 entries is reached. When adding sequentially Mc+1 entries form the group to the tree, regarding the entries to be included at the highest level any of the following cases may occur depending on the tree boundary determined by the immediately preceding entry (an entry with a sort key immediately before the smallest-value sort key in the number order in the list M).

Case 1: One entry is occupied, which is higher than H when seen from the leaf.

Case 2: L entries with a height H are occupied.

Case 3: L+1 entries with a height H are occupied.

When the maximum number of entries for each node is set to 2 as in the tree shown in FIG. 31, L=2 as in the above example (target tree with six entries) and Case 3 (where L+1 entries with a height of H are occupied) does not occur.

As examples of the above Cases 1 to 3, a case is now considered where a list with Mc=4 is added to the tree shown in FIG. 31. In these examples, H=2 and L=1.

Example 1

(FIG. 37): P0 to P4 are occupied when the immediately preceding entry does not exist and the list M is the first list. Since the entry P2 at H=2 is occupied, it corresponds to Case 2.

Example 2

(FIG. 38): P4 to P8 are occupied, and P8 with a height of 3 is included, if the immediately preceding entry is filled in P3, it corresponds to Case 1.

Example 3

(FIGS. 39 and 40): P2 to P6 are occupied, and P2 and P5 are included at a H2 level if the immediately preceding entry is filled in P1. This applies to Case 3.

Example 4

(not shown): A node with a height of 4 is required if the immediately preceding entry is filled in P24. This apples to Case 1.

Each of the above cases is handled as follows:

For Case 1: A tree is constructed by sequentially using entries in the list M, until an entry immediately before the entry with a height exceeding H (referred to as S) is reached.

An entry of O is created as S. In this instance, data other than the mask (bit string field other than the prefix) is selected as follows in order that it acquire a value fit for the position. If, in the order of list M, the entry corresponding to S is assumed to be M[x], the value of the data other than the entry mask should match that of M[x]. If S is the last entry, the value should be the last value of the list O (which was excluded when M was created). These are examples that satisfy the sort order of the tree. Any value before and after S can be used unless it affects the magnitude of the relationship. M[×] and subsequent entries are sequentially constructed as done with the list M.

Now, construction of the tree has been completed to the degree that the maximum value of the O is reached. This is based on a principle that the entry S is located upstream of the search paths to all the constructed entries of the list M so that the S is surely evaluated in the search leading to all the divided areas.

For Case 2: A tree is constructed with the list M similar to Case 1. In this instance, any of the L entries with a height of H is selected as S, and processed in a way similar to Case 1. It is because there is provided a mechanism (Principle 3) in which the L entries are included in one node, the node will be located upstream to the search tree paths of all the entries constructed with the list M and, in the search tree leading to all the divided areas of O. Then, the entire entry table including all the L entries is evaluated, in which case only one replacement suffices (FIG. 36). When Cases 1 and 2 are satisfied at the same time, only Case 1 is executed.

For Case 3: It is handled in a manner similar to Case 2. One entry is selected as S, and not from L but from L+1 entries. The principle is also similar to Case 2. As a result, by regarding one entry of a node at the highest hierarchy as an entry belonging to O, then O and 'derived Os' can be implemented as a single O.

Improvement method 4 (when multiple sort keys are derived from the same prefix, it is referred to group 1, in which the total number of sort keys is large for both of two sort key groups and the numeric value range X from the smallest valued sort key to the largest valued sort key of one sort key group includes the numeric value range Y from the smallest value sort key to the largest sort key of the other sort key group. In the left side of FIG. 41, C is the outer sort key group and H is the inner sort key group.): By dividing the numeric range X of the outer sort key group in two (or more) field X1 and X2, e.g., with the numeric value range Y of the inner sort key group, processing identical to improvement method 3 can be performed independently for each of the divided X1, Y, and X2 corresponding to the numeric value range 1 of C, the numeric value range of H, and the numeric value range 2 of C, respectively shown in FIG. 41.

Improvement method 5 (when multiple sort keys are derived from the same prefix, they form a group referred to group 2 where the total number of sort keys is large for both sort key groups and the numeric value range X from the smallest value sort key to the largest sort key of one sort key group includes the numeric value range Y from the smallest value sort key to the largest sort key of the second sort key group.): The outer sort key group is defined as follows: GM= (the total number of inner groups to be divided: SM)+(the total number of sort keys which belong to neither the inner group nor the outer group)

The sort key list is referred to as the list GM. The height from a tree leave capable of containing (GM+1) entries is determined. Its value is defined as GH. The minimum number of entries required for a table with height of GH is determined. The value is defined as GL. All the entries in the inner group and entries in the outer group are separately and simultaneously condensed through improvement method 3. In this case, as for the outer group entries, GM, GH and GL are regarded as H, M and L, and adapted to the improvement method 3. If S in the outer group does not conflict with any S in the inner group, or where such S is selected, the inner and the outer entries can be separately and simultaneously processed based on the improvement method 3.

In a case similar to the case corresponding to improvement method 4 where the number of derived entries is too large when method 4 is applied, and method 5 cannot be used because of a conflict with S (Example: in FIG. 43, if the standard tree expansion shown in FIG. 42 is improved based on the improvement method 5, H and C interfere with one other. In FIG. 43, it is shown that H=H2 and C=H2. However, even though sort keys H and C are identical, H and C can be differentiated from each other by their mask lengths being different.) In this case, further condensation based on the following principle is possible.

Principle 4: As can be seen from improvement method 4, an entry wherein entries which are to be derived can be processed either collectively or in multiple subsets. Any dividing method can be applied to the division into subsets.

Principle 5: Even if a tree is constructed by continuously copying any multiple entries, the number of redundant entries is increased and the tree operates as a search tree if the order in the sort key list is maintained. It is then possible to move any continuous subsets backward to change the boundary of the search tree or to increase the number to increase the height H.

Principle 6: When GM+1 entries are processed in a method similar to improvement method 3, if GL$\geq$2 and Cases 2 or 3 apply, or if GL=1 but Case 3 applies, then two entries are occupied by GH.

Principles 4 to 6 can be used in combination thereof. Accordingly, these can be used to avoid a conflict as described with reference to improvements methods 6 to 9. By way of example, a case is now described where a list expanded as shown in FIG. 41 is to be contained in a three-branch tree having three levels. When the standard tree expansion is performed for the list shown in FIG. 41 using improvement method of 1 or 2, it results in what is illustrated in FIG. 42, whereas when using improvement method 5, S of C and S of H conflict with each other to be the same entry, as shown in FIG. 43.

Improvement method 6: The parent (i.e., the including side) is subdivided in order to avoid conflicts. This method is similar to improvement method 4 but performs division while avoiding a field where the S's conflict with each other. In FIG. 44, the parent is divided into $C_1$ and C5.

Improvement method 7: In order to avoid a conflict, a redundant entry is added to the parent to displace or expand the parent. In FIG. 45, the redundant entry C6 is added to C (=H2), the parent of H in order to displace it.

Improvement 8: In order avoid a conflict, a child (i.e., the included side) where conflict is to occur is subdivided. In FIG. 46, the child is divided into H1 and H (=L) to avoid a conflict with C.

Improvement method 9: In order to avoid a conflict, a redundant entry (two Gs in FIG. 47) is added immediately before the child wherein a conflict occurs to displace the child backward to be placed immediately behind S(H2, in FIG. 47).

Improvement methods 6 to 9 require a re-evaluation of GL, GH and the like because GM changes. A case of triple or more inclusions are considered in a similar fashion and handled by improvement method 5 if there a conflict does not exist, and by improvement methods 4 and 6 to 9 even if a conflict exist.

Improvement method 10: If as a result of performing the above improvement methods, multiple derived entries have a sort key related to each of multiple areas derived from a common area in one leaf, then any one entry is kept and the others are deleted.

Improvement method 11: If multiple derived entries having a sort key and related to each of a plurality of areas derived from a common area exist not only in a leaf but also in a higher node along the search route from the root to the leaf, then the entries in the leaf are deleted.

The invention claimed is:

1. A communication control apparatus, comprising:
   a storage device for storing search information to determine a subsequent transfer route for a packet received by way of its destination address; and
   a route search device to search for a transfer route for said packet received based on said search information, wherein said search information is associated with a tree structure, each node in said tree structure having at least one entry, a mask prefix associated with said at least one entry, wherein each entry includes information on the number of bits of said mask prefix associated therewith, and a sort key, and wherein the number of bits of said sort key is set to be greater than or equal to a longest mask length amongst the mask lengths of all said mask prefixes;

a bit string divided into an upper side bit string field and a lower side bit string field, wherein the upper side bit string field of each of said sort keys is to match said mask prefix associated with an entry having said sort key wherein entries are assigned to predetermined nodes of said tree structure based on a sort order of their sort keys; each node having an entry list in which multiple entries included therein are sorted based on their sort keys; and each node except leaf nodes are linked via each branch to relate each entry in the entry list of said node to each node at the next lower hierarchy.

2. The communication control apparatus according to claim 1, wherein said route search device further comprises:
   means for extracting the destination address of said packet received;
   means for searching each search target node for an entry having information on a mask prefix that matches the upper side bit string field of the extracted address in said search target node, as a matching entry to determine if there is only one matching entry, said matching entry becoming an inside-node matching entry and determine if there are multiple matching entries an entry having information on the mask prefix with the longest mask length amongst the matching entries to become the inside-node matching entry;
   search control means for specifying a search target node to said inside node matching entry search means, said search control means selecting a link based on a comparison of the sort key of each entry in each of said search target nodes with the extracted address to select a node related to the selected link to become the next search target node, and determine that a node-by-node search process is terminated if said link does not exist; and
   means for determining a transfer route for the packet received related to the extracted address based on a mask prefix with the longest mask length amongst the mask prefixes associated with multiple inside-node matching entries related to the extracted address, after the node-by-node search process terminates.

3. The communication control apparatus according to claim 2 wherein when a branch is linked to a node at the next lower hierarchy, two branches will be associated with an entry at one end of the entry list of the node and one branch will be associated with each of the remaining entries.

4. The communication control apparatus according to claim 1 further comprising a means for constructing said tree, said means for constructing a tree comprising:
   means for calculating minimum and maximum values of said sort key which are associated with a mask prefix C, as $C_{s\_min}$ and $C_{s\_max}$, respectively;
   means for setting said sort key Cs to be associated with said mask prefix C fulfilling the condition $C_{s\_min} \leq C_s \leq C_{s\_max}$; and
   means for determining an entry for each node based on said sort key set for each mask prefix by said sort key setting means to generate said tree structure based on said determination.

5. The communication control apparatus according to claim 4 further comprising sort keys stetting means, wherein said sort keys associated with two mask prefixes $C_1$ and $C_2$ are $C_{1S}$ and $C_{2S}$, the minimum sort keys being associated with $C_1$ and $C_2$ are $C_{1S\_min}$ and $C_{2S\_min}$, and the maximum sort keys being associated with $C_{1S\_max}$ and $C_{2S\_max}$, respectively; and wherein when $C_{1S\_min} \leq C_{2S\_min} \leq C_{2S\_max} \leq C_{1S\_max}$ exclusion of $C_{1S\_min} = C_{2S\_min} = C_{2S\_max} = C_{1S\_max}$, said sort keys means set $C_{1S}$ within a range from $C_{1S\_min}$ to and beyond the range, from $C_{2S\_min}$ to $C_{2S\_max}$.

6. The communication control apparatus according to claim 4 wherein said tree structure constructing means outputs said tree structure in which sort keys that are derived from the same mask prefix are streamlined leaving only one sort key derived from the same mask prefix at each leaf node.

7. The communication control apparatus according to claim 1 wherein a mask prefix with a bit length of 1 and a bit value 0 and a mask prefix with a bit length of 1 and a bit value 1 are included in the mask prefix associated with at least one entry; and a mask prefix with a bit length of 1 and a bit value 0 or a mask prefix with a bit length of 1 and a bit value 1 is associated with a default transfer route.

8. A communication control apparatus comprising:
   means for storing mask prefix information including information related to a mask prefix with a bit length of 0, the mask prefix with a bit length of 0 set to be associated with a default transfer route;
   means for extracting a destination address from a packet received;
   means for searching a mask prefix having the longest bit length amongst the mask prefixes matching an upper continuous bit string (UCS), said UCS corresponding to the most significant bits (MSB) of a bit string of the extracted destination address; and
   means for determining a transfer route for the packet received related to the currently extracted destination address based on the selected mask prefix.

9. A communication control apparatus comprising means for storing mask prefix information including information related to:
   a) a mask prefix with a bit length of 1 and a bit value 0 and a mask prefix with a bit length of 1 and a bit value 1;
   b) a mask prefix with a bit length of 1 and a bit value 0 or the mask prefix with a bit length of 1 and a bit value 1; and
   c) a mask prefix with a bit length of 0 being set to be associated with a default transfer route;
   means for extracting a currently extracted destination address from a packet received;
   means for searching a mask prefix with the longest bit length amongst the mask prefixes matching an upper continuous bit string field as the selected mask prefix; and
   means for determining a transfer route for the packet received related to the currently extracted destination address based on the selected mask prefix.

10. A communication control apparatus comprising:
   a storage device for storing search information to determine a next transfer route for a packet received by way of its destination address; and
   a route search device to search for a transfer route for the packet received based on said search information, wherein said search information is comprised of a first and second information field, wherein said first and second information fields are based on a predetermined integer u, to define respective bit numbers of a mask prefix arranged in descending order from the most significant bit (MSB) to the least significant bit (LSB), a short and a long mask prefix consisting of at most u bits and a mask prefix consisting of at least (u+1) bits, referred to as a short mask prefix and a long mask prefix, respectively;
   an upper side mask prefix field from the first bit to the $u^{th}$ bit and a lower side mask prefix field from the $(u+1)^{th}$ bit to the last bit of said mask prefix, said long mask prefix having the same upper side mask prefix field forming a mask prefix group and said first information field includes information related to the short mask prefix and the upper side mask prefix field, said first information field is stored in a table, said table including: a) u-bit entries with sort keys different from one another; b) entries in each table that include first and second table entries; c) all the bits from the first to the $w^{th}$ bit (where $w \leq u$ is an integer) of the sort key of the first table entry that are identical to the short mask prefix associated with the first table entry; and d) all the bits of the sort key of the second table entry that are identical to the upper side mask prefix field associated with the second table entry;

said second information field includes information related to the lower side mask prefix field, said second information field is stored in at least one tree structure, each tree structure is associated with each mask prefix group, and where a link is established to the tree structure from an entry having a sort key equal to the upper side mask prefix field of a long mask prefix belonging to the associated mask prefix group and included in said table, each node in each tree structure has at least one entry, the lower side mask prefix field of each long mask prefix is associated with at least one entry, each entry in the tree structure includes information on the number of bits of the lower side mask prefix field associated therewith, and a sort key; and wherein the number of bits of an entry in the tree structure is set to be greater than or equal to the longest lower side mask prefix field amongst the lower side mask prefix field mask lengths of all the lower side mask prefix fields;

the upper side bit string field of each sort key is set to match the lower side mask prefix field associated with an entry having said sort key; entries are assigned to predetermined nodes of said tree structure based on a sort order of their sort keys; each node having an entry list in which multiple entries included therein are sorted based on their sort keys; each node except leaf nodes being linked via each branch related to each entry in the entry list of the node to each node at the next lower hierarchy;

said route search device comprising:

means for extracting the destination address of a packet received from the packet received;

a table route search device, wherein a bit string field from the first to the $u^{th}$ bits and a bit string field of $(u+1)^{th}$ bit and subsequent bits, said table route search device searching for a transfer route for the packet received related to the currently extracted destination address by comparing each entry in the table with the first extracted address field;

a tree structure route search device searching for a transfer route for the packet received based on the currently extracted destination address by comparing each entry in the tree structure with the second extracted address field;

a controller for controlling said table route search device and said tree structure route search device; and means for determining the transfer route for the packet received related to the currently extracted destination address based on search results of said table route search device and said tree structure route search device;

said table route search device comprising:

means for searching for an entry having a sort key matching the upper side bit string field of the first extracted address field as a matching entry; and means for notifying said controller of the linked tree structure if a link from the appropriate entry retrieved by said search means to a predetermined tree structure is set, said tree structure route search device comprising:

inside-node matching entry search means for searching each search target node of said tree structure for an entry having information on the lower side mask prefix field that matches the upper side bit string field of the second extracted address field in the search target node as a matching entry to determine if there is only one matching entry, the only one entry to become the inside-node matching entry and determine if there are multiple matching entries, an entry having information on the lower side mask prefix field with the longest bit length amongst the matching entries to become the inside-node matching entry;

search control means for specifying a search target node to said inside-node matching entry search means, the search control means selecting a link based on a comparison of the sort key of each entry in each of said search target node with the second extracted address field to determine a node related to the selected link to be the next search target node and determining that the node-by-node search process is terminated if said link does not exist; and a lower side mask prefix field determining means for determining the lower side mask prefix field with the longest bit length amongst the lower side mask prefix field corresponding to multiple inside-node matching entries related to the second extracted address field after the node-by-node search process is terminated;

said controller comprising:

first directing means for directing the table route search means to execute a search process for the currently extracted destination address which has been extracted by said address extracting means prior to directing said tree structure route search means;

second directing means for directing said tree structure route search means to execute a search process related to the currently extracted destination address by specifying the search target tree structure notified by said notification means, when notified by said notification means of said table route search means; and final determination means for determining a transfer route for the packet received based on its currently extracted destination address utilizing the short mask prefix related to the appropriate entry retrieved by said search means of said table route search means, if said second directing means does not direct said tree structure route search means to execute a search process; and determining if said second directing means directs said tree structure route search means to execute said search process, a long mask prefix which is based on the upper side mask prefix field related to an entry in the link-source table in the tree structure, which was determined to be the search target tree structure by said tree structure route search means, and the lower side mask prefix field determined by said lower side mask prefix field determining means of said tree structure route search means to be a transfer route for the packet received related to the currently extracted destination address.

11. A communication control method for storing search information to determine the next transfer route for a packet received based on its destination address, and searching for a transfer route for the packet received based on said search information, wherein said search information is associated with a tree structure; each node in the tree structure having at least one entry; each mask prefix being associated with at least one entry; each entry including information on the number of bits of a mask prefix associated therewith, and a sort key; the number of bits of the sort key being set to be greater than or equal to the longest mask length amongst the mask lengths of all the mask prefixes; the upper side bit string field of each sort key being set to match the mask prefix associated with the entry having the sort key; entries being assigned to predetermined nodes of said tree structure based on the sort order of the sort keys; and each node having an entry list in which multiple entries included therein are sorted based on their sort keys; each node except leaf nodes being linked by a branch related to each entry in the entry list of the node to each node at the next lower hierarchy;

the communication control method comprising the steps of:

extracting a destination address of a packet received from the packet received based on its destination address;

searching for each search target node of an entry having information on a mask prefix that matches the upper side bit string field of the extracted address in the search target node, as a matching entry to determine if there is only one matching entry, the only one matching entry to become the inside-node matching entry, and to determine if there are multiple matching entries, an entry having information on a mask prefix with the longest mask length amongst the matching entries to become the inside-node matching entry;

determining a search target node at said inside-node matching entry search step, the search control step selecting a link based on a comparison of the sort key of each entry in each search target node with the extracted address to determine the node related to the selected link to be the next search target node and determining that the node-by-node search process is terminated if a link does not exist; and determining a transfer route for the packet received based on its extracting address, said determination being based on a mask prefix with the longest mask length amongst the mask prefixes associated with multiple inside-node matching entries related to the extracted address, after the node-by-node search process is terminated.

12. The communication control method according to claim 11 wherein the same number of entries are set for each of nodes belonging to the same hierarchy of said tree structure.

13. The communication control method according to claim 11, comprising the steps of:

calculating the minimum and the maximum values of a sort key associated with a mask prefix C, as $C_{s\_min}$ and $C_{s\_max}$, respectively;

setting a sort key $C_s$ to be associated with the mask prefix C under a condition of $C_{s\_min} \leq C_s \leq C_{s\_max}$; and determining an entry for each node based on a sort key set for each mask prefix at said sort key setting step to generate a tree structure based on said determination.

14. The communication control method according to claim 11 wherein the tree structure in which the sort keys derived from the same mask prefix have been streamlined when the node at the lower hierarchy is outputted.

15. The communication control method according to claim 11 wherein a mask prefix with a bit length of 0 is included in the mask prefix associated with said at least one entry, and the mask prefix with a bit length of 0 is associated with a default transfer route.

16. A communication transfer method comprising the steps of:

storing mask prefix information including information related to a mask prefix with a bit length of 0, the mask prefix with a bit length of 0 being set to be associated with a default transfer route.

extracting a destination address of a packet received from the packet received;

searching for a mask prefix with the longest bit length amongst the mask prefixes matching the upper continuous bit string field as a matching mask prefix when a continuous bit string field from the MSB in the bit string of an extracted address; and determining a transfer route for the packet received related to the currently extracted destination address based on said mask prefix.

17. A communication control method comprising the steps of:

storing mask prefix information including information related to a mask prefix with a bit length of 1 and a bit value 0 and a mask prefix with a bit length of 1 and a bit value 1, the mask prefix with a bit length of 1 and a bit value 0 or the mask prefix with a bit length of 1 and a bit value 1, and a mask prefix with a bit length of 0 being set to be associated with a default transfer route;

extracting a destination address of a packet received;

searching for a mask prefix with the longest bit length amongst the mask prefixes matching the upper continuous bit string field as a matching mask prefix when a continuous bit string field from the MSB in the bit string of an extracted address is found; and determining a transfer route for a packet received related to the currently extracted destination address based on the matching mask prefix.

18. A communication control method for storing search information to determine the next transfer route for a packet received from its destination address, and searching for a transfer route for the packet received based on said search information, wherein said search information is comprised of a first and a second information field; a predetermined integer u and respective bit numbers of a mask prefix arranged in the order from the MSB to the LSB; a mask prefix with at most u bits and a mask prefix with at least u+1 bits, referred to a short mask prefix and a long mask prefix, respectively; a field from the first to the $u^{th}$ bits and a field from the $(u+1)^{th}$ to the last bit of the long mask prefix referred to the upper side mask prefix field and the lower side mask prefix field, respectively; long mask prefixes having the same upper side mask prefix field to form a mask prefix group; said first information field including information related to a short mask prefix and the upper side mask prefix field; said first information field being stored in a table; said table including u-bit entries with sort keys different from one another; the entries included in each table consisting of a first and a second table entries; all the bit values from the first to the $w^{th}$ (where w<u is an integer) of the sort key of the first table entry that are identical to the short mask prefix associated with the first table entry; and all the bits of the sort key of the second table entry that are identical to the upper side mask prefix field associated with the second table entry; said second information field including information related to the lower side mask prefix; said second information field being stored in at least one tree structure; each tree structure is associated with each mask prefix group, and a link established to the tree structure from an entry having a sort key equal to the upper side mask prefix field of a long mask prefix belonging to the associated mask prefix group and included in said table; each node in each tree structure has at least one entry; the lower side mask prefix field of each long mask prefix is associated with at least one entry; each entry in the tree structure includes information on the number of bits of the lower side mask prefix field associated therewith, and a sort key; the number of bits of an entry in the tree structure is set to be greater than or equal to the longest lower side mask prefix field mask length amongst the lower side mask prefix field mask lengths of all the lower side mask prefix fields; the upper side bit string field of each sort key is set to match the lower side mask prefix field associated with an entry having the sort key; entries are assigned to predetermined nodes of said tree structure based on the sort order of their sort keys; each node has an entry list in which multiple entries included therein are sorted based on their sort keys; each node except leaf nodes are linked via each branch that are related to each entry in the entry list of the node to each node at the next lower hierarchy;

the communication control method comprising the steps of:

extracting a destination address of a packet received from the packet received;

searching for a transfer route for the packet received from its currently extracted destination address based on a comparison of each entry in the table with the first extracted address field wherein a bit string field from the first to the $u^{th}$ bit and a bit string field of $(u+1)^{th}$ bits and subsequent bits are referred to as a first and a second extracted address field, respectively;

searching for a transfer route for the packet received from its currently extracted destination address based on a comparison of each entry in the tree structure with the second extracted address field;

controlling said table route search step and said tree structure route search step; and determining a transfer route for the packet received from its currently extracted destination address based on search results of said table route search step and said tree structure route search step;

said table route search step comprising the steps of:

searching for an entry having a sort key matching the upper side bit string field of the first extracted address field as a matching entry; and notifying said control step to that effect and the linked tree structure if a link from the appropriate entry retrieved at said search step to a predetermined tree structure is set;

said tree structure route search step further comprising the steps of: searching each search target node of said tree structure for an entry having information on the lower side mask prefix field that matches the upper side bit string field of the second extracted address field in the search target node, as a matching entry to determine if there is only one matching entry, the only one matching entry to become the inside-node matching entry and determine if there are multiple matching entries, an entry having information on the lower side mask prefix field with the longest bit length amongst the matching entries to become the inside-node matching entry;

determining a search target node at said inside-node matching entry search step, the search control step selecting a link based on comparison of the sort key of each entry in each search target node with the second extracted address field to determine a node related to the selected link to be the next search target node and determining that the node-by-node search process is terminated if a link does not exist; and determining the lower side mask prefix field with the longest bit length among the lower side mask prefix field corresponding to multiple inside-node matching entries related to the second extracted address field, after the node-by-node search process is terminated;

said control step further comprising the steps of:

a first directing step for executing a search process at the table transfer search step for the currently extracted destination address which has been extracted at said address extracting step, prior to execution of a search process at said tree structure route search step;

a second directing step for directing said tree structure route search step to execute a search process related to the currently extracted destination address by specifying the search target tree structure notified by said notification step when notified by said notification step of said table route search step; and determining a transfer route for the packet received related to the currently extracted destination address, based on the short mask prefix related to the appropriate entry retrieved at the search step of said table route search step if execution of a search process at said tree structure route search step has not been directed at said second directing step; and determining a long mask prefix based on the upper side mask prefix field related to an entry in the link-source table in the tree structure determined to be a search target tree structure by said tree structure route search step and the lower side mask prefix field determined by said lower side mask prefix field determining step of said tree structure route search step to be a transfer route for the packet received related to the currently extracted destination address if execution of a search process at the tree structure route search step has been directed at said second directing step.

19. A program storage device readable by machine, tangibly embodying a program of instructions executable by the machine to perform method steps for providing a communication control method for storing search information to determine the next transfer route for a packet received based on its destination address, and searching for a transfer route for the packet received based on said search information, wherein said search information is associated with a tree structure; each node in the tree structure having at least one entry; each mask prefix being associated with at least one entry; each entry including information on the number of bits of a mask prefix associated therewith, and a sort key; the number of bits of the sort key being set to be greater than or equal to the longest mask length amongst the mask lengths of all the mask prefixes; an upper side bit string field of each sort key being set to match the mask prefix associated with the entry having the sort key; entries being assigned to predetermined nodes of said tree structure based on the sort order of the sort keys; and each node having an entry list in which multiple entries included therein are sorted based on their sort keys; each node except leaf nodes being linked by a branch related to each entry in the entry list of the node to each node at the next lower hierarchy; said communication control method comprising the steps of:

extracting a destination address of a packet received from the packet received based on its destination address;

searching for each search target node of an entry having information on a mask prefix that matches the upper side bit string field of the extracted address in the search target node, as a matching entry to determine if there is only one matching entry, the only one matching entry to become an inside-node matching entry, and to determine if there are multiple matching entries, an entry having information on a mask prefix with the longest mask length amongst the matching entries to become the inside-node matching entry;

determining a search target node at said inside-node matching entry search step, the search control step selecting a link based on a comparison of the sort key of each entry in each search target node with the extracted address to determine the node related to the selected link to be the next search target node and determining that the node-by-node search process is terminated if a link does not exist; and determining a transfer route for the packet received based on its extracting address, said determination being based on a mask prefix with the longest mask length amongst the mask prefixes associated with multiple inside-node matching entries related to the extracted address, a after node-by-node search process is terminated.

* * * * *